(12) United States Patent
Essinger et al.

(10) Patent No.: US 9,030,964 B2
(45) Date of Patent: *May 12, 2015

(54) WIRELESS NETWORK DEVICE

(71) Applicant: Metrologic Instruments, Inc., Blackwood, NJ (US)

(72) Inventors: Steven Essinger, Philadelphia, PA (US); Xiaoxun Zhu, Shanghai (CN); Michael Schnee, Aston, PA (US); JiBin Liu, Suzhou (CN); Xin Shen, Suzhou (CN); LiangLiang Chen, Suzhou (CN); Jun Lu, Suzhou (CN)

(73) Assignee: Metrologic Instruments, Inc., Blackwood, NJ (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/895,602

(22) Filed: May 16, 2013

(65) Prior Publication Data

US 2013/0250806 A1 Sep. 26, 2013

Related U.S. Application Data

(63) Continuation of application No. 12/319,905, filed on Jan. 13, 2009, now Pat. No. 8,457,013.

(51) Int. Cl.
*H04L 12/28* (2006.01)
*H04W 4/00* (2009.01)
*H04W 88/00* (2009.01)
*H04W 16/00* (2009.01)
*H04W 84/10* (2009.01)
*H04W 84/18* (2009.01)

(52) U.S. Cl.
CPC .............. *H04W 4/001* (2013.01); *H04W 16/00* (2013.01); *H04W 84/10* (2013.01); *H04W 84/18* (2013.01); *H04W 88/00* (2013.01)

(58) Field of Classification Search
None
See application file for complete search history.

(56) References Cited

U.S. PATENT DOCUMENTS

| | | |
|---|---|---|
| 5,887,968 A | 3/1999 | Logan |
| 6,215,409 B1 | 4/2001 | Blach |
| 6,592,233 B1 | 7/2003 | Parikka |
| 6,995,749 B2 | 2/2006 | Friend |
| 7,324,700 B2 | 1/2008 | Nichogi et al. |
| 7,597,468 B2 | 10/2009 | Weng et al. |
| 7,605,772 B2 | 10/2009 | Syrstad |
| 7,784,701 B2 | 8/2010 | Gelbman |
| 7,871,001 B2 | 1/2011 | Gelbman |
| 7,918,395 B2 | 4/2011 | Gelbman |
| 8,018,428 B2 | 9/2011 | Jung et al. |
| 8,234,507 B2 | 7/2012 | Zhu et al. |
| 8,457,013 B2 * | 6/2013 | Essinger et al. .............. 370/254 |

(Continued)

FOREIGN PATENT DOCUMENTS

| | | |
|---|---|---|
| EP | 1 110 138 A1 | 6/2001 |
| EP | 2 267 978 A1 | 12/2010 |

*Primary Examiner* — Robert Wilson
(74) *Attorney, Agent, or Firm* — Additon, Higgins & Pendleton, P.A.

(57) ABSTRACT

Various wireless network components offer increased flexibility, ease of use, functionality and performance in many demanding applications in diverse fields of use. In particular, a wireless multi-function network device for use on a wireless communication network can serve multiple functions and dynamically switch and reconfigure from a network router into a network coordinator in the event that the originally designated network coordinator is permanently or temporally disabled.

20 Claims, 61 Drawing Sheets

(56) References Cited

U.S. PATENT DOCUMENTS

| | | |
|---|---|---|
| 2004/0070565 A1 | 4/2004 | Nayar et al. |
| 2009/0273559 A1 | 11/2009 | Rofougaran et al. |
| 2010/0177080 A1 | 7/2010 | Essinger et al. |
| 2010/0177660 A1* | 7/2010 | Essinger et al. .............. 370/254 |
| 2010/0177707 A1* | 7/2010 | Essinger et al. .............. 370/329 |
| 2010/0207964 A1 | 8/2010 | Kimmel et al. |
| 2013/0250806 A1* | 9/2013 | Essinger et al. .............. 370/254 |

\* cited by examiner

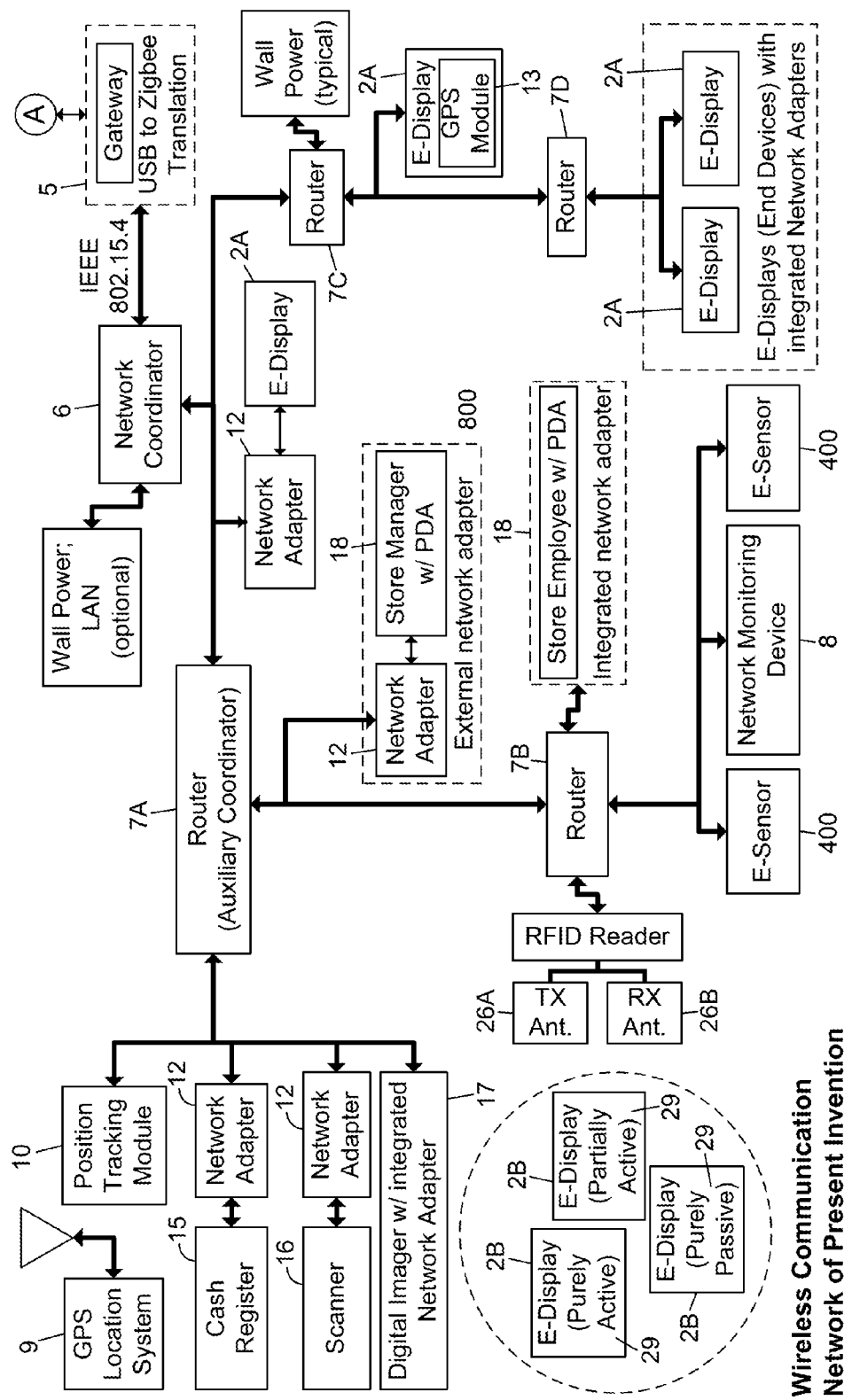
FIG. 1A1

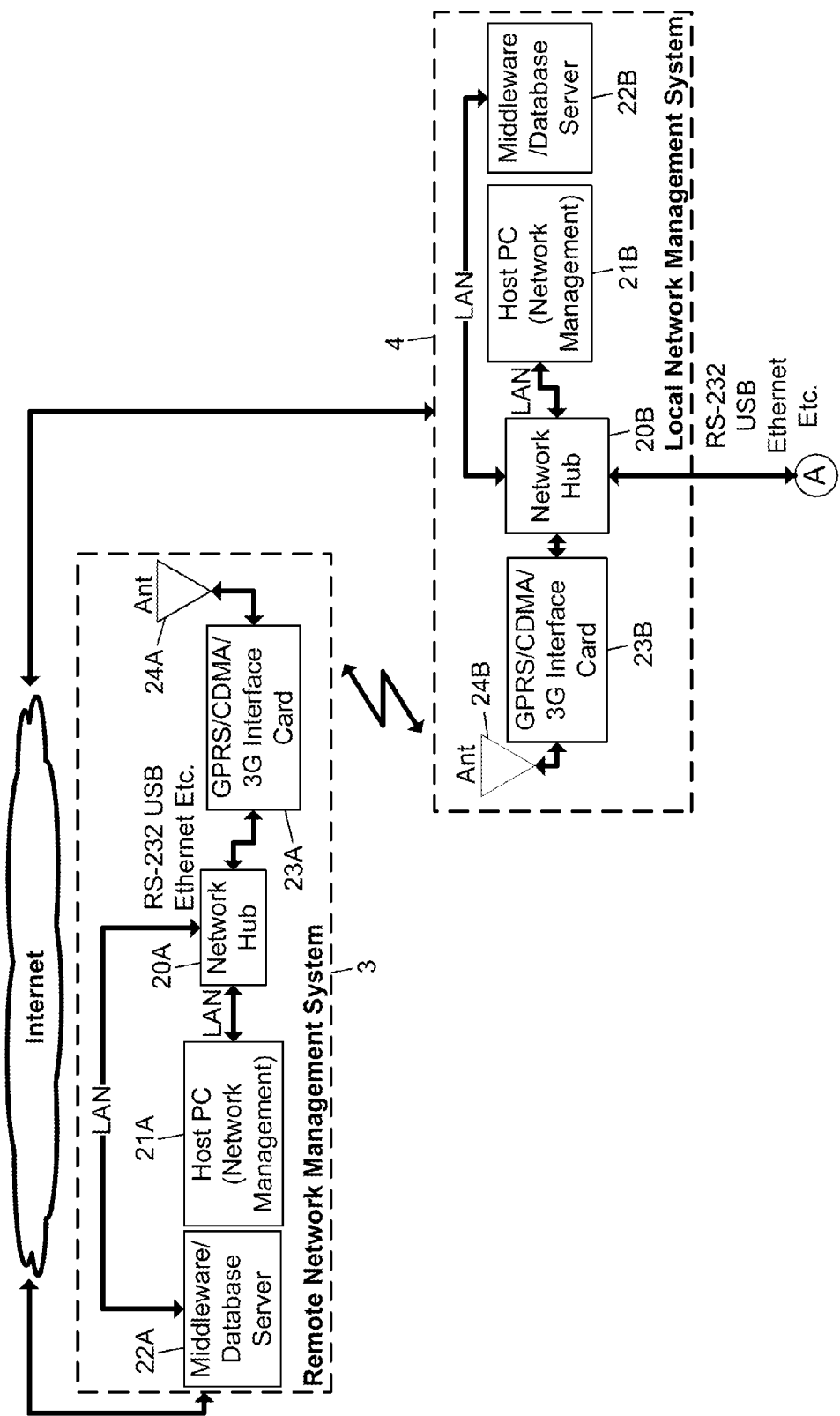
FIG. 1A2

Zigbee End Device (E-Display) Firmware Flowchart

Network End-Device (E-Display) Firmware Flowchart

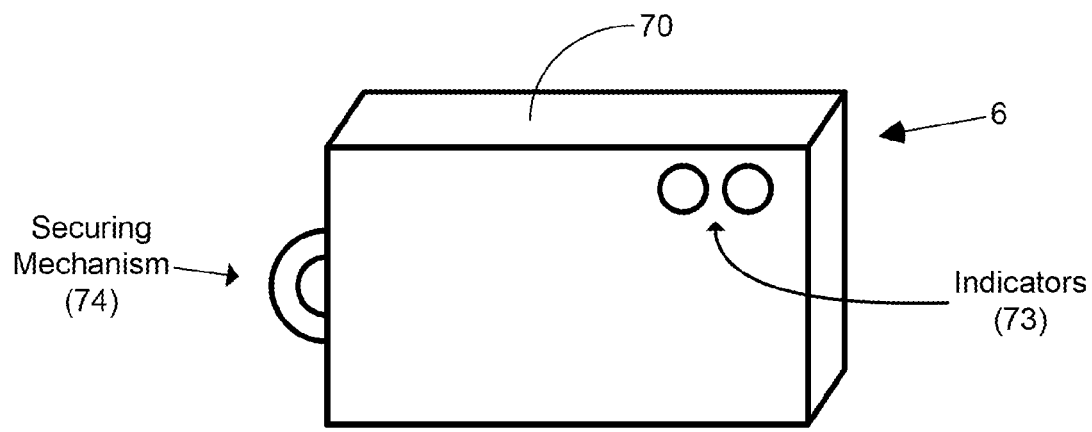
Coordinator Wall Plug
FIG. 7A1
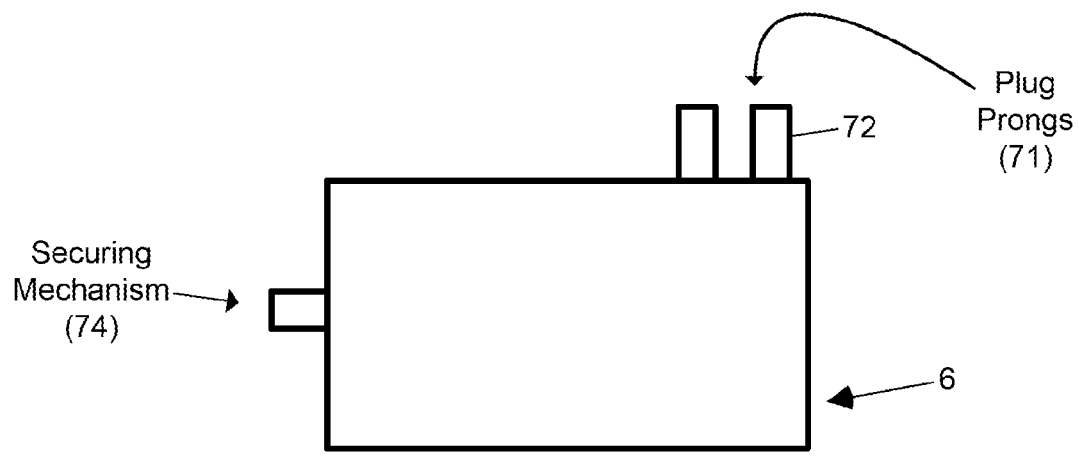
Coordinator Wall Plug
FIG. 7A2

Coordinator State Diagram

Look-up Table Stored in Network Coordinator

| Device # | Type | MAC Address |
|---|---|---|
| 1 | Coordinator | 00012A6BD899 |
| 2 | Gateway | 465DBA4D78A0 |
| 3 | Router | 020BA4BC2128 |
| 4 | End Device | 33321BD7C465 |
| 5 | End Device | 683AB9C90011 |
| 6 | End Device | 000145B7DE81 |
| 7 | Router | 254FE7G90369 |
| 8 | End Device | 215BB089CD98 |

FIG. 7F

Coordinator Software Flowchart

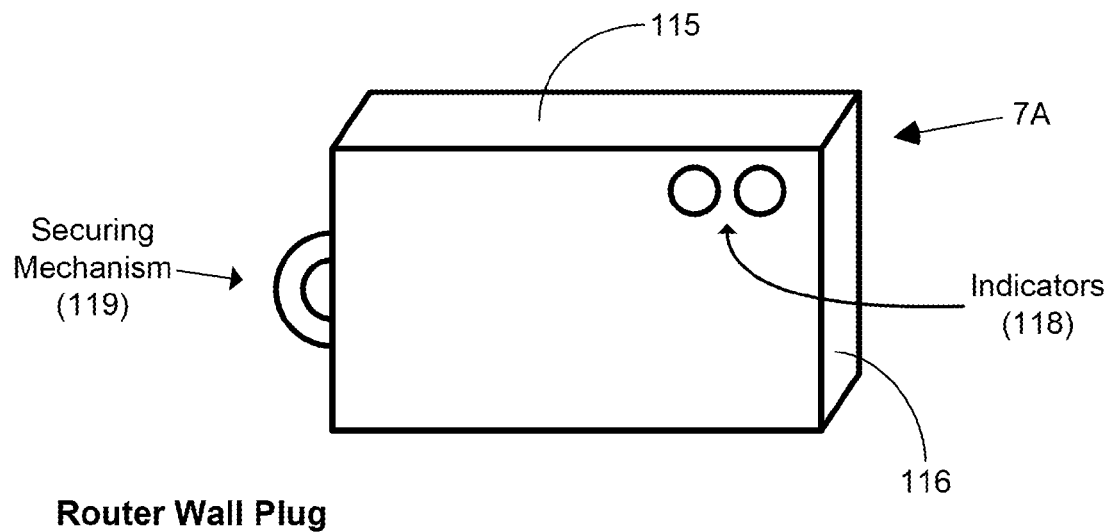
Router Wall Plug
FIG. 8A1
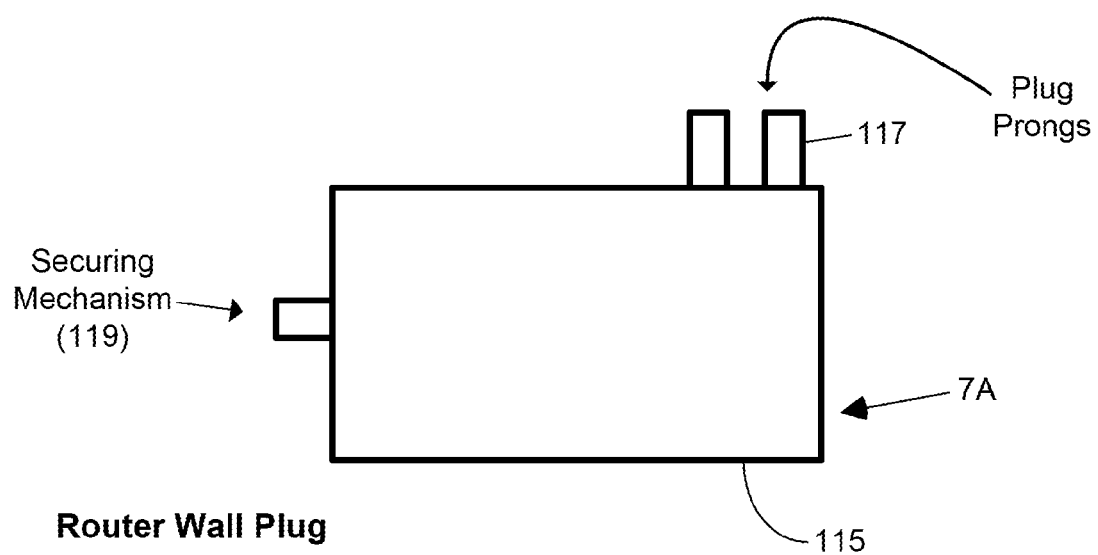
Router Wall Plug
FIG. 8A2

Router State Diagram

Zigbee Router Firmware Flowchart

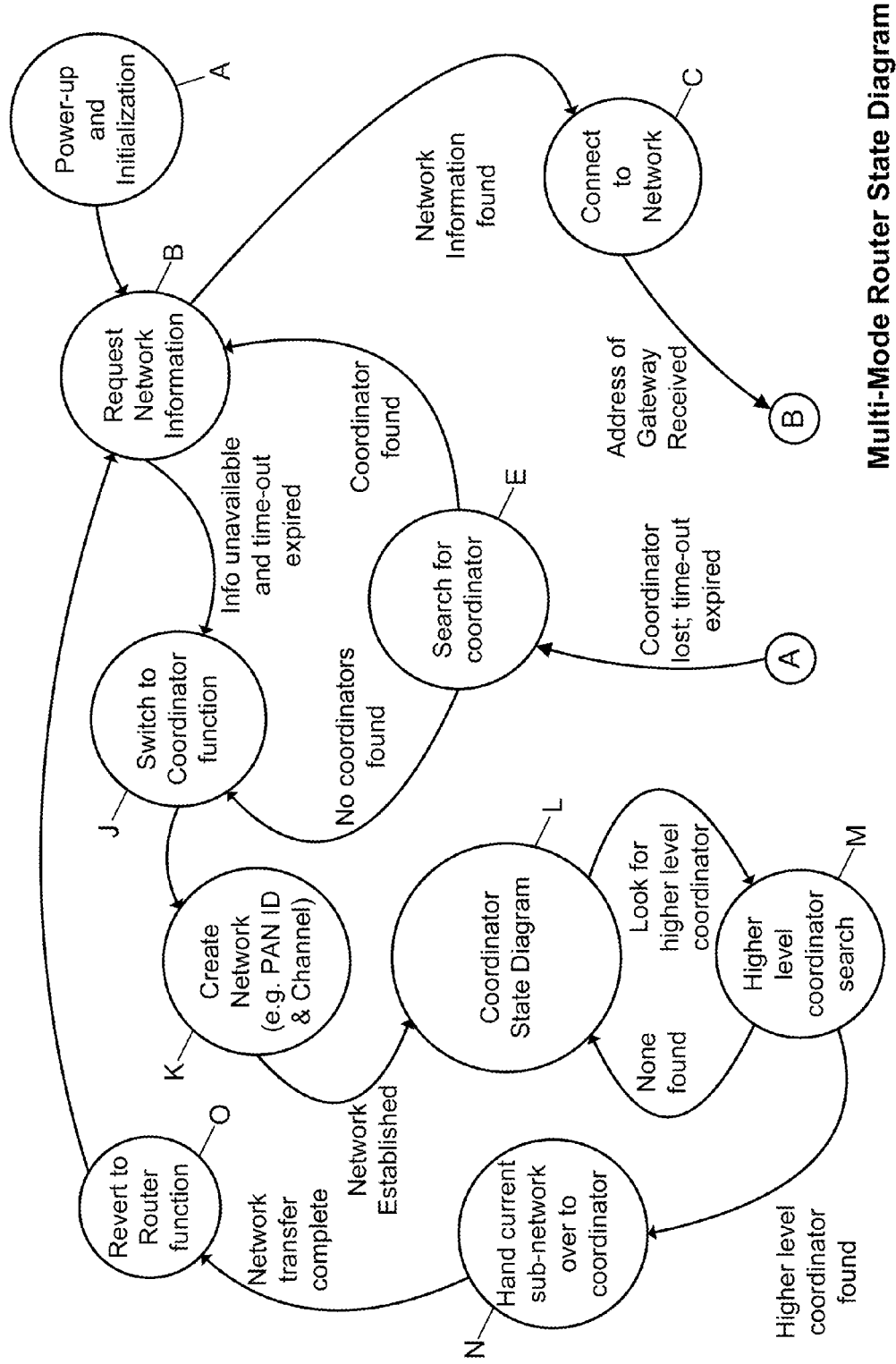
FIG. 8H1
Multi-Mode Router State Diagram

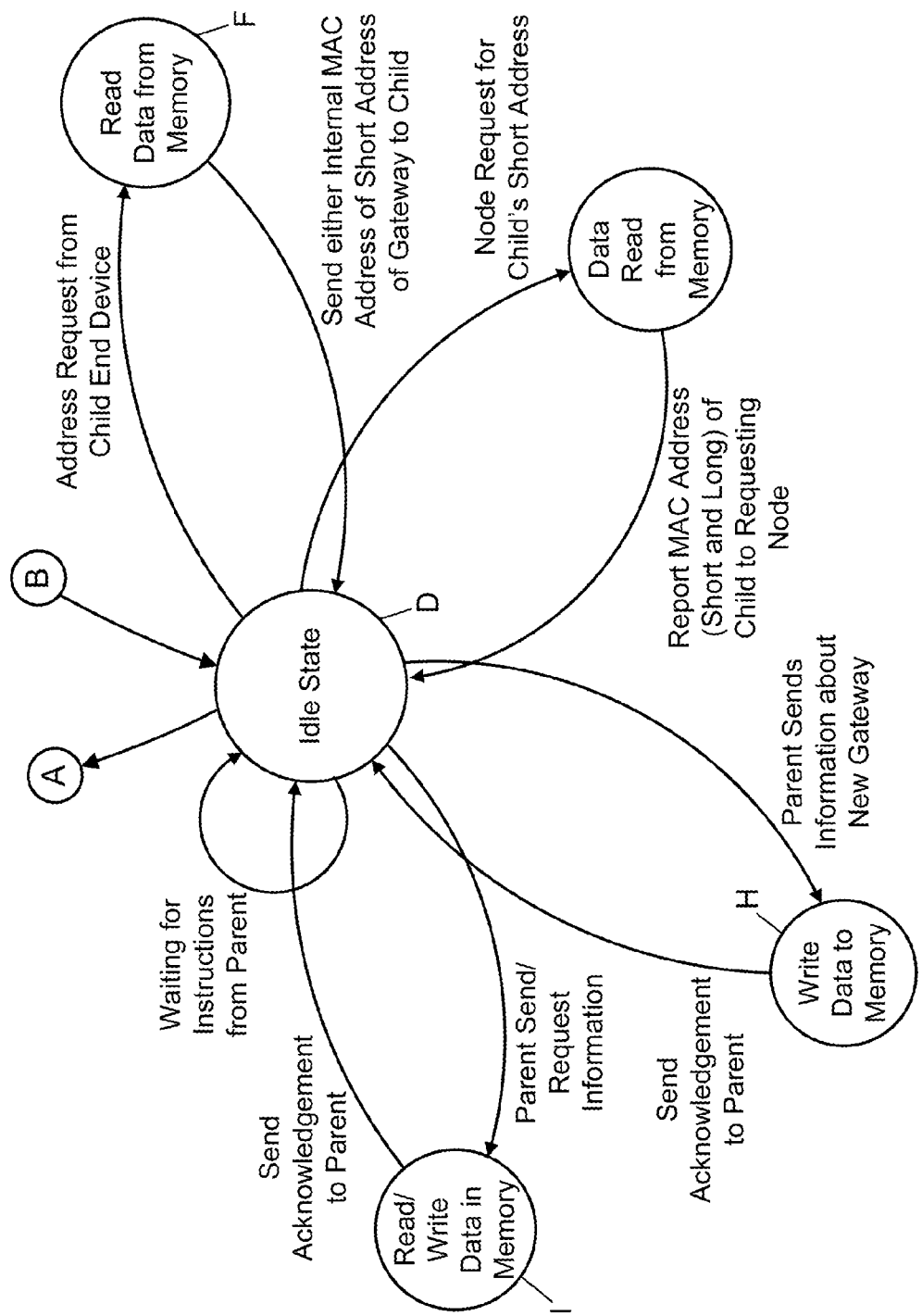
FIG. 8H2

Router Software Flowchart

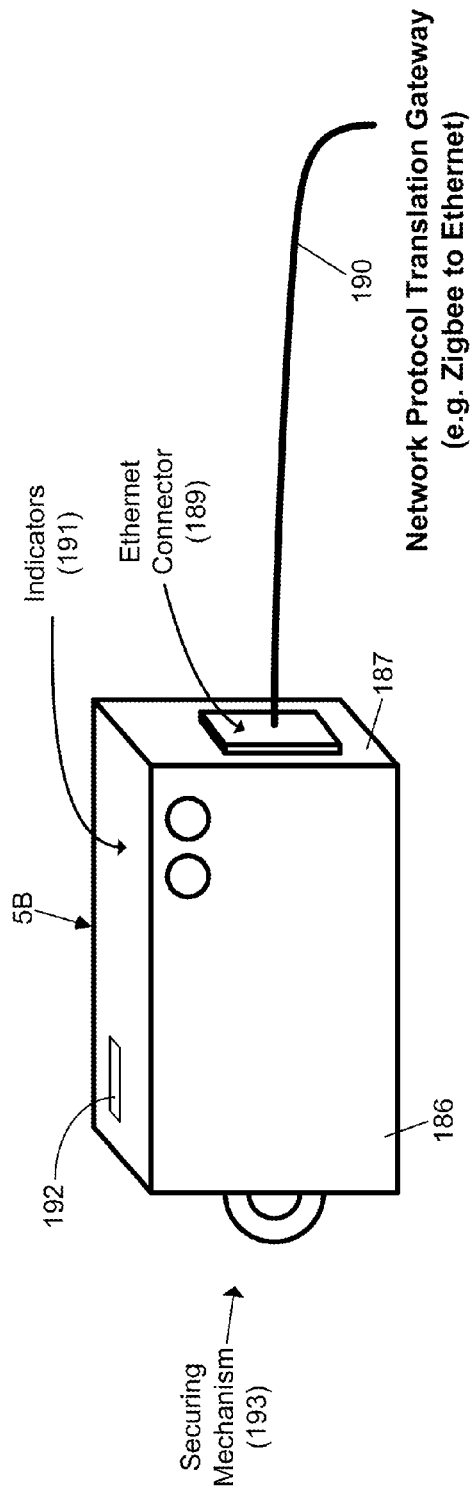
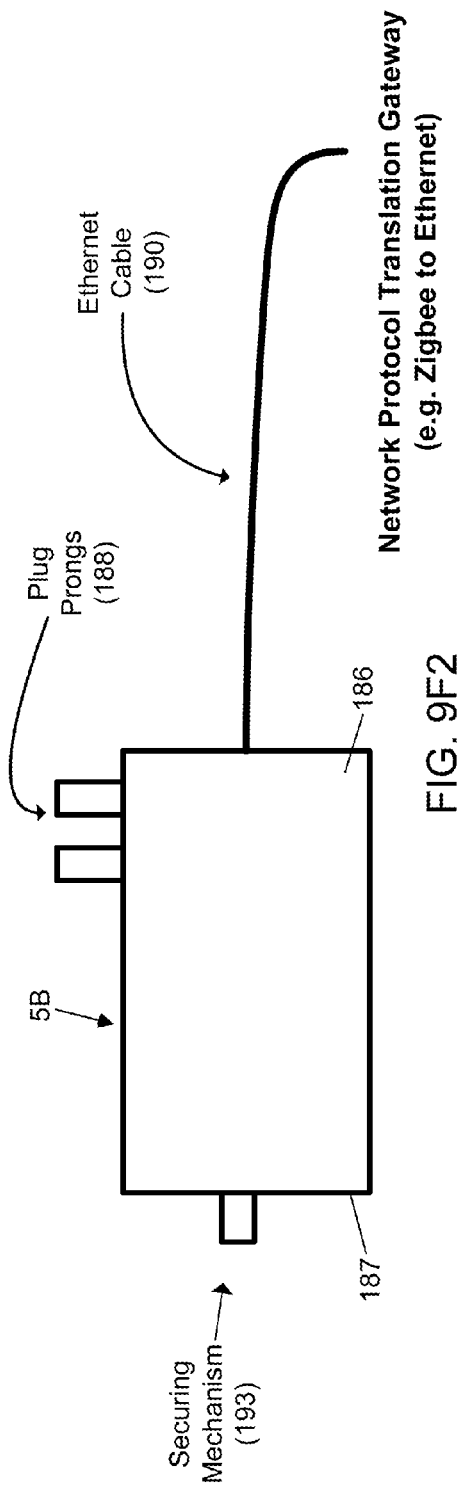
FIG. 9F1
FIG. 9F2

Network Database

| Device # | Device Type | MAC Address | Description of Device/Association | Current Display |
|---|---|---|---|---|
| 1 | Coordinator | 00012A6BD899 | Network Coordinator | N/A |
| 2 | Gateway | 465DBA4D78A0 | Gateway to Host | N/A |
| 3 | Router | 020BA4BC2128 | Router 1 | N/A |
| 4 | End Device | 33321BD7C465 | T-Shirts | $8.99 |
| 5 | End Device | 683AB9C90011 | Coffee | $3.95 |
| 6 | End Device | 000145B7DE81 | Sunblock | $5.89 |
| 7 | Router | 254FE7G90369 | Router 2 | N/A |
| 8 | End Device | 215BB089CD98 | Engine Oil | $12.99 |

Save & Close

FIG. 10C

Network Monitoring Device Flowchart

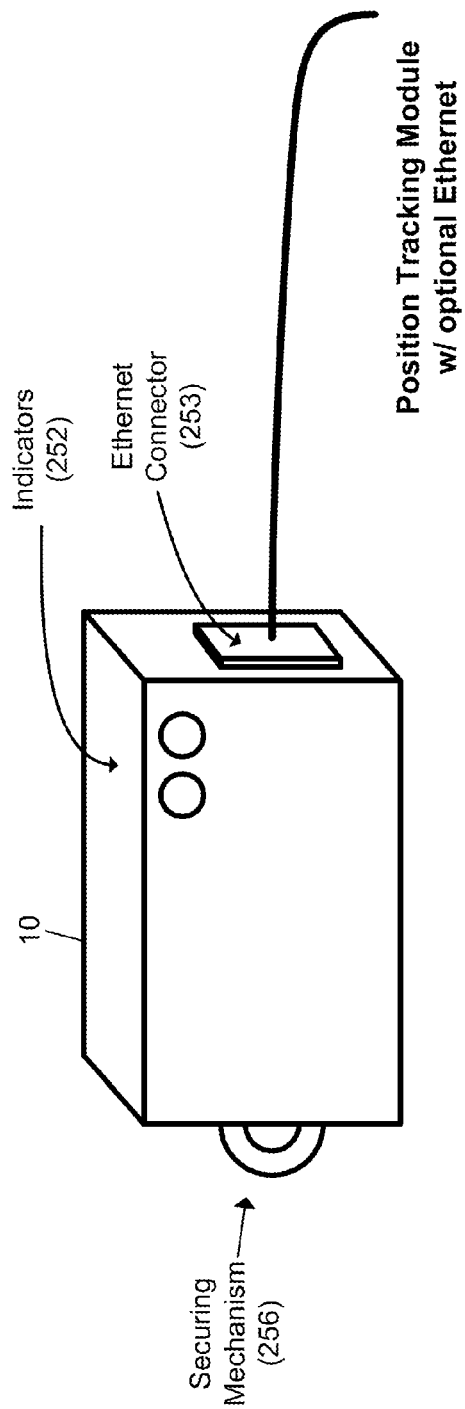
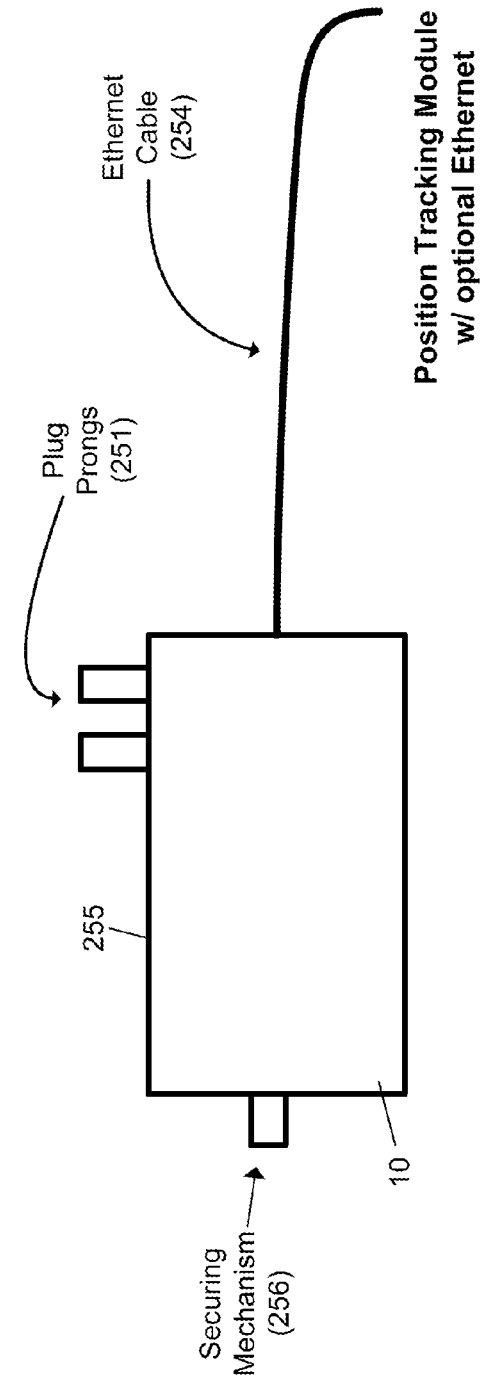

Position Tracking Module State Diagram

Position Tracking Module Flowchart

Wireless E-Display Sensor Diagram

Operational Flowchart for Wireless E-Display Sensor

WIRELESS NETWORK DEVICE

CROSS-REFERENCE TO PRIORITY APPLICATION

The present application is a continuation of U.S. patent application Ser. No. 12/319,905 for a Wireless Dual-Function Network Device Dynamically Switching and Reconfiguring from a Wireless Network Router State of Operation into a Wireless Network Coordinator State of Operation in a Wireless Communication Network, filed Jan. 13, 2009 (and published Jul. 15, 2010 as U.S. Patent Application Publication No. 2010/0177660), now U.S. Pat. No. 8,457,013. Each of the foregoing patent application, patent publication, and patent is hereby incorporated by reference in its entirety.

BACKGROUND OF INVENTION

1. Field of Invention

The present invention relates to wireless mesh-type communication networks for use in the automation, control, security and others applications.

2. Brief Description of the State of the Art

The use of wireless mesh-type communication networks is quickly growing in the automation, control, security and other industries. One reason for this growth is that wireless communication networks can be installed relatively quickly and inexpensively, without the need to run hard wires and cables for data signal transmission and control.

Currently, a number of different wireless communication network designs, based on the IEEE 802.15.4 networking protocol, have been developed and deployed for managing groups of wireless network devices. Such examples include networks based on the ZigBee® wireless networking protocol by the ZigBee Alliance, for managing wireless electronic-ink display devices, sensor devices and controllers; and the Ambient Systems Wireless Network employing intelligent (Product Series 300) network device components and wireless mesh networks, for tracking and monitoring active RFID and wireless sensor devices, by Ambient Systems; and Honeywell's OneWireless universal mesh network supporting multiple industrial protocols and applications simultaneously.

While the above wireless networks are implemented using different types of network components that meet the current needs of a number of industrial applications, there is still a great need in the art for improvements in wireless network components that offer increased flexibility, ease of use, functionality and performance in many demanding applications in diverse fields of use.

OBJECTS AND SUMMARY OF THE PRESENT INVENTION

Accordingly, a primary object of the present invention is to provide a wireless multi-function network device for use on a wireless communication network, that can serve multiple functions and dynamically switch and reconfigure from a network router into a network coordinator in the event that the originally designated network coordinator is permanently or temporally disabled.

Another object of the present invention is to provide a wireless mesh-type communication network, including a plurality of wireless network router devices, each capable of performing the functions of a network controller/coordinator; wherein the plurality of wireless network routers dynamically assign the network coordinator role to one wireless network router, while the other wireless network routers perform the role of wireless network routers.

Another object of the present invention is to provide a wireless network router device for use on a wireless communication network, and employing an integrated phased-array antenna structure, supporting the spatial isolation of multi-regions, and utilizing beam steering principles of operation, for illuminating multiple wireless network end-devices over separate regions.

Another object of the present invention is to provide a network gateway device that supports a USB-type communication interface and RF-based wireless communication interface.

Another object of the present invention is to provide a network protocol translation (NPT) based gateway device for use in a wireless communication network, wherein network protocol translation services include translating from ZigBee to Ethernet communication protocols, and translating from Ethernet to ZigBee communication protocols.

A wireless network coordinator device for automatically establishing a Personal Area Network (PAN) on a wireless communication network, and having a compact housing with an electrical wall plug integrated therein having electrical prongs for plugging into a standard electrical wall socket These and other objects of the present invention will become apparent hereinafter and in the Claims to Invention.

BRIEF DESCRIPTION OF THE DRAWINGS

For a more complete understanding of how to practice the Objects of the Present Invention, the following detailed description of the illustrative embodiments can be read in conjunction with the accompanying drawings, briefly described below.

FIGS. 1A1 and 1A2, taken together, provide a schematic representation of a first illustrative embodiment of the wireless communication network of the present invention for remotely and locally programming and monitoring a plurality of network devices, including electronic-ink based display devices and e-display servers, deployed in a work environment, using the IEEE 802.15.4 wireless networking protocol;

FIG. 2 is a schematic representation of a generalized embodiment of the wireless communication network of the present invention, graphically illustrating (i) the parent/child relationship of each node in the wireless network, and (ii) the capacity of the multi-mode routers in the wireless network of the present invention, shown in FIGS. 8H and 8I, designed to also function as the wireless network coordinator in the event the assigned network coordinator fails or otherwise looses communication with the wireless network;

FIG. 7A1 is a front perspective view of a wireless network coordinator device of the present invention, having an electrical wall plug form factor;

FIG. 7A2 is a top view of the wireless network coordinator device of FIG. 7A1, having an electrical wall plug form factor;

FIG. 7F is a schematic representation of a MAC Address Look-UP Table stored in a wireless coordinator device of the present invention, supporting the IEEE 802.15.4 network layer protocol;

FIG. 8A1 is a front perspective view representation of a wireless network router device of the present invention having an electrical wall plug form factor;

FIG. 8A2 is a top view of the wireless network router device of FIG. 8A1 having an electrical wall plug form factor;

FIGS. 8H1 and 8H2 set forth a state diagram representation of the wireless network router device of the present invention, depicted in FIGS. 8B and 8E, showing the various states of operation through which the network router device passes, during multi-mode operation, in automatic response to events occurring on its network;

FIG. 9F1 is a front perspective view of a wireless network protocol translation (NTP) gateway device for use in a wireless communication network of the present invention, as illustrated in FIGS. 1A, 1B and 1C;

FIG. 9F2 is a top view of the wireless network protocol translation (NTP) gateway device of FIG. 9F1;

FIG. 10C is a schematic representation of an exemplary graphical user interface (GUI) that is displayed at the host system, to which the network gateway device is interfaced, showing a network map of a IEEE 802.15.4 wireless network configuration, allowing information maintained on each node in the network (e.g. device number, MAC address, node description, current message display) to be displayed in expanded form when the network administrator selects the network node to be detailed;

FIG. 12A1 is a front perspective view of a wireless node position tracking (NPT) module for use in a wireless communication network of the present invention, as illustrated in FIGS. 1A, 1B and 1C;

FIG. 12A2 is a to view of a wireless node position tracking (NPT) module of FIG. 12A1.

DETAILED DESCRIPTION OF THE ILLUSTRATIVE EMBODIMENTS OF THE PRESENT INVENTION

Figure 1B:
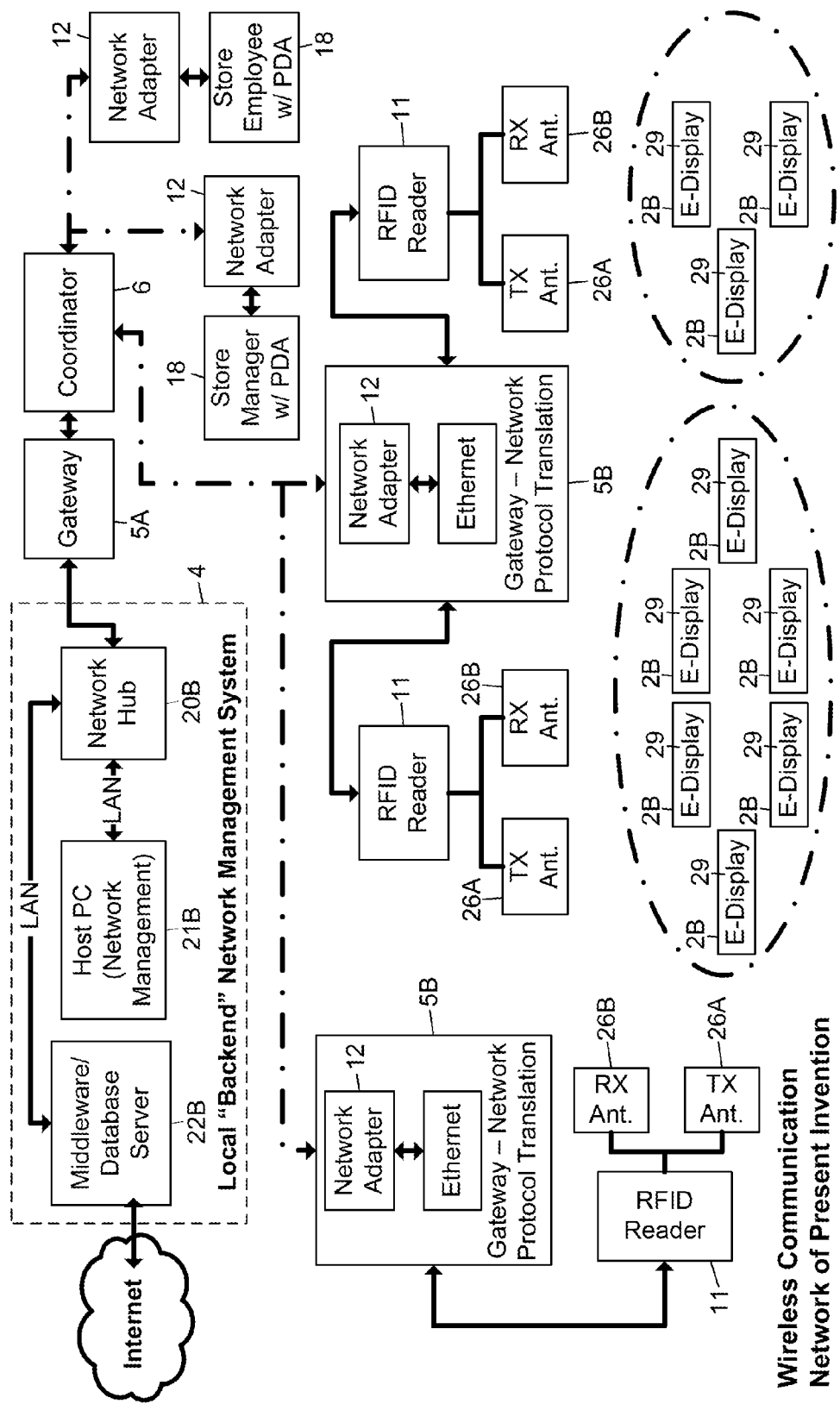
FIG. 1B is a schematic representation of a first illustrative embodiment of the wireless communication network of the present invention, as illustrated in FIGS. 1A1 and 1A2, showing only the back-end system being wirelessly interfaced with the plurality of RFID readers, electronic-ink display devices and wireless/mobile PDA and terminals using (i) a gateway device supporting USB to ZigBee communication protocol translation, (ii) a network coordinator (i.e. network controller), (iii) one or more routers, and (iv) a plurality of gateway devices, each supporting network communication protocol translation.

Referring to the figures in the accompanying Drawings, the various illustrative embodiments of the wireless communication network and components of the present invention will be described in great detail, wherein like elements will be indicated using like reference numerals.

Overview on the Wireless Communication Networks of the Present Invention

In general, the wireless communication networks of the present invention rely on a wireless communication infrastructure for managing the population of wireless electronic-ink display devices in any given installation. However, the wireless communication network of the present invention is not limited to managing electronic-ink display devices as disclosed in copending U.S. application Ser. No. 12/154,427, incorporated herein by reference, and may support wireless sensors, controllers, data capture devices, checkout systems, supply chain systems and employee support devices such as PDAs with wireless connectivity.

Also, the wireless communication network of the present invention will typically serve as a platform for managing any size population of electronic-ink display devices, and other networked end-devices, deployed in either retail, industrial and/or manufacturing spaces. Such electronic-ink display devices may include, for example, electronic-ink display tags, display devices, and display labels, as well as pricing signs for retail environments, assembly instruction displays for manufacturing environments, display signs for educational environments, electronic-ink dinner menus for use in restaurants, and the like.

In the preferred embodiments, the wireless communication network of the present invention is designed as a low-power, low data-rate (e.g. 250 kilobits/second) wireless network, employing a mesh topology to interconnect a plurality of wireless devices, wherein each wireless device can access any other wireless device on the network, given proper access rights and permission. Also, in the preferred embodiments of the present invention, the wireless electronic-ink display devices may be mounted on the wall, leaned up against a building or housing structure, attached to a mobile vehicle, or passed around the room, and typically will include a battery power source and an electromagnetic antenna structure designed for 2-way RF data communication, so as to be generally free of power cords and electrical wires.

The wireless communication network of the present invention bridges the gap between wireless display networks, wireless sensor networks, and the worlds of passive, active and partially-active RFID and real-time locating systems (RTLS). The wireless communication network of the present invention allows conventional communication network protocols to operate in more flexible ways in dynamic, diverse, and heterogeneous application environments, in the fields including retail, healthcare, transport, logistics, manufacturing, education, etc. At the same time, the wireless communication network of the present invention is preferably based on the IEEE 802.15.4 network layer standard, which offers low-cost wireless network communication between a large number of wireless network end-devices.

In the wireless communication networks of the present invention, the IEEE 802.15.4 is not a complete network protocol stack, as it only provides the lower level network layers (in the OSI reference model the physical layer and the medium access layer). And while the ZigBee wireless network communication protocol suite is also based on the IEEE 802.15.4 standard, the wireless communication network application of the present invention will be implemented upon and share a number of features with the ZigBee network communication protocol suite, such as typically operating at the globally available 2.4 GHz bandwidth and provide a data rate of 250 Kbits/second. However, despite their common foundation (i.e. IEEE 802.15.4 standard), wireless communication network configured according to the principles of the present invention has been designed for applications more robust and diverse than conventional ZigBee wireless networks, and as a result, the wireless communication network configured according to the principles of the present invention provides a more advanced and complex set of features and functionalities, to be described in great detail hereinafter.

For example, other preferred networking technologies such as UHF RFID communication techniques, can be used in combination with the IEEE 802.15.4 network protocol, in order to practice various illustrative embodiments of the wireless communication networks of the present invention, which are characterized by flexibility and robustness, while masking the underlying operation of the communication network from its end-users, to reduce the apparent complexity and provide a better end-user experience.

Designed for large-scale deployment with many potential network nodes arranged over a large region of physical space, wireless communication networks configured according to the principles of the present invention can also be equipped with a real-time location system (RTLS) capabilities, which may be implemented using (i) a local GPS system for generating GPS reference signals, and a GPS module embedded in each wireless network device for receiving and processing these GPS reference signals, and/or (ii) position location module embedded within each wireless device, implementing a position location algorithm that detects and analyzes the RSSI of data packet signals transmitted from pairs of wireless network routers deployed in the wireless communication network, and/or some other similar technology.

The details of such aspects of the present invention will now be described in greater detail hereinafter.

Figure 1C:
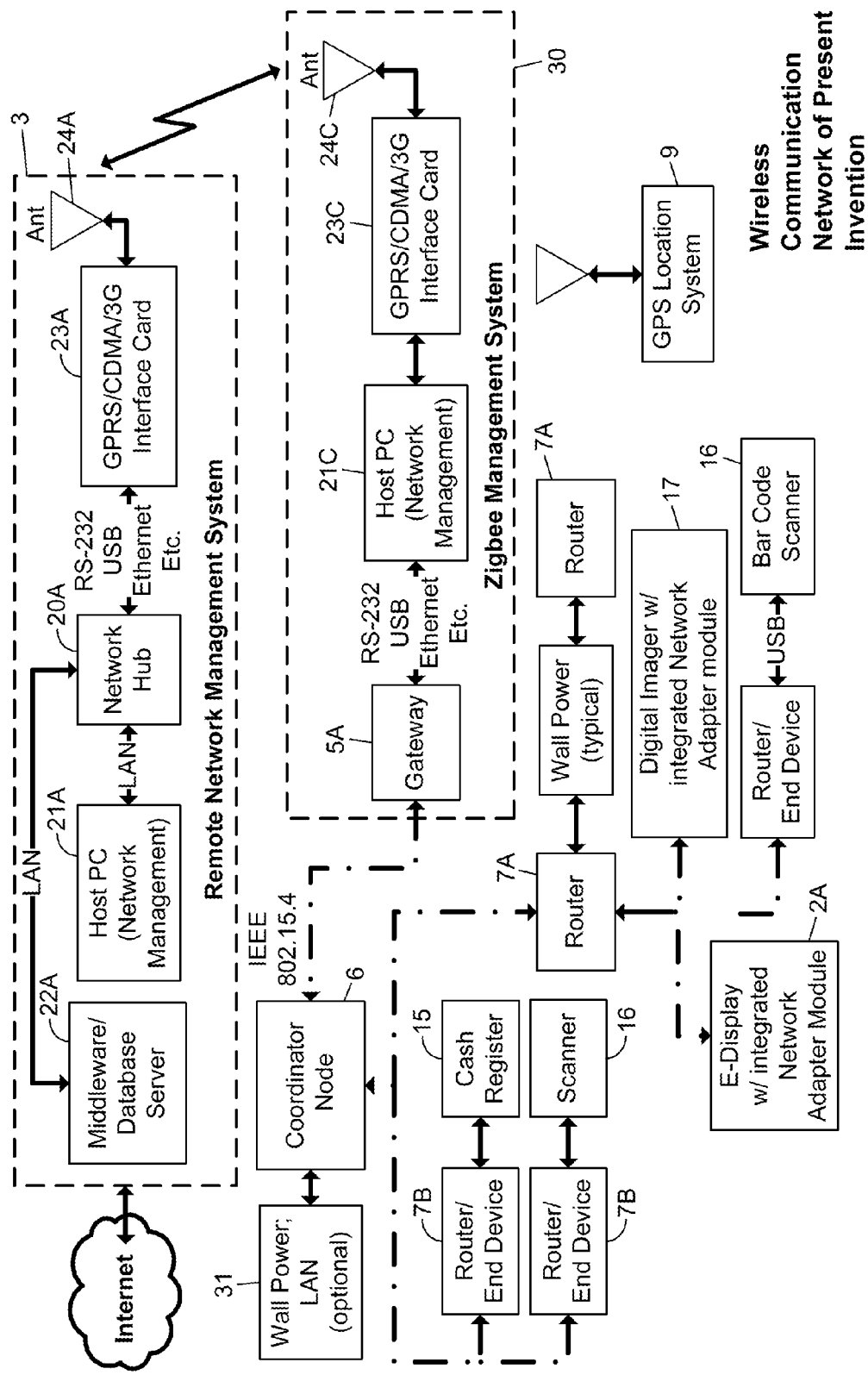
FIG. 1C is a schematic representation of a first illustrative embodiment of the wireless communication network of the present invention, as illustrated in FIGS. 1A1 and 1A2, showing the remote PC-level network management system being wirelessly interfaced with a local PC-level network management system employing network communication protocol translation capabilities, for communicating with a plurality of electronic-ink display devices, cash registers, wireless/mobile terminals, bar code readers and digital imagers using (i) a gateway device supporting USB to ZigBee communication protocol translation, (ii) a network coordinator (i.e. network controller), and (iii) one or more wireless network router devices.
Figure 2:
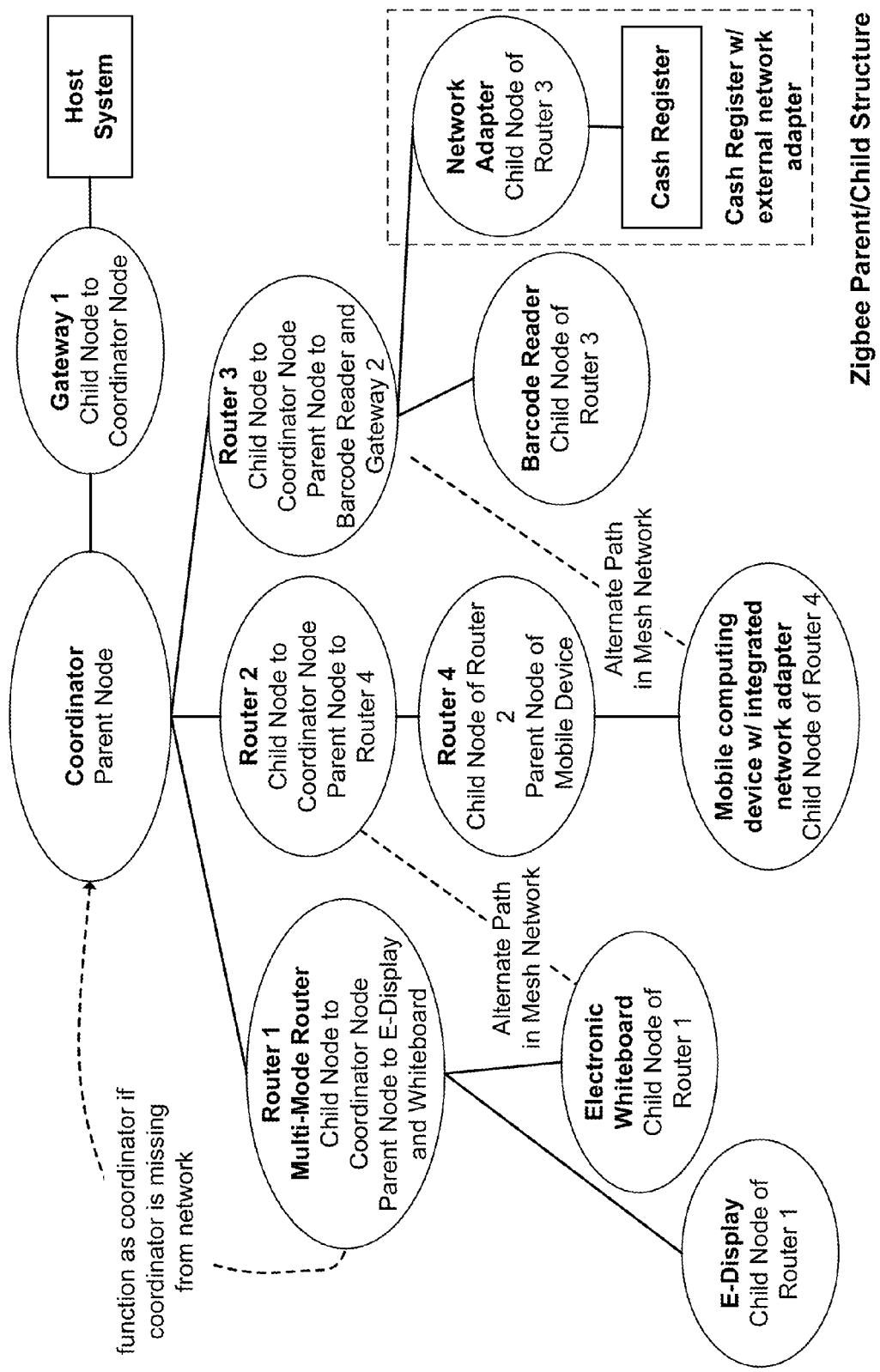
Figure 5A:
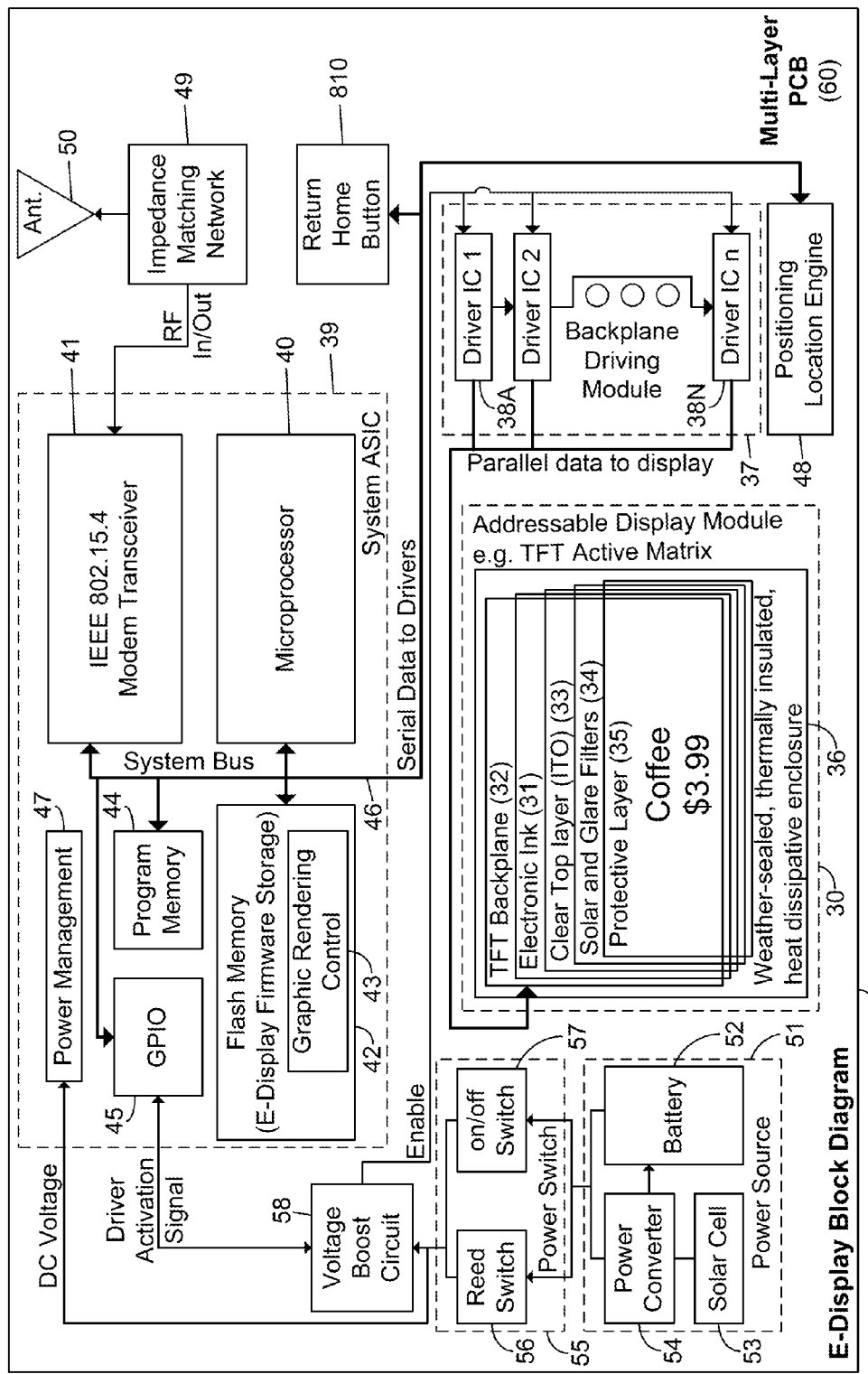
FIG. 5A is a schematic representation of a wireless electronic-ink based display device of the present invention having IEEE 802.15.4 wireless networking capabilities, and shown comprising an addressable electronic-ink based display module (e.g. employing a TFT-driven backplane structure) packaged within weather-sealed, thermally-insulated and heat-dissipative enclose/packaging in accordance with the principles of the present invention.
Figure 5B:
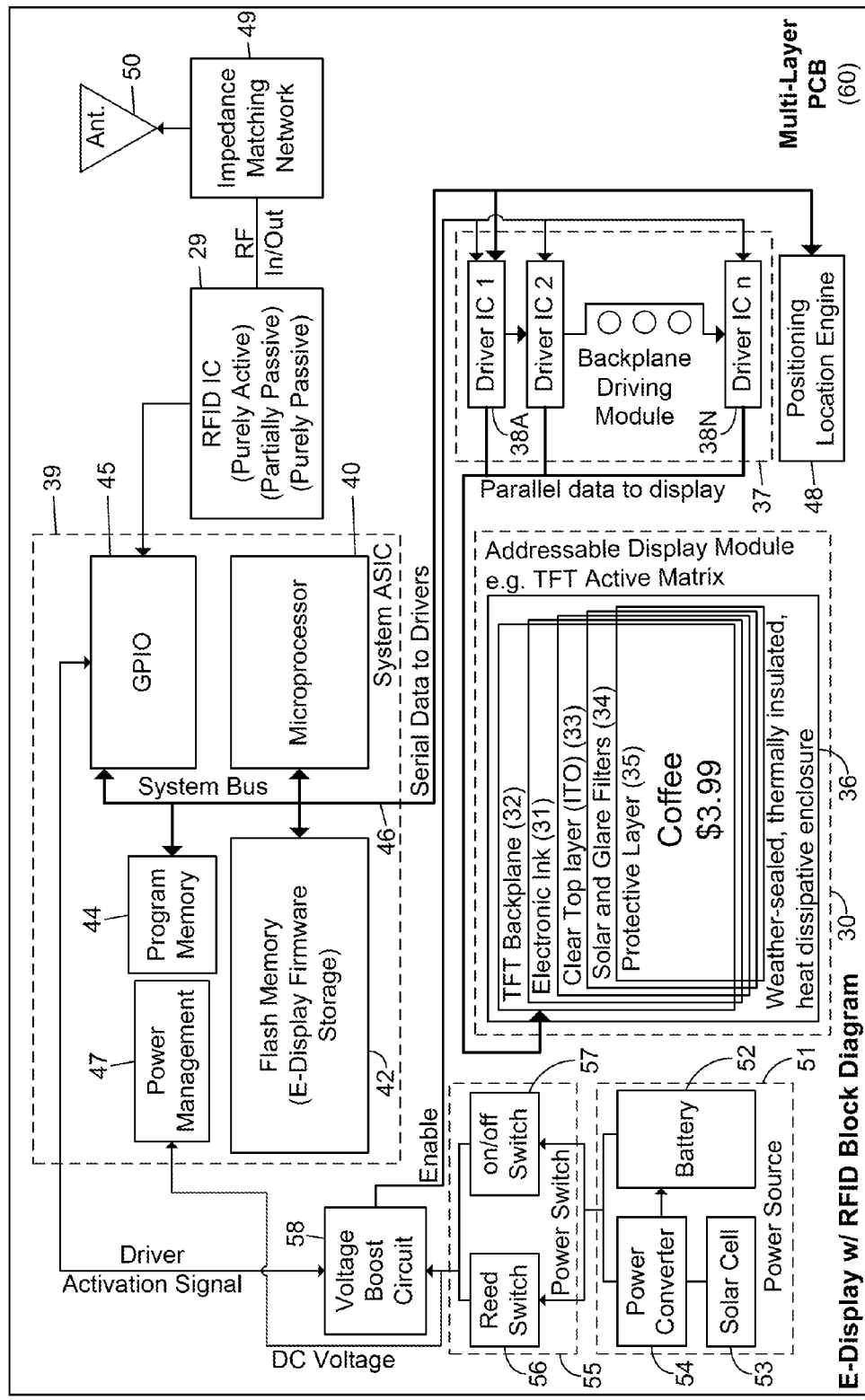
FIG. 5B is a schematic representation of a wireless electronic-ink based display device of the present invention provided with RFID-based wireless communication/programming capabilities, and shown comprising an addressable electronic-ink based display module (e.g. employing a TFT-driven backplane structure) packaged within weather-sealed, thermally-insulated and heat-dissipative enclose/packaging in accordance with the principles of the present invention.
Figure 5C:
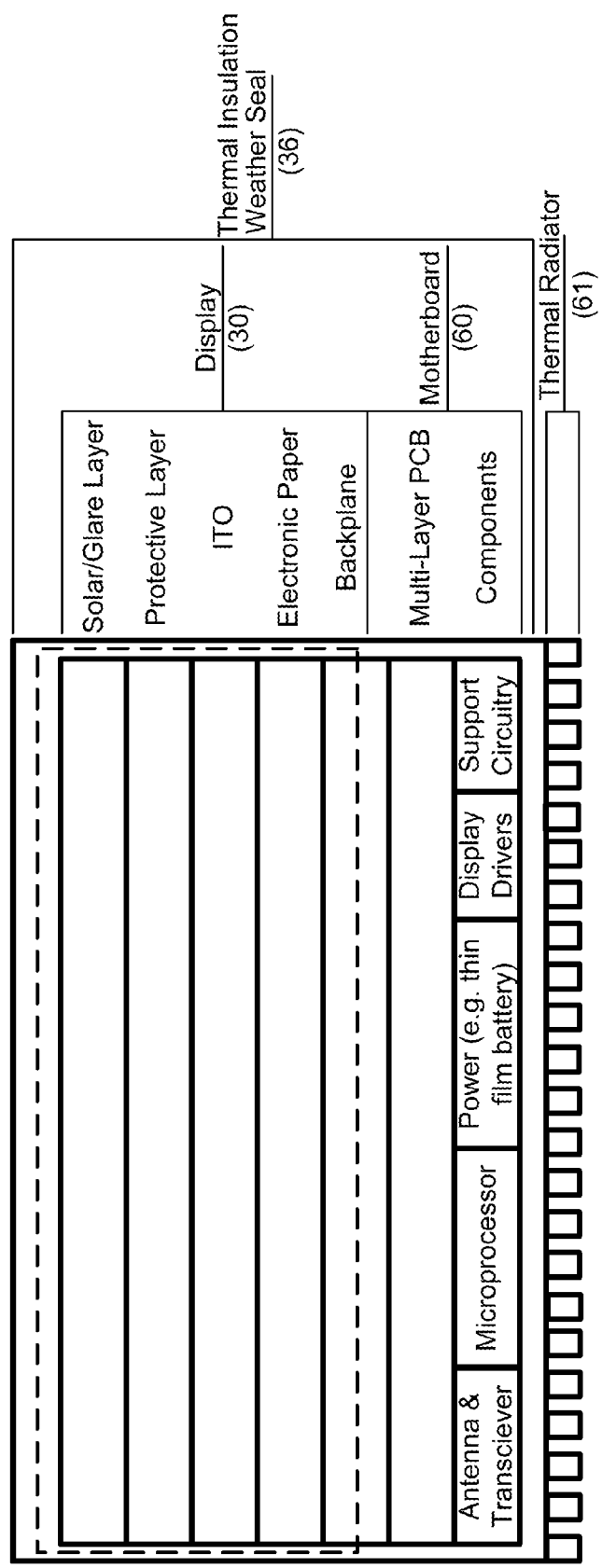
FIG. 5C is a cross-sectional schematic representation of the wireless electronic-based display device of the present invention, depicted in FIGS. 5A and 5B, and showing its stacked display architecture in accordance with the principles of the present invention.

First Illustrative Embodiment of the Wireless Communication Network of the Present Invention As illustrated in FIGS. 1A1 and 1A2, a first illustrative embodiment of the wireless communication network of the present invention 1 for remotely and/or local programming and monitoring a plurality of wireless network devices, including a plurality of wireless electronic-ink based display devices 2A, deployed in diverse environments, using the IEEE 802.15.4 wireless network layer protocol. As shown, a remote network management system 3 is wirelessly interfaced with a local network management system 4 using, for example, a WAN-LAN communication protocol adapter interface card 23A, 23B and RF antenna 24A, 24B. Also, the local network management system 4, includes a microprocessor and memory architecture, and is wirelessly interfaced with the plurality of network devices comprising: a gateway device 5; a network coordinator (i.e. network controller) 6; a plurality of network packet routers 7A through 7C; one or more network monitoring devices 8; a GPS location system 9: a node position tracking (NPT) module 10; a plurality of RFID readers 11 each having an integrated network communication protocol adapter 12; a plurality of wireless electronic-ink based display devices (e.g. labels, signs, tags, displays, etc) 2A through 2D as shown in FIGS. 5A and 5C, each with an integrated network communication protocol adapter 12 and a GPS module 13; a plurality of (partially-passive) wireless electronic-ink displays with RFID chips 14 as shown in FIGS. 5B and 5C; a plurality of cash registers 15 each with a network adapter 12; a plurality of scanners 16 each with a network adapter 12; a plurality of digital imagers 17 each with a network communication protocol adapter 12; and a plurality of wireless/mobile PDA and terminals 18 each being provided with a network adapter 12; Each of these network components will be described in greater detail hereinafter.

In the illustrative embodiment, the network adapter/interface card 23B and the network communication hub 20B in the local network management computer system 4 are coupled to a first communication medium (e.g. Cat5 cable), and support a wired communication interface (e.g. serial port). The local network management computer system 4 has a microprocessor, with a memory architecture, arranged in communication with the wired communication interface (e.g. serial port) coupled to the communication medium (e.g. Cat5 cable), and supporting the transmission and reception of data packets over the wireless communication network so as to allow a human operator (or programmed machine) to program messages to be displayed on wireless electronic-ink based display devices, operably connected to the wireless communication network. The function of network adapter/interface card 23B is to support a WAN wireless communication interface (e.g. RF antenna) matched to the WAN wireless communication interface (e.g. RF antenna) that is supported by the network adapter/interface card 23A, and support the transmission and reception of data packets between the remote and network management computer systems 21A and 21B, respectively.

The network adapter/interface card 23A and network communication hub 20A in the remote network management computer system 3 are coupled to a communication medium (e.g. Cat5 cable) and support a wired communication interface (e.g. serial port). The remote network management computer system 3 also allows a human operator (or programmed machine) to program messages to be displayed on the plurality of wireless electronic-ink based display devices, operably connected to the wireless communication network. The function of network adapter/interface card 23A is to support a WAN wireless communication interface (e.g. RF antenna) matched to the WAN wireless communication interface (e.g. RF antenna) that is supported by the network adapter/interface card 23B, and supports the transmission and reception of data packets between the remote and network management computer systems 21A and 21B, respectively.

The microprocessor in the remote network management computer system 21A is capable of (i) receiving and transmitting data packets over the wireless free-space communication medium (between the RF antennas 24A, 25B of network interface adapters 23A, 23B respectively) to the microprocessor in the local network management computer system 4, using the WAN wireless communication interface and the set of WAN wireless communication protocols (e.g. IP protocol associated with GPRS, CDMA (2G) and 3G wireless data communication technologies).

The function of network gateway device 5 is to supports a wired communication interface (e.g. serial port) and is coupled to a wired communication medium (e.g. Cat5 cable) through a wired communication interface (e.g. USB, serial). Network gateway 5 is also capable of receiving and transmitting data packets over wired communication medium and communicating with the local network management computer system 4 using the wired communication interface and the set of communication protocols (e.g. USB, including the IP). The network gateway device 5 also supports a wireless communication interface (e.g. RF antenna) and is capable of transmitting and receiving data packets over a wireless free-space communication medium using the wireless communication interface (e.g. RF antenna) and a set of wireless communication protocols (e.g. IEEE 802.15.4, ZigBee or custom suite).

The function of each wireless network router 7A is to support a wireless communication interface (e.g. the RF antenna) interfaced with wireless free-space communication medium using the wireless communication interface and set of wireless communication protocols (e.g. IEEE 802.15.4, ZigBee or custom suite), and to receive and transmit data packets over the wireless free-space communication medium.

Each network-managed device (e.g. wireless electronic-ink based display device) has a programmed processor, with memory, and a network adapter supporting the wireless communication interface (e.g. RF antenna) and receiving and transmitting data packets over the wireless free-space communication medium using the wireless communication interface and the set of wireless communication protocols (e.g. IEEE 802.15.4, ZigBee or custom suite). Some network-managed devices, including an external interface adapter, will also support a wired communication interface (e.g. serial port) and capable of transmitting and receiving data packets over a wired communication medium (e.g. cable) using a wired communication interface and a set of communication protocols (e.g. USB, RS232, including the Internet Protocol IP), so that the data packets can be accessed and used by programmed processor in each network-managed end-device.

The function of the network coordinator/controller 6 is to support the wireless communication interface of its network (e.g. RF antenna) and transmission and reception of data packets over the wireless free-space communication medium using the wireless communication interface and the set of wireless network communication protocols (e.g. IEEE 802.15.4, ZigBee or custom communication protocol suite). The network controller also establishes and maintains a wireless interconnected mesh of the wireless network routers, according to the wireless network layer protocol, and interconnecting the plurality of wireless electronic-ink display devices and other network-managed end-devices on the wireless communication network.

In FIG. 1B, the local network management subsystem portion 4 of the wireless communication network of FIGS. 1A1 and 1A2 is shown comprising one or more wireless/mobile PDA and terminals 18, and a wireless subnetwork gateway 5B providing a communication interface to a plurality of UHF RFID readers 11, and electronic-ink display devices 12. As shown, the back-end network 4 comprises a hub network 20B, a host PC-level computer system 21B for network management, and an application and database server 22B, each operable connected to the infrastructure of the Internet.

Any third-party local or remote computing system 21A, 21B can be integrated with the wireless electronic-ink display signage network of FIGS. 1A1 and 1A2, and configured in a manner described below, to manage messages displayed on particular electronic-ink display devices deployed on the wireless communication network.

In the illustrative embodiment of the present invention, the computer system 21A in the remote network management system 3, and/or the computer system 21A in the local back-end network management system 4, can be used to manage messages displayed on particular electronic-ink display devices deployed on the wireless communication network of FIGS. 1A1 and 1A2. Such local/remote message management capabilities are achieved by:

(i) installing a GPRS/CDMA/3G interface card 23A, 23B into the network management computer system 3, 4 respectively;

(ii) installing an electronic-ink display messaging management application 700 on the host PC network management computer systems 21A and 21B; and (iii) optionally installing RDBMS software on the middleware/database server 22A, 22B, respectively, in the event that the application 700 is not provided with sufficient onboard database capabilities, or in the event that network database capabilities are required or preferred for the application at hand.

Each GPRS/CDMA/3G interface card 23A and 23B comprises: (i) circuitry and apparatus for supporting one or more local area type network interfaces such as Ethernet, WIFI, RS-232 and/or USB to establish a network interface with the remote or local computing network, as the case may be; (ii) circuitry for supporting one or more wireless wide-area type interfaces such as GPRS, CDMA and/or 3G, as the application may require; and (iii) apparatus for providing connections to sources of electrical power such as 120 VAC and/or backup sources of VDC power.

Each PC-level network management system 21A, 21B, equipped with display messaging management application 700 installed on its memory architecture, is also be provided with drivers that support (i) communication with interface GPRS/CDMA/3G interface card 23A and 23B, respectively, and (ii) database calls to either the local database integrated within the messaging management application 700, or to the RDBMS program stored on the middleware/database servers 22A, 22B, respectively.

Figure 10A:
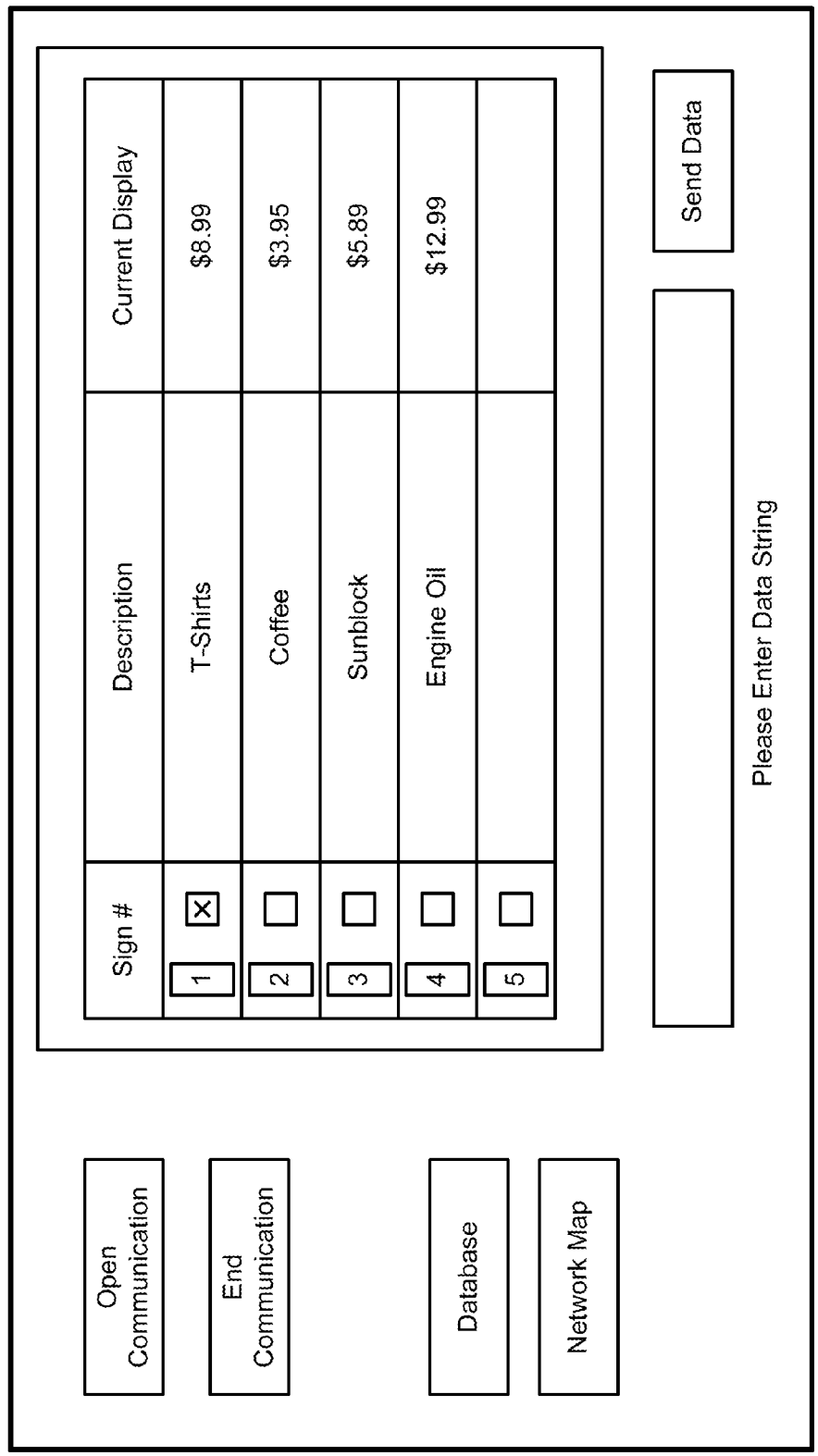
FIG. 10A is a schematic representation of an exemplary graphical user interface (GUI) allowing a network administrator to remotely manage, via a Web browser, the messaging programmed in each wireless electronic-ink display device on the wireless network, along with its sign/display identification number, and description, as well as the network map, open communication port, end communication port, and the wireless network database.
Figure 10B:
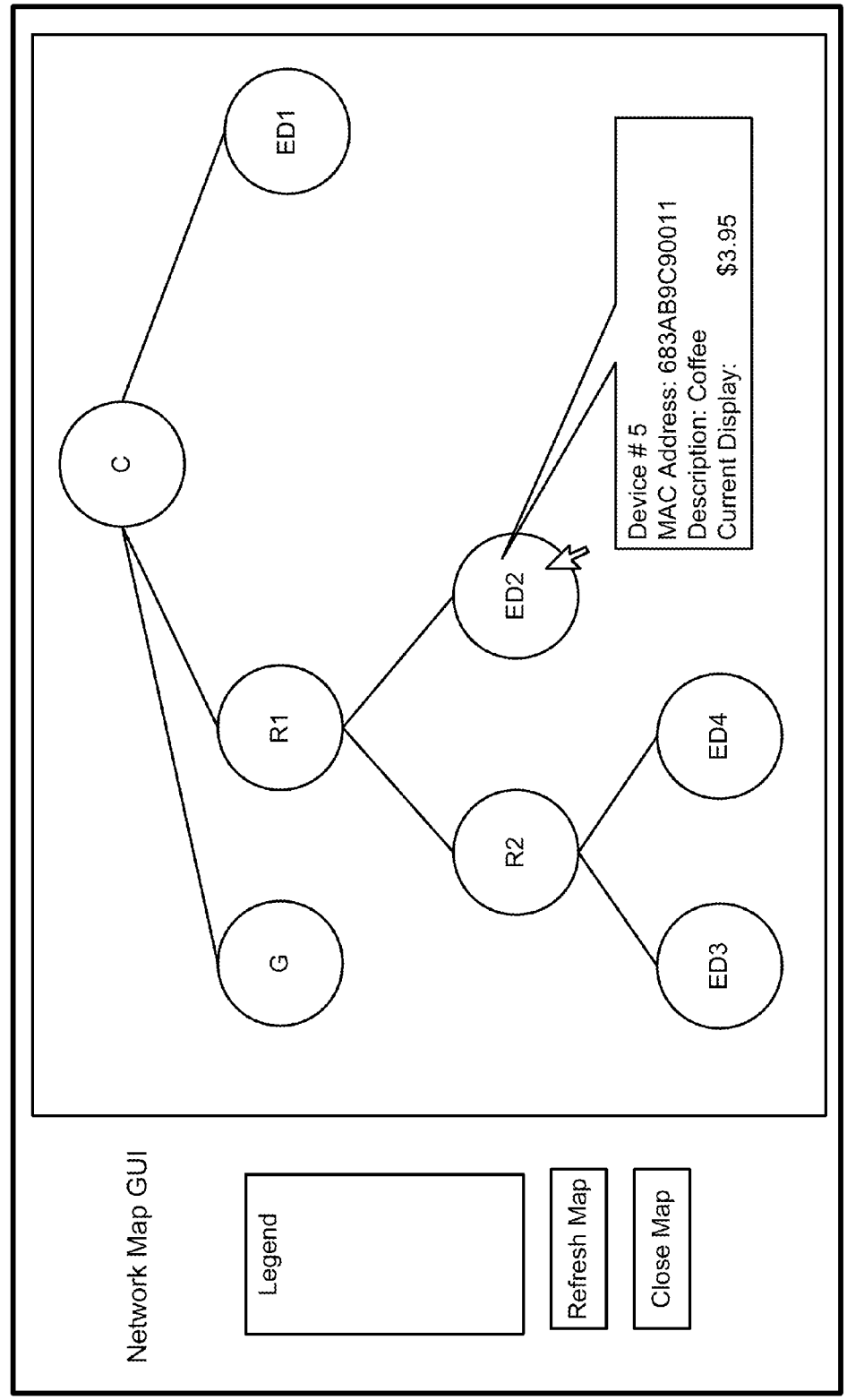
FIG. 10B is a schematic representation of an exemplary graphical user interface (GUI) allowing a network administrator to remotely manage, via a Web browser, the tables in the wireless network database, holding information on each network device, including, device number on the wireless network (e.g. 0000002030), device type (e.g. wireless coordinator, gateway, router, end device, etc.), MAC address assigned to device (e.g. 683AB9C90011), description of device/association with other devices, currently programmed message for display on the device.

The electronic-ink display messaging management application 700 supports GUIs as shown in FIGS. 10A, 10B and 10C, and the network monitoring functions as illustrated in FIGS. 10D through 10H, to be described in greater detail hereinafter.

As shown in FIG. 1B, a plurality of RFID readers 11 are networked via an Ethernet network connection to a host PC-level system 21B for managing a population of RFID-networked wireless electronic-ink display signs 2B. The wireless communication network of the present invention can be enhanced with WI-FI connections so that managers and employees of the store can gain remote access to the host PC system 21B using wireless PDA-like devices 18, providing access to and manipulation of messaging displayed on any of the wireless electronic-ink display devices deployed on the wireless communication network of the present invention.

As shown in FIG. 1B, the primary network gateway device 5A supporting USB to ZigBee communication protocol translation, is connected to the network hub 20B. In turn, the network gateway device 5 is wirelessly connected to the coordinator device 6, and the coordinator device 6 is wirelessly connected to a plurality of subnetwork gateways 5B, each supporting IEEE 802.15.4 to Ethernet network protocol translation.

As shown in FIG. 1B, each subnetwork gateway 6B includes a network adapter 12 translating from the IEEE 802.15.4 protocol to the Ethernet network protocol, and interfacing with the RFID reader 11 having two dipole antennas 26A, 22B connected via coaxial cable, one for signal transmission and one for signal reception. The RFID reader 11 supports wireless communication with a plurality of wireless electronic-ink display devices 2A, as shown in FIGS. 5B and 5C, and each having an RFID IC 29 mounted on its motherboard and containing information representative of an unique identifier (e.g. electronic UPC number or the like).

In the illustrative embodiment, the EPC Gen2 Class3 protocol is selected for enabling communication between the RFID reader 11 and the RFID ICs 29. The EPC Gen2 Class3 protocol is based on UHF RFID technology operating in the US ISM 902-928 MHz band (968 MHz band in EU). To update the price on any electronic-ink display device, the host system 21B sends an update command over the wireless communication network to activate the RFID reader nearby the particular wireless electronic-ink display device 2B. In response, the RFID reader 11 receives the update command, and then interrogates the RFID ICs in its field of view, for the corresponding unique identifier. When the RFID reader 11 finds the correct identifier, it writes the new price to the internal memory of the RFID IC 29. Thereafter, the programmed microprocessor on the motherboard takes control, and updates the graphical information displayed on the electronic-ink display assembly.

As shown in FIG. 1B, the wireless network 1B includes a plurality of wireless PDAs 18, each having a network adapter 12, and being operated by a store manager.

In FIG. 1C, the remote network management system portion 3 of the wireless communication network of FIGS. 1A1 and 1A2 is shown comprising a GPRS/CDMA/3G interface card 23A with an antenna, a network hub 20A connected to the interface card via RS-232, USB, Ethernet etc, and a PC-level host computer 21A and an application and database server 22A. The remote network management system 3 is wirelessly interfaced with a ZigBee network management system 30 comprising a GPRS/CDMA/3G interface card 23, connected to a local PC-level network management system 21C, which is connected to a network gateway device 5A via RS-232, USB, Ethernet etc. The gateway 5A is in wireless communication with the network coordinator 6 that can be powered by wall-supplied electrical power. The function of this coordinator device is to establish a wireless mesh network according to the IEEE 802.15.4 networking protocol. The coordinator 6 sets up a mesh of interconnected network routers 7A engulfing a plurality of electronic-ink display devices 2A, as shown in FIGS. 5A and 5B, and other end-devices such as cash registers 15, scanners 16, digital imagers 17, and wireless PDAs 18.

The remote management system 3 updates electronic-ink display devices 2A by accessing the wireless network and sending an update command to the respective electronic-ink device via the gateway device 5A. The host PC system 21C, running display management application 700, addresses the individual electronic-ink display device (e-display) by way of its MAC address and sends a data packet containing the information to be updated on the electronic-ink display device 2A. Once the data packet is sent to the gateway 5A, the network routers takes over and route the data packets associated with the message, to the desired electronic-ink display device in a manner transparent to the user.

In most retail environments in which the wireless communication network of the present invention is deployed, the host computer 21A, 21B and/or 21C can serve as the backbone for the retail back-end system operations. In general, host computer system 21A, 21B and/or 21C coordinates the flow of information from the retail store's local database 22A and across the wireless communication network. The local database 22A typically contains information about each product including the product's UPC, description, price and quantity available in stock. Events occurring on the wireless network may be tracked by the host controller and reflected in the database as needed. This process works in the reverse as well. An external connection made to the back-end system, via the Internet, enables off-site remote access to both the database 22B and the wireless network 1, shown in FIGS. 1A1 and 1A2. For example, using the wireless communication network of the present invention, a chain of shoe stores can be managed from a central location containing a global database of all the products and prices. This information can be sent over the Internet to back-end system 4 deployed in each individual store in the chain. The local host computer 21B may then transfer this information across the wireless network. Once destined for the wireless network, individual electronic-ink product pricing signs can be addressed and updated to reflect the price information for the particular product maintained in the global database.

Preferably, wall-to-wall wireless coverage will be implemented in most applications, to maintain each electronic-ink display device visible on the wireless communication network. In the inevitable event that a network access point goes down on the wireless network, the wireless communication network of the present invention will automatically ensure that data packets destined to all devices in that failed region of the space are automatically re-routed to another access point so that continuous network operation is maintained.

The Wireless Communication Network of the Present Invention Having Routers That Can Function as the Network Coordinator In FIG. 2, the parent/child relationship of each node in the wireless communication network of the present invention graphically illustrates that any one of the routers in the network can function as the network coordinator, in the event the assigned network coordinator either fails or instructs another router to carry out its network coordination/control functions. This inventive feature provides the wireless network of the present invention with increased flexibility, and improved redundancy, as will be explained in greater detail hereinafter.

In accordance with convention, specification of communication systems, networks and components is made using the Open Systems Interconnection (OSI) model. Notably, however, the OSI model does not provide specific methods of communication, and therefore, actual communication is defined by the various communication protocols employed in any given communication system/network. In the context of data communication, a network protocol is a formal set of rules, conventions and data structures that governs how computers and other network devices exchange information over a communication network.

In modern protocol design, network protocols are "layered" according to the OSI 7 layer model. The OSI 7 layer model begins by defining the communications process into 7 layers, and then divides the tasks involved with moving information between networked devices into seven smaller, more manageable task groups. A task or group of tasks is then assigned to each of the seven OSI layers. Each layer is self-contained so that the tasks assigned to each layer can be implemented independently. This enables the solutions offered by one layer to be updated without adversely affecting the other layers.

The seven layers of the OSI model can be divided into two groups: upper layers (layers 7, 6 & 5) and lower layers (layers 4, 3, 2, 1). The upper layers of the OSI model address end-to-end communications between data source and destinations, and application issues, and generally are implemented only in software. The highest layer, the application layer, is closest to the end user. The lower layers of the OSI model address communications between network devices and handle data transport issues. The physical layer and the data link layer are implemented in hardware and software. The lowest layer, the physical layer, is closest to the physical network medium (e.g. wires, or free-space, for example) and is responsible for placing data on the medium.

The specific description for each layer is as follows:

Layer 6, the Presentation Layer, masks the differences of data formats between dissimilar systems; specifies architecture-independent data transfer format; encodes and decodes data; encrypts and decrypts data; and compresses and decompresses data.

Layer 5, the Session Layer, manages user sessions and dialogues, controls establishment and termination of logic links between users, and reports upper layer errors.

Layer 4, the Transport Layer, manages end-to-end message delivery in network; provides reliable and sequential packet delivery through error recovery and flow control mechanisms; and provides connectionless oriented packet delivery.

Layer 3, the Network (NWK) Layer, determines how data are transferred between network devices; routes packets according to unique network device addresses; and provides flow and congestion control to prevent network resource depletion.

Layer 2, the Medium Access Control MAC (i.e. Data Link) Layer, defines procedures for operating the communication links; frames data packets; detects and corrects data packets transmit errors.

Layer 1, the Physical (PHY) Layer, defines physical means of sending data over network devices; interfaces between network medium and devices; and defines optical, electrical and mechanical characteristics.

Further details regarding these layers can be found in "Introduction to Wireless Systems" (2008) by Bruce A. Black, et al, published by Prentice-Hall, and incorporated herein by reference.

Today, a wide variety of network communication protocols exists, and each is defined by many standard organizations worldwide and technology vendors over years of technology evolution and developments. One of the most popular protocol suites is TCP/IP, which is the heart of Internetworking communications. The IP, the Internet Protocol, is responsible for exchanging information between routers so that the routers can select the proper path for network traffic, while TCP is responsible to ensure the data packets are transmitted across the network reliably and error free. LAN and WAN protocols are also critical protocols in the network communications. LAN protocols suite is for the physical and data link layers communications over various LAN media such as Ethernet wires and wireless waves. WAN protocol suite is for the lowest three layers and defines communication over various wide-area media such as fiber optic and cable.

Network protocols for data communication cover all areas defined in the OSI model. However, a protocol may perform the functions of one or more of the OSI layers. Often, a group of protocols are required in the same layer, or across many different layers. Different protocols often describe different aspects of a single communication, and when taken together, these protocols form a protocol suite. Protocols can be grouped into suites (or families, or stacks) by their technical functions, or origin of the protocol introduction, or both. A protocol may belong to one or multiple protocol suites, depends on how they are categorized. Protocols can be implemented either in hardware or software, or a mixture of both. Typically, only the lower layers are implemented in hardware, with the higher layers being implemented in software.

Figure 3:
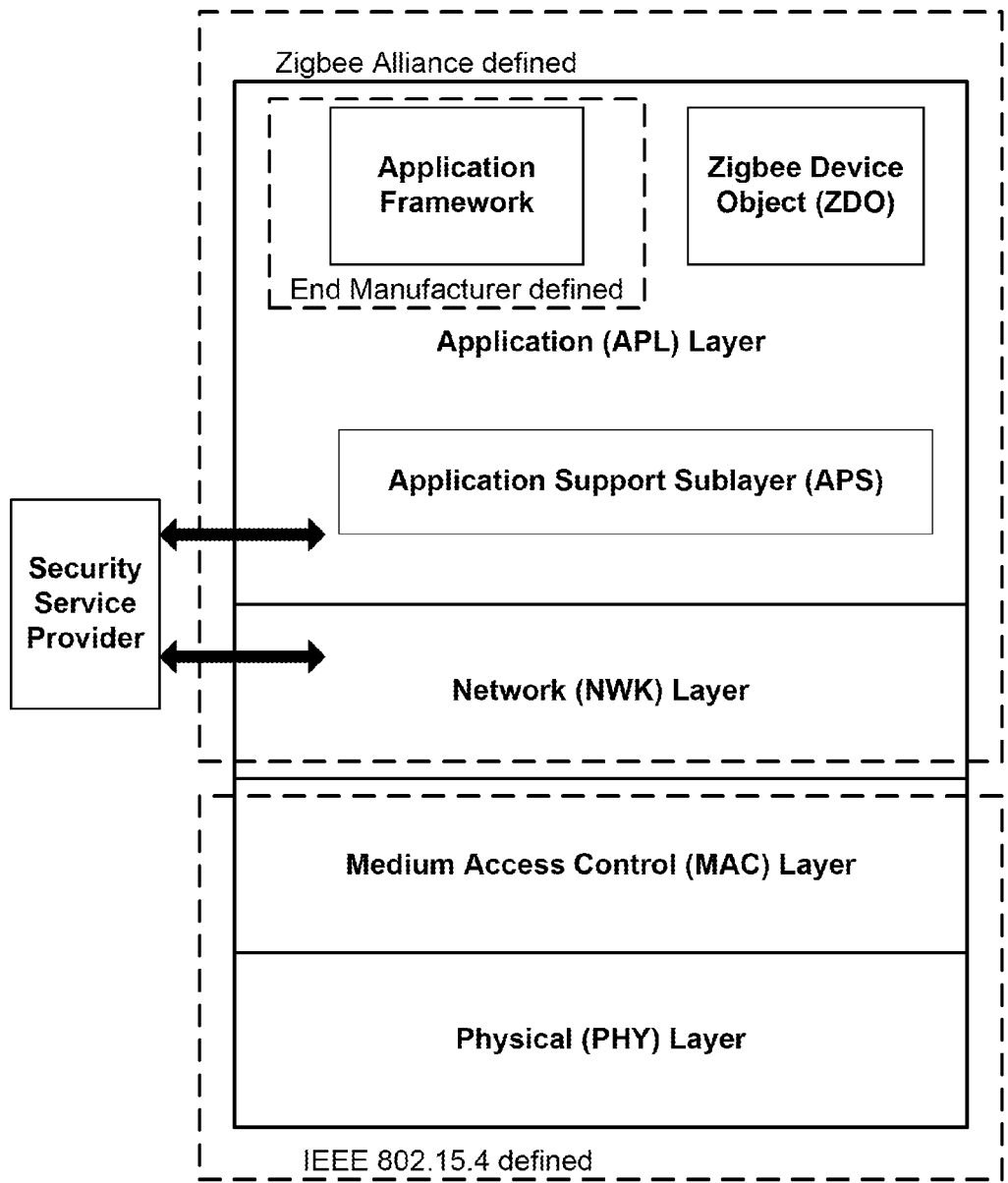
FIG. 3 is a schematic representation, in the form of a stacked block diagram, illustrating the different layers associated with the IEEE 802.15.4 wireless networking protocol employed in the wireless communication network of the present invention, schematically represented in accordance with the Open Standards Interconnect (OSI) model, showing the Application (APL) Layer, the Network (NWK) Layer, the Medium Access Control (MAC) Layer, and the Physical (PHY) Layer of the OSI Model.

In FIG. 3, the different layers associated with the ZigBee IEEE 802.15.4 network protocol stack are shown as comprising: the Application (APL) Layer, the Network (NWK) Layer, the Medium Access Control (MAC) Layer, and the Physical (PHY) Layer of the OSI 7 Layer Model. The other OSI 7 layers have not been represented to simplify explication. The ZigBee Network Layer protocol depends on the IEEE 802.15.4 standard, which forms the bottom two layers of the stack, namely: the PHY layer which describes the hardware required for communication at the IC and systems levels; and the MAC layer which describes the network addressing scheme.

Preferably, the wireless communication network of the illustrative embodiments is based on IEEE 802.15.4 standard, which operates in the 2.45 GHz ISM band along with Bluetooth and Wi-Fi. The IEEE 802.15.4 standard supports a low power (0 dBm typical), low data rate (250 kb/s) wireless mesh networking technology utilizing direct-sequence spread spectrum (DSSS) coding. This standard supports sixteen channels (11 to 26) ranging from 2.405 to 2.48 GHz, each spaced 5 MHz apart. Channels 15, 20, 25 and 26 are preferred because they mitigate the susceptibility of interference from Wi-Fi networks. The transmission range is somewhere between 10 and 75 meters, with 30 meters being typical.

In the illustrative embodiment, on top of the IEEE 802.15.4 PHY and MAC layers reside the NWK and APL layers, as defined by the ZigBee Alliance. The NWK layer contains the software necessary to implement mesh networking. The APL layer describes the function of devices such as coordinator, router, etc. It is on the APL layer that an end user can build their own custom application to operate on the wireless network of the present invention. Also, a security layer can be implemented between the NWK and APL layers to provide added measures of network and application security to the wireless communication network of the present invention.

Figure 4:
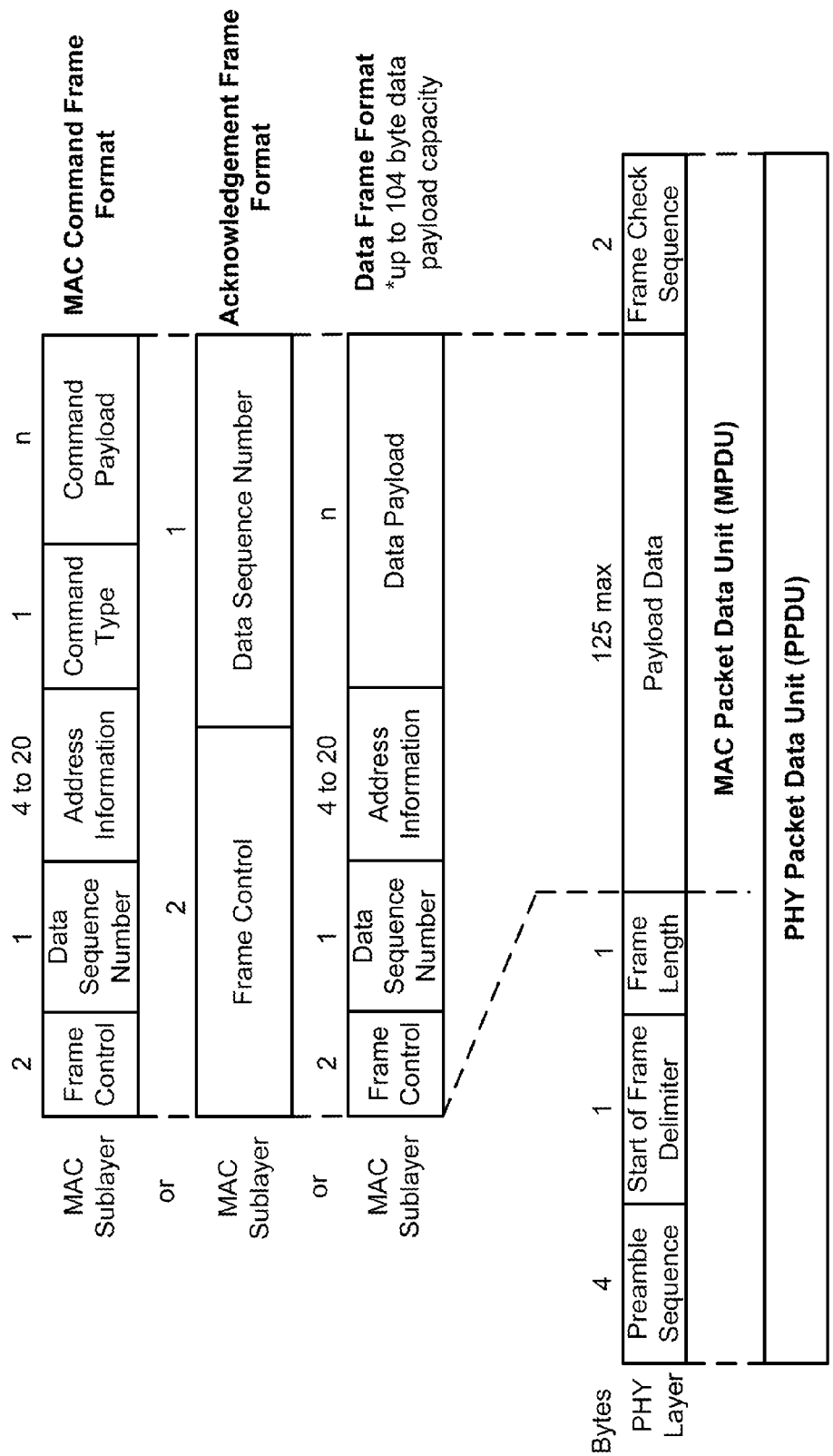
FIG. 4 is a schematic representation of the packet structure associated with the IEEE 802.15.4 wireless network layer protocol, employed in the illustrative embodiments of the wireless communication network of the present invention.

FIG. 4 describes the packet structure associated with the IEEE 802.15.4 wireless networking protocol, including the packet data frames associated with MAC Packet Data Unit (MPDU) which is required for communication between devices on the wireless communication network, namely: the MAC frame for addressing, DATA frame for data transmission, and ACKNOWLEDGEMENT frame for confirmation.

In summary, the wireless communication network of the illustrative embodiments of the present invention shown in FIGS. 1A through 1C, employs at least one network gateway 5, a wireless network coordinator/controller 6, one or more wireless end-devices (e.g. electronic-ink display devices, etc.) 2A, 2B, 2C and 2D, and wireless routers 7, communicate (i.e. transmit and receive) data packets (representing messages and commands based thereon) with each other using the IEEE 802.15.4 networking protocol suite.

In any embodiment of the wireless communication network of the present invention, the network coordinator 6 will always be the most senior parent node in the network under management, and be assigned the address '0'. All other wireless network devices then will become children of or to the coordinator node. For example, if router 1 is the child of the coordinator and it is the parent of two electronic-ink displays, then these two electronic-ink displays are grandchildren of the coordinator. Every device in the network is assigned a parent, and each device requests and receives data from its parent. Each device is also responsible for responding to its children nodes.

In the preferred embodiment, a mesh network topology is used to implement the wireless communication network of the present invention. In this network structure, the network coordinator, gateways and routers are networked together in such a way that if one of these devices goes down or fails to operate properly (other than the coordinator), then the network will automatically find another path of data packet communication. This process of network self-healing occurs completely transparent to the user. For example, using conventional wireless communication networking technology, when an employee accidentally knocks router No. 1 off-line, then both of its children electronic-ink display devices will be disconnected from the network. However, using the wireless mesh communication network of the present invention, these two electronic-ink display devices will be automatically assigned to router 2 so that network communication is uninterrupted. In order for end-devices to be registered on the mesh network by the network coordinator/controller, the end-devices must be powered on constantly, or periodically, to monitor the network via its network controller/coordinator.

During network operation, electronic-ink display devices are updated via the mesh network with commands originating from either of the PC-level network management systems 21A, 21B or 21C, or mobile portable data terminal (PDT) 18 deployed on the wireless network. As described above, the wireless network can be managed using PC-level network management system 21B or 21C via its LAN, or using PC-level network management system 21A connected to database server 22A, and WAN communication protocols, including TCP/IP and http communication protocols. In addition to electronic-ink display devices, virtually any electronic device can be affixed with a router or an end-device to gain access to the wireless mesh communication network of the present invention. Based on varying degrees of functionality, such wireless end-devices can then be accessed by the PC-level network management systems 21A, 21B and 21C. A typical example of network usage will include a clerk at a cash register 15 requesting authorization for a product return. In this use case, the manager receives the request from the cash register 15 over the wireless network on his/her wireless PDA or PDT 18. The manager can then choose to verify the request, and send the acknowledgement over the wireless mesh network back to the cash register 15. In addition, a GPS satellite system 9, or other position location tracking module/engine 10 can be implemented to track the movement and position of nodes and other items on the wireless communication network, as well be described in greater detail hereinafter.

On the wireless mesh network of the present invention, the coordinator is responsible for establishing the personal area network (PAN)). In the illustrative embodiment, this network identifier is implemented using a 16 bit value allowing for 65535 different PANs operating in the same region of physical space. At any instant in time, there is only one coordinator in the network, and all devices joining the network must communicate on the same PAN. The coordinator 6 also selects the frequency channel for digital communication. Once the PAN has been established, gateways 5, routers 7A and end-devices 2A can join the network. The gateway serves as the point for PC systems 21A, 21B and 21C, and other remote users, to gain access to the wireless communication network. The function of the routers is to extend the range of the wireless communication network. In the wireless network of the present invention, all electronic-ink display devices are end-devices on the network. FIG. 2 shows the network hierarchy known as the parent/child structure.

The Electronic-Based Display Device of the Present Invention with IEEE 802.15.4 Wireless Networking Capabilities As shown in FIG. 5A, the wireless electronic-based display device of the present invention 2A is provided with IEEE 802.15.4 wireless networking capabilities and comprises: an addressable electronic-ink based display module 30 (e.g. including a layer of bi-stable display medium (i.e. electronic ink) 31 disposed between a TFT-based backplane structure 32 and an electrically conductive optically-clear layer (ITO) 33, solar and glare filter layer 34 disposed on the ITO layer 33, and a clear protective layer 35 disposed on layer 34, provided within a weather-sealed, thermally-insulated and heat-dissipative enclose/packaging 36, a backplane driving module 37 employing a plurality of driver ICs 38A-38N); a system control module 39 including a microprocessor 40, a IEEE 802.15.4 modem transceiver 41, flash memory 42 for firmware storage and graphics rendering control 43, program memory 44, and GPIO submodule 45 integrated with a system bus 46, and a power management module 47 for managing the power levels within the device; a position location engine 48 interfaced with the system bus 46 for calculating the position of the device within the network, based on the signal strength or intensity of received signals (RSSI) transmitted from a pair of network routers; an impedance matching network 49 interfaced with the modem transceiver and a dipole antenna structure 50; a power source module 51 including an electro-chemical battery 52 (e.g. thin film micro energy cells), and solar cell 53 and associated power conversion circuitry 54; a power switching module 55 including a reed switch 56 and an ON/OFF power switch 57; and a voltage boost circuit 58 arranged between the output of the power switching module 55 and the backplane driving module 37. As shown, the microprocessor 40, IEEE 802.15.4 modem transceiver 41, flash memory 42, program memory 43, GPIO submodule 45, and power management module 47 are each realized on a system ASIC or system on a chip (SOC) supported on the multi-layer PC board 60.

The function of the reed switch 56 is to maintain an electrical OFF position so long as its release component (i.e. permanent magnet 56A) remains in contact with the body of the reed switch. When the permanent magnet 56A is removed from the reed switch body, and its magnetic field is no longer present, then the reed switch 56 is configured into its electrical ON position. This causes the electrical supply component 52, 53 or 54, arranged in series with the reed switch 56, to be actively switched into the power switching circuit 55, shown in FIG. 5A, thereby supplying an electrical voltage to the system. Once the magnet is reattached to the reed switch body, the reed switch is reconfigured back into its original electrically OFF position.

In the illustrative embodiment, the reed switch 56 is integrated into the housing of the electronic-ink display device, and the magnetic component 56A is either attached to the exterior of the housing, via magnetic forces, and may fit into a preformed slot in the housing, or in a slot in the packaging material of its shipping carton or the like. Thus, when the display device is removed from its shipping carton, the magnetic component 56A is automatically removed from its reed switch 56, causing it to be configured in its electrically ON arrangement, and thus capable of conducting electricity from the electrical power supply to the electronics aboard the display device. By virtue of the reed switching mechanism of the present invention, electrical charge leakage, drainage or discharge of the onboard battery source 52 is prevented until the electronic-ink display device is removed from its shipping container and ready for operation.

In alternative embodiments, where the reed switch of the present invention is not employed, a simple ON/OFF switch 57 can be employed to switch the electrical battery source 52, and/or other electrical power sources 53, into the electrical system of the present invention.

As shown in FIG. 5B, the wireless electronic-based display device of the present invention 2B is provided with RFID capabilities, and comprises: an addressable electronic-ink based display module 30 (e.g. including a layer of bi-stable display medium (i.e. electronic ink) 31 disposed between a TFT-based backplane structure 32 and an electrically conductive optically-clear layer (ITO) 33, solar and glare filter layer 34 disposed on the ITO layer 33, and a clear protective layer 35 disposed on layer 34) provided with a weather-sealed, thermally-insulated and heat-dissipative enclose/packaging 36, a backplane driving module 37 employing a plurality of driver ICs 38A-38N): a system control module 39 including a microprocessor (i.e. MC13213 SOC by Freescale having an 8-bit HCS08 MC) 40, GPIO submodule 45 integrated with a system bus 46, flash memory (e.g. 60 kB) 47 for firmware storage and graphics rendering control, program memory (e.g. 4 kB) 44, and a power management module 47 for managing the power levels within the device; RFID IC 29 (for enabling purely-passive, partially-passive and purely-passive RFID applications) interfaced with an impedance matching network 49 connected to a dipole antenna structure 50 tuned to 2.4 GHZ according to the IEEE 802.15.4; a position location engine 48 interfaced with the system bus 46 for calculating the position of the device within the network, based on the signal strength of received signals; a power source module 51 including an electro-chemical battery (e.g. 3V, 1200 mAh non-rechargeable, lithium battery, or thin-film micro energy cells) 52, and solar cell 53 and associated power conversion circuitry 54; a power switching module 55 including a reed switch 56 powering off the device when removed from its holder, and an ON/OFF power switch 57; and a voltage boost circuit 58 arranged between the output of the power switching module 55 and the backplane driving module 37. As shown, the microprocessor 40, flash memory 42, program memory 44, GPIO submodule 45, and power management module 47 are each realized on a system ASIC supported on the multi-layer PC board.

As can be best seen in FIG. 5C, the electronic-based display devices depicted in FIGS. 5A and 5B, exhibits a stacked display structure comprising: protective layer of optically clear plastic 35; solar/glare-reduction layer 34; ITO layer 33; electronic-ink medium layer 32; a TFT-driven backplane layer (e.g. TFT matrix layer) 32; a motherboard structure 60 including multi-layer printed circuit board (PCB) and components supported thereon; a thermal insulation weather-sealed packaging 36 provided about the display structure and PCB motherboard assembly/structure; and a non-RF shielding, heat-dissipative thermal radiator 61 mounted to the rear surface of the PCB, and in thermal communication with the display structure and motherboard structure of the display device. All of the electronic components are populated on one side of the motherboard, multi-layer PCB. The display assembly is attached to the other side of the PCB structure 60, typically by connector or heat-seal-bonding.

During operation, the driver ICs 38A-38N are enabled by the MCU on the SOC 39 to update the display device when there is new information to be displayed thereon. Otherwise driver ICs are in the off configuration by default. The display requires both a 0V and a +15V signal for updating the display. As shown in FIGS. 5A and 5B, these IC drivers include an internal charge pump (i.e. voltage boost circuit 58) to scale the 3V battery supply voltage up to the required 15V, in the illustrative embodiment of the present invention.

In an illustrative embodiment of the wireless network, each electronic-ink display device can be configured as a ZigBee end-device. This implies that it resides at the bottom of the parent/child network structure depicted in FIG. 2. The electronic-ink display device does not participate in the mesh-networked portion of the network, thereby enabling the device to connect (and disconnect) at will. This feature of the wireless network structure of the present invention enables the electronic-ink display device of the present invention to enter into a sleep mode to conserve stored onboard electrical energy. The length and depth of the sleep mode can readily be configured for each application via firmware settings within flash memory 42. This feature will be explained in greater detail hereinafter.

In general, when an electronic-ink display device of FIG. 5A is powered on, it immediately searches for a wireless network to join. If there is a network coordinator present that has established a PAN, then the electronic-ink display device will request pertinent network information including the MAC address of the display device's parent and the MAC address of the host gateway. Once the electronic-ink display device has received this information, it enters an idle state. In this state, the display device can move on to another state. Generally, the electronic-ink display device is in its idle state awaiting instruction from its parent. The parent can issue a command to put the electronic-ink display device in short sleep mode, or a long sleep mode. In these sleep modes, the electronic-ink display device shuts down and cannot respond until it wakes up. The length of sleep mode can be changed via firmware settings within flash memory 42. Upon waking up from its sleep mode, the electronic-ink display device sends an acknowledgement to its parent node as a request for information. Data sent to the electronic-ink display device while it was sleeping can now be retrieved by the electronic-ink display device from the parent node. When a command has been issued by the parent to update the display state of the electronic-ink display device, the electronic-ink device writes the data to its memory and then begins the display update routine. This routine includes parsing the data from memory, enabling the display driver ICs and writing data serially to the drivers.

Figure 5D:
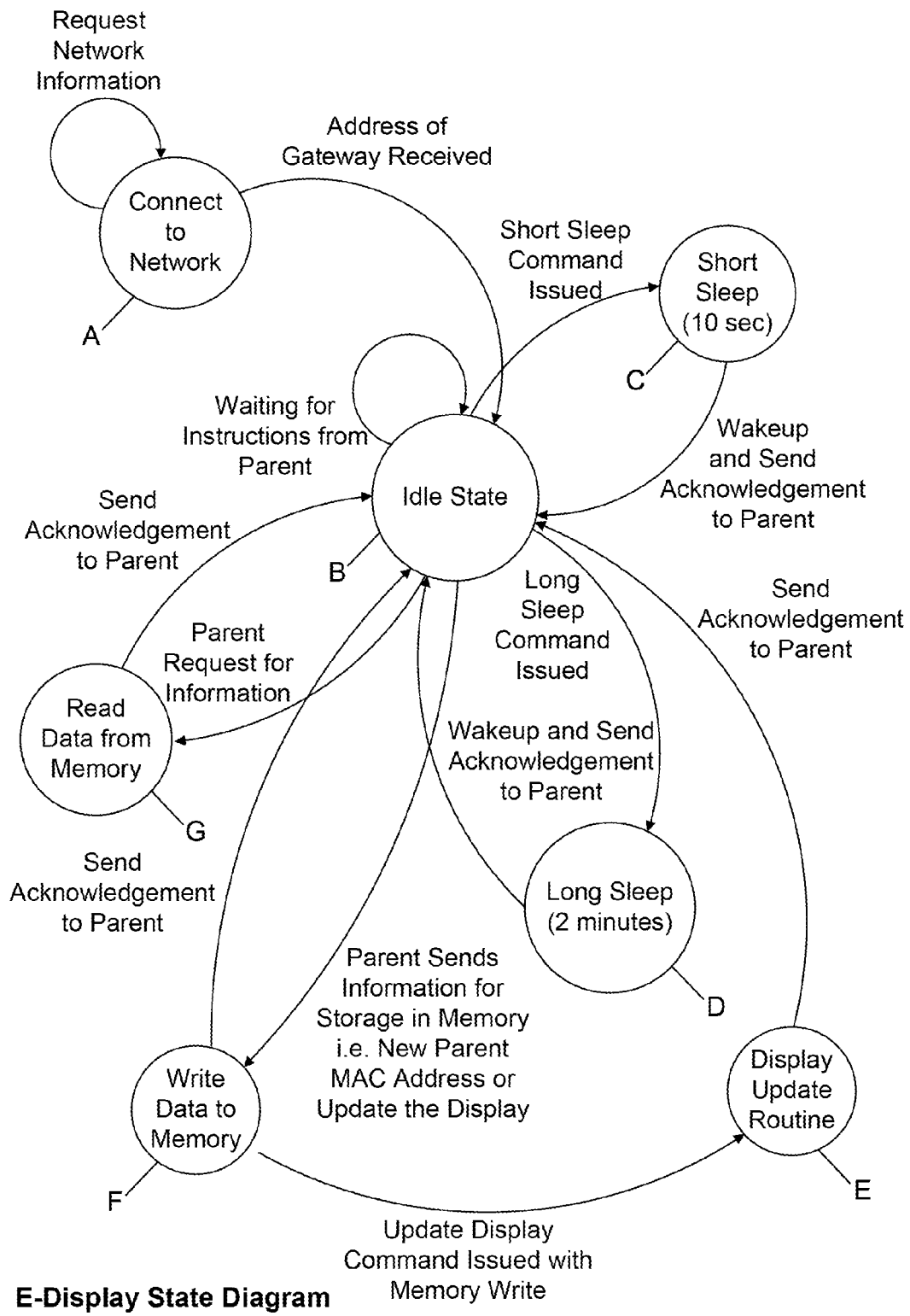
FIG. 5D is a state diagram representation of the wireless electronic-based display device of the present invention, depicted in FIGS. 5A and 5B, showing the various states of operation through which the wireless display device passes in automatic response to events occurring on its network.

The state diagram of FIG. 5D illustrates the particular states that the electronic-ink based display device of FIGS. 5A and 5B can undergo during its operation on the wireless communication network of the present invention, namely: (i) a connect to network state; (ii) an idle state; (iii) a short sleep (i.e. 10 second) state; (iv) a long sleep (2 minutes) state; (v) a display update routine state, (vi) a write data to memory state; and (vii) a read data from memory state.

As indicated in FIG. 5D, the display device remains at its connect to network state while it is requesting network information. The display device transitions to its idle state when an address of the gateway device is received. The display device remains at its idle state while it is waiting for instructions from its parent node in the network. The display device transitions from its idle state to its short sleep state when a short sleep command is issued and received. The display device remains in its short sleep state for 10 seconds and returns to the idle state. The display device transitions from its idle state to its long sleep state when a long sleep command is issued and received. The display device remains in its long sleep state for two minutes and then returns to its idle state. The display device transitions from its idle state to its write data state when the parent node sends information for storage in memory (i.e. new parent MAC address or update the display). The display device transitions from its write data to memory state to its idle state when it receives a send acknowledgment to parent node. The display device transitions from its write data to memory state to its display update routine state when it receives an update display command issued with the memory write command. The display device transitions from its display update routine to its idle state when it receives a send acknowledgment to parent node command. The display device transitions from its idle state to its read data from memory state when it receives a parent request for information command. The display device transitions from read data from memory to its idle state when it receives a send acknowledgment to parent command.

Figure 5E:
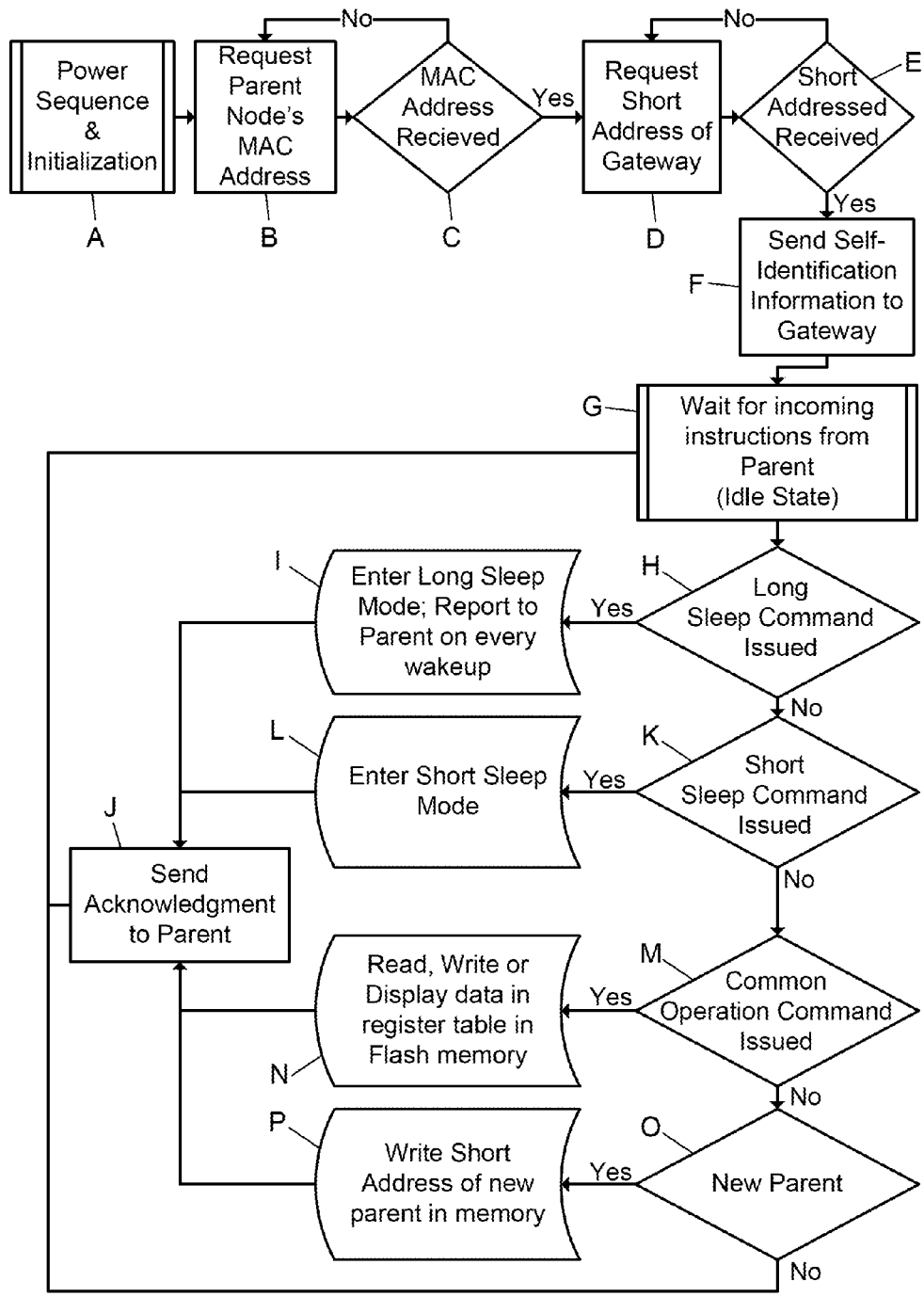
FIG. 5E is a flow chart illustrating the process carried out by the IEEE 802.15.4 firmware contained in each wireless electronic-ink display device in the wireless network of FIGS. 1A and 1C.

FIG. 5E illustrates the process steps carried out by the IEEE 802.15.4 firmware contained in each wireless electronic-ink display device deployed in the wireless communication network of FIGS. 1A and 1C. The firmware flowchart shown in FIG. 5E shows the logical sequence of events that the code has been designed to handle, and provides an alternative illustration of the state diagram of FIG. 5D.

It is appropriate at this juncture to describe these steps in detail.

As indicated at Block A of FIG. 5E, the firmware control process involves powering up and initializing the wireless communication network.

As indicated at Block B, the MAC address of the parent node is requested.

As indicated at Block C, the firmware control process determines whether or not the MAC address of the parent node has been received. If not, then the firmware control process returns to Block B and waits to receive the parent node's MAC address, and when it does, the firmware control process proceeds to Block D where the short address of the gateway is requested.

At Block E, the firmware control process determines whether or not the short address of the gateway device has been received, and returns to Block D until the short address of the gateway is received. When the short address of the gateway is received, then at Block F, the firmware control process sends self-identification to the gateway device.

At Block G, the firmware control process waits for incoming instructions from the parent node (i.e. at the idle state).

At Block H, the firmware control process determines whether or not a long sleep command has been issued and received, and if so, then at Block I enters the long sleep mode, and reports to the parent node upon wakeup, and then at Block J sends an acknowledgment to the parent node, and then returns to its idle state, as shown in FIG. 5E.

At Block K, the firmware control process determines whether or not a short sleep command has been issued and received, and if so, then at Block L enters the short sleep mode, and then at Block J sends an acknowledgment to the parent node, and then returns to its idle state, as shown in FIG. 5E.

At Block M, the firmware control process determines whether or not a common operation command has been issued and received, and if so, then at Block N reads, writes, or displays data in the register table in its flash memory, and then at Block J sends an acknowledgment to the parent node, and returns to its idle state, as shown in FIG. 5E.

Finally, at Block O, the firmware control process determines whether or not a new parent node has been assigned to the network end device, and if so, then at Block P writes the short address of the new parent node in its memory, and then at Block J sends an acknowledgment to the parent node, and then returns to its idle state, as shown in FIG. 5E.

Figure 5F:
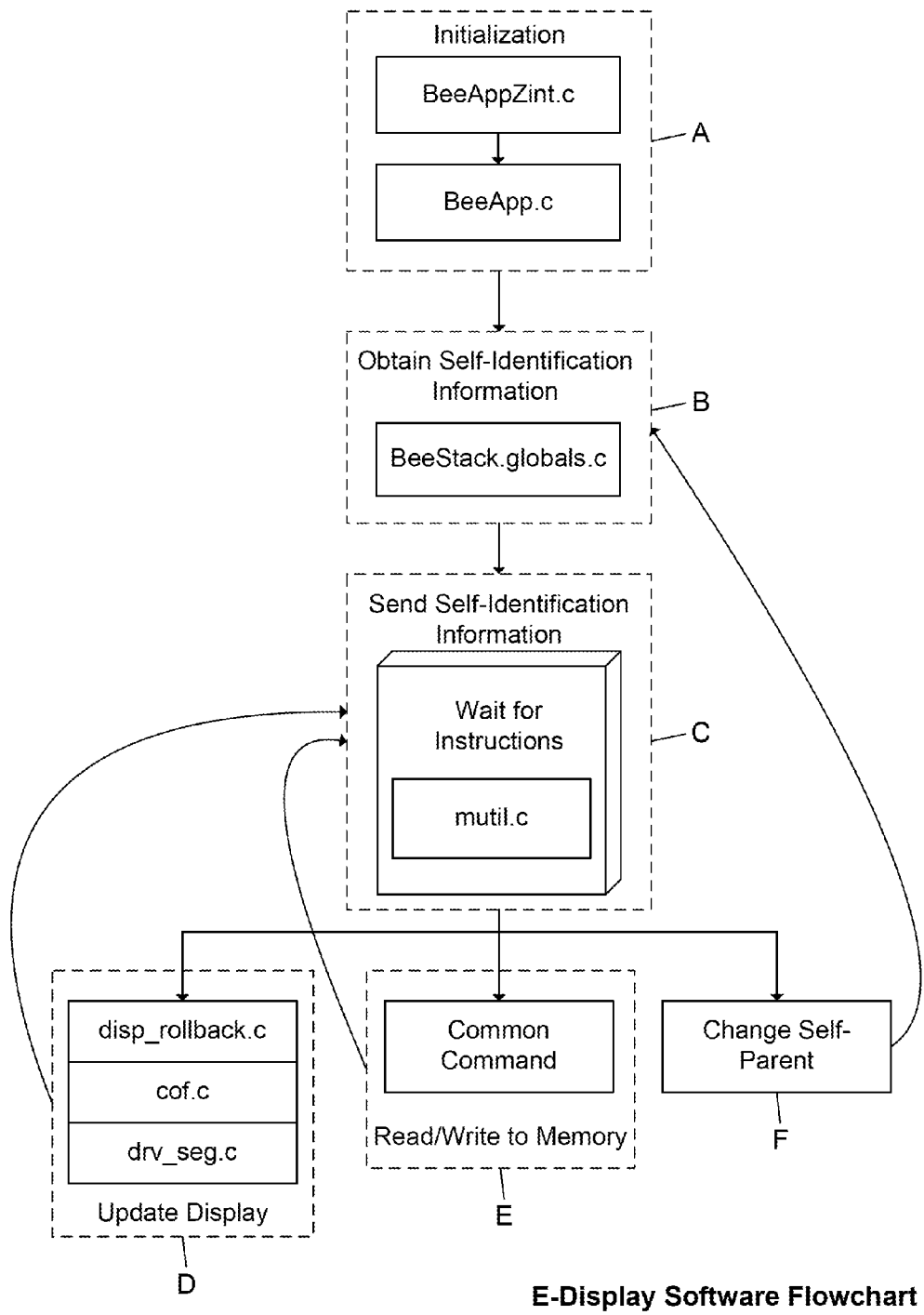
FIG. 5F is a flow chart schematic representation of the electronic-ink display device described in FIG. 5E, illustrating the firmware components employed to carry out processes supported therein.

As shown in FIG. 5F, the firmware architecture employed in the electronic-ink based display device (e.g. sign) comprises seven C files organized as shown. As indicated at Block A in FIG. 5F, the initialization step is carried out using firmware components BeeAppZin.c and BeeApp.c for configuring the wireless network. At Block B, the self-identification information acquisition step is carried out using firmware components BeeStack.globals.c which enables the electronic-ink display device (i.e. sign) to identify itself and obtain its parent's MAC address. At Block C, the self-identification information transmission step is carried out using firmware components mutil.c. When the electronic-ink display device is in the idle state, the mutil.c program is initialized. From this main program, the sign can execute other functions and code depending on the input from its parent node. At Block D, the update display step is carried out using firmware components disp_rollback.c, cof.c and drv_seg.c. At Block E, the read/write to memory step is carried out using firmware components common command.c. Finally, at Block F, the step change self to parent is carried out using firmware components.

Figure 6A:
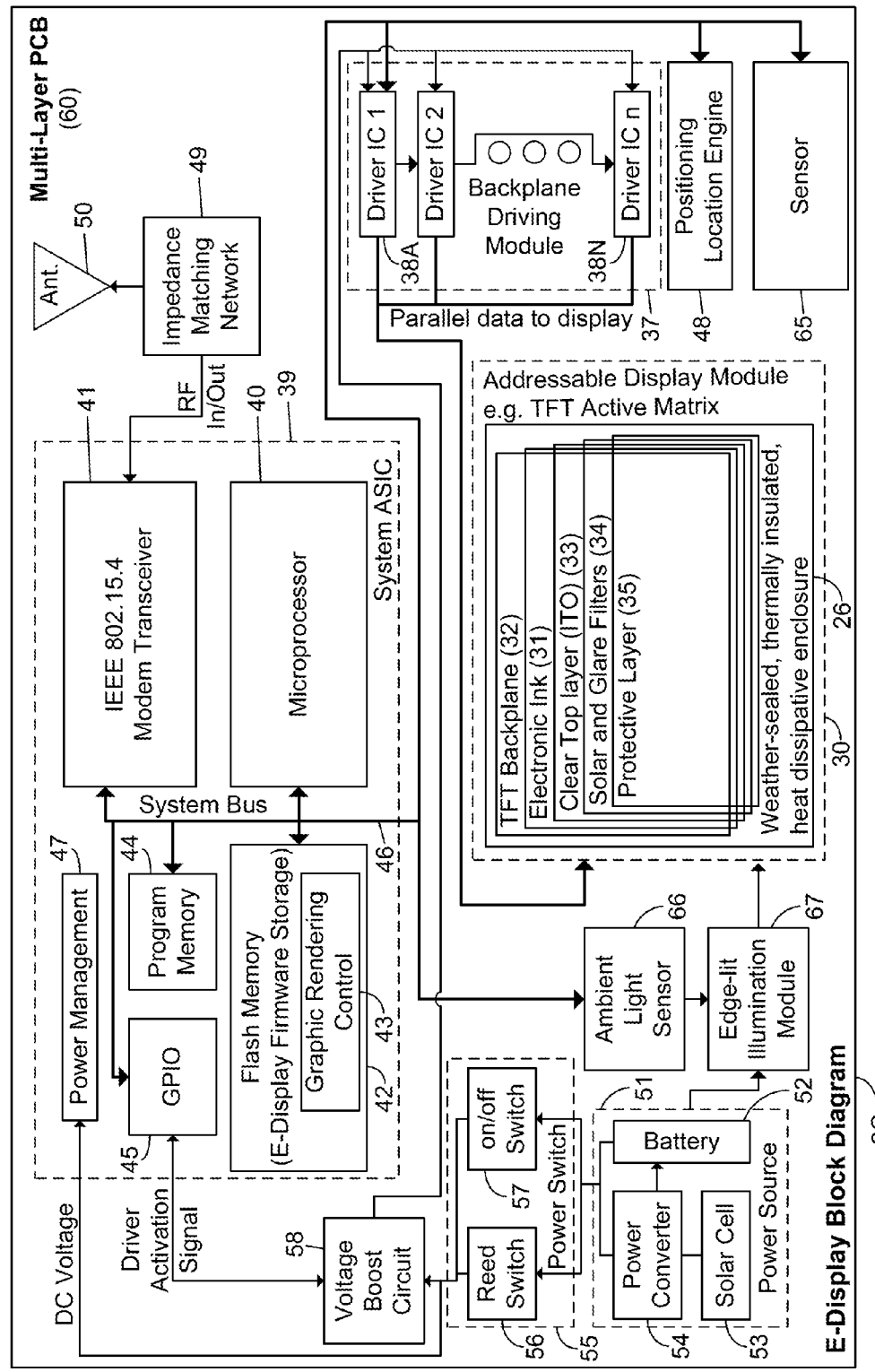
FIG. 6A is a schematic representation of a wireless electronic-ink based display device of the present invention for displaying graphical messages in diverse outdoor environments, as well fire safety instructions in building environments.

Electronic-Ink Based Display Device of the Present Invention Employing an Edge-Lit LED-Based Illumination Module As shown in FIG. 6A, the electronic-ink based display device of the present invention 2C is adapted for use in (i) indoor and outdoor environments characterized by dynamic and low ambient lighting conditions, as well as (ii) indoor signage application requiring the display of fire emergency/ building evacuation instructions, displayed on building walls, doors, stairwells, etc. As shown, electronic-ink based display device 2C supports IEEE 802.15.4 wireless networking capabilities and comprises: an addressable electronic-ink based display module 30 (e.g. including a layer of bi-stable display medium (i.e. electronic ink) 31 disposed between a TFT-based backplane structure 32 and an electrically conductive optically-clear layer (ITO) 33, solar and glare filter layer 34 disposed on the ITO layer 33, and a clear protective layer 35 disposed on layer 34 provided with a weather-sealed, thermally-insulated and heat-dissipative enclose/packaging 36, a backplane driving module 37 employing a plurality of driver ICs 38A-38N): a system control module 39 including a microprocessor 40, a IEEE 802.15.4 modem transceiver 41, flash memory 42 for firmware storage and graphics rendering control 43, program memory 44, and GPIO submodule 45 integrated with a system bus 46, and a power management module 47 for managing the power levels within the device; a position location engine/module 48 interfaced with the system bus 46 for calculating the position of the device within the network, based on the signal strength of received signals from pairs of network routers; one or more sensors 65 (e.g. temperature, smoke sensor, CO2 sensor, fire/heat or IR sensor, etc) also interfaced with the system bus 46; an ambient light sensor 66 for sensing ambient lighting conditions about the display device 30 and generating a drive control signal; an edge-lit LED-based illumination module 67, responsive to the drive control signal generated by ambient light sensor 66, for illuminating the display surface of the addressable electronic-ink display module 30; an impedance matching network 49 interfaced with the modem transceiver 41 and a dipole antenna structure 50; a power source module 51 including a electro-chemical battery 52, and solar cell 53 and associated power conversion circuitry 54; a power switching module 55 including a reed switch 56 and an ON/OFF power switch 57; and a voltage boost circuit 58 arranged between the output of the power switching module 55 and the backplane driving module 57. As shown, the microprocessor 40, IEEE 802.15.4 modem transceiver 41, flash memory 42, program memory 44, GPIO submodule 45, and power management module 47 are each realized on a system ASIC (i.e. SOC) supported on the multi-layer PC motherboard 60, to provide the system control module 39.

Figure 6B:
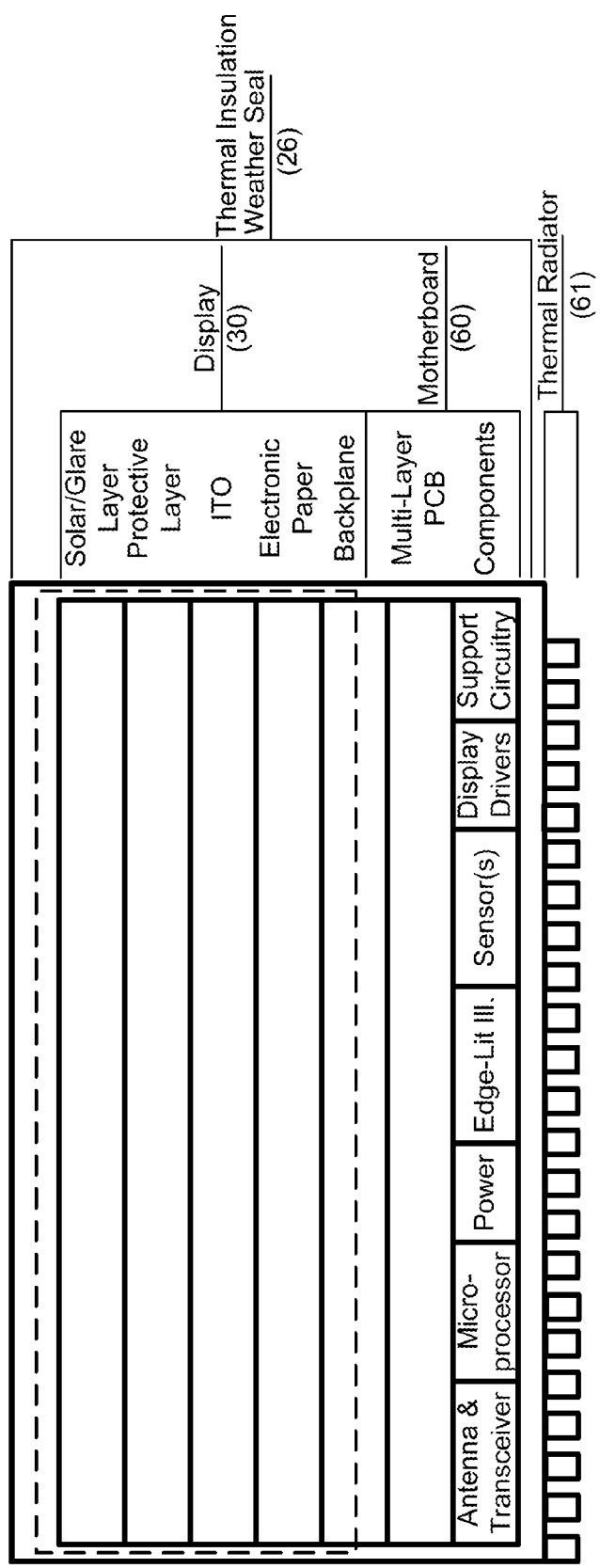
FIG. 6B is a cross-sectional schematic representation of the wireless electronic-ink based display device of the present invention, depicted in FIG. 6A, and showing its stacked display structure.

As can be best seen in FIG. 6B, the electronic-based display device depicted in FIG. 6A, exhibits a stacked display structure comprises: a protective layer of optically clear plastic 35; a solar/glare-reduction layer 34; an ITO layer 33; an electronic-ink medium layer 31; a TFT-driven backplane layer (e.g. TFT matrix layer) 32; a motherboard structure 60 including multi-layer printed circuit board (PCB) and components supported thereon; thermal insulation weather-sealed packaging 26 provided about the display structure and motherboard assembly; and non-RF shielding heat-dissipative thermal radiator 61 mounted to the rear surface of the PCB, and in thermal communication with the display structure and motherboard structure of the display device. All of the electronic components are populated on one side of the multi-layer PCB (i.e. motherboard) 60. The display assembly 30 is attached to the other side of the PCB 60, typically by ZIF connector or heat-seal bonding.

The function of the edge-lit LED driven illumination module 67 is to provide sufficient visible illumination to the electronic-ink layer 31 during low-illumination lighting conditions detected in indoor or outdoor environments by the ambient light sensor 66, under the control of programmed microprocessor 40. The function of the ambient light sensor 66 is to continuously or periodically detect the presence of ambient lighting conditions, and transmit such measurements to the programmed processor 40, and generate and supply illumination control/drive signal to the edge-lit LED illumination module 67, under the control of programmed microprocessor 40. Notably, the ambient light sensor 66 can be realized as a discrete photo-electronic sensor integrated within the housing frame about the display surface of the display device. Alternatively, this sensor may be realized as one or more micro-sized sensor elements integrated within the pixel structure of the electronic-ink display assembly 30, so as to not be noticeable to the human eye at a particular viewing distance, but constantly integrating photonic energy of ambient light striking or falling ambient on the surface of the display panel. In the illustrative embodiment, the programmed microprocessor 40 runs a firmware routine which analyzes ambient light condition measurements taken by sensor 66 about the display screen, and automatically generates an illumination control/drive signal. In turn, the illumination control signal is supplied to driver circuitry 37 which drives the LED illumination module 67 so as to produce the required illumination levels to render the graphics on the display surface clearly visible to nearby viewers under the current ambient light conditions. Notably, edge-lit LED illumination module 67 will include appropriate optics that (i) optically couples illumination produced from the LED array within the illumination module 67, and (ii) directs light rays substantially normal to the surface of the electronic-ink layer 31 so that a substantially portion of these incident light rays reflect and/or scatter therefrom, in the direction of viewers, and render the displayed graphics visible to the human vision system thereof.

In accordance with the principles of the present invention, the function of graphics rendering control 43 within system control module 39 is to render each frame of graphics displayed on the electronic-ink based display device so as to optimize the discernability of the displayed graphics under particular lighting conditions automatically, and continuously or periodically monitored by the electronic-ink display device of the present invention. For example, when twilight or dusk lighting conditions are detected by the photo-electronic ambient light level sensor 66 aboard the wireless electronic-ink display device, shown in FIG. 6A, the programmed processor 40 will run a graphics rendering program that will alter the graphics fonts and surface edges so that lettering and other graphics will be more easily discernible in low level lighting conditions. Graphics rendering processes and techniques for use in implementing the graphics rendering function of the present invention are disclosed and described in greater detail in U.S. Pat. No. 7,324,700, incorporated herein by reference, in its entirety.

The function of sensor 65 is to sense a condition in the ambient environment (e.g. temperature, CO2 etc) and automatically generate an alarm signal when the ambient condition (e.g. temperature) exceeds a predetermined temperature threshold. In the case of the wireless electronic-ink signage device shown in FIG. 5C, mounted in an outdoor environment, having large temperature swings in either the cold and/or hot direction, the sensor 65 can be set to detect when ambient temperatures exceed a predetermined threshold (i.e. above 120 F or below 5 F) and transmit an alarm signal (data message) to a remote location by way of wireless data packet communication over the wireless communication network to which the signage device is connected. Ideally, the thermal packaging selected for the wireless e-ink signage device of the present invention should be such that it enables all electronics and electro-optical components employed in the signage device to operate properly within the predetermined extreme temperature range for which the outdoor signage device has been designed, and that the temperature thresholds set for the signage device should be to automatically detect when the ambient temperatures exceed these temperature thresholds set in the wireless device, and automatically generate and transmit an alarm to one or more remote nodes on the wireless communication network, to which each such wireless outdoor e-ink signage device is connected.

Also, the wireless signage device is capable of sending alarms to remote locations on the network when ambient light levels exceed predetermined ambient light level thresholds that have been set for any particular wireless e-ink signage device. Such alarms can be serviced by trained personnel involving on-site inspection of the signage devices to determine if they are operating properly and their programmed messages can be visibly discerned at the particular installation location where the wireless signage device has been deployed at any point in time. The GPS and/or position location capabilities of each wireless signage device will allow sensed temperature and/or ambient light level readings to be automatically recorded, along with the signage device's GPS coordinates and/or installation location, and then transmitted to and stored in central database maintained on the wireless communication network. Various kinds of metrics can be generated from this database to improve the quality of performance of all wireless electronic-ink signage devices deployed on any given wireless communication network.

In the illustrative embodiment, the electronic-ink display device of FIG. 6A is configured as an end-device, implying that it resides at the bottom of the parent/child network structure. As shown in FIG. 2, the electronic-ink display device does not participate in the mesh-networked portion of the wireless network, and thus the device can connect (and disconnect) at will, thereby enabling the electronic-ink display device of the present invention to enter into a sleep mode to conserve electrical energy. The length and depth of sleep can readily be configured for each application via firmware set in flash memory 42, as taught herein.

In general, when the electronic-ink sign of FIG. 6A is powered on, it immediately searches for a network coordinator to join the network thereby. If there is a coordinator present that has established a PAN, then the electronic-ink display device will request pertinent network information including the MAC address of the sign's parent and the MAC address of the host gateway. Once the electronic-ink display device has received this information, it enters an idle state. In this state, the display device can move on to another state. Generally, the electronic-ink sign is in its idle state awaiting instruction from its parent. The parent can issue a command to put the electronic-ink sign in short sleep or long sleep mode. In these modes, the electronic-ink display device shuts down and cannot respond until it wakes up. The length of sleep mode can be changed in firmware. Upon waking up from its sleep mode, the electronic-ink display device sends an acknowledgement to its parent node as a request for information. Data sent to the electronic-ink display device while it is in its sleep mode can be retrieved by the electronic-ink display device from its parent node. When a command has been issued by the parent node to update the display of the electronic-ink display device, the electronic-ink display device writes the data to its memory and then begins the display update routine. This routine includes parsing the data from memory, enabling the display driver ICs and writing data serially to the drivers.

Figure 6C:
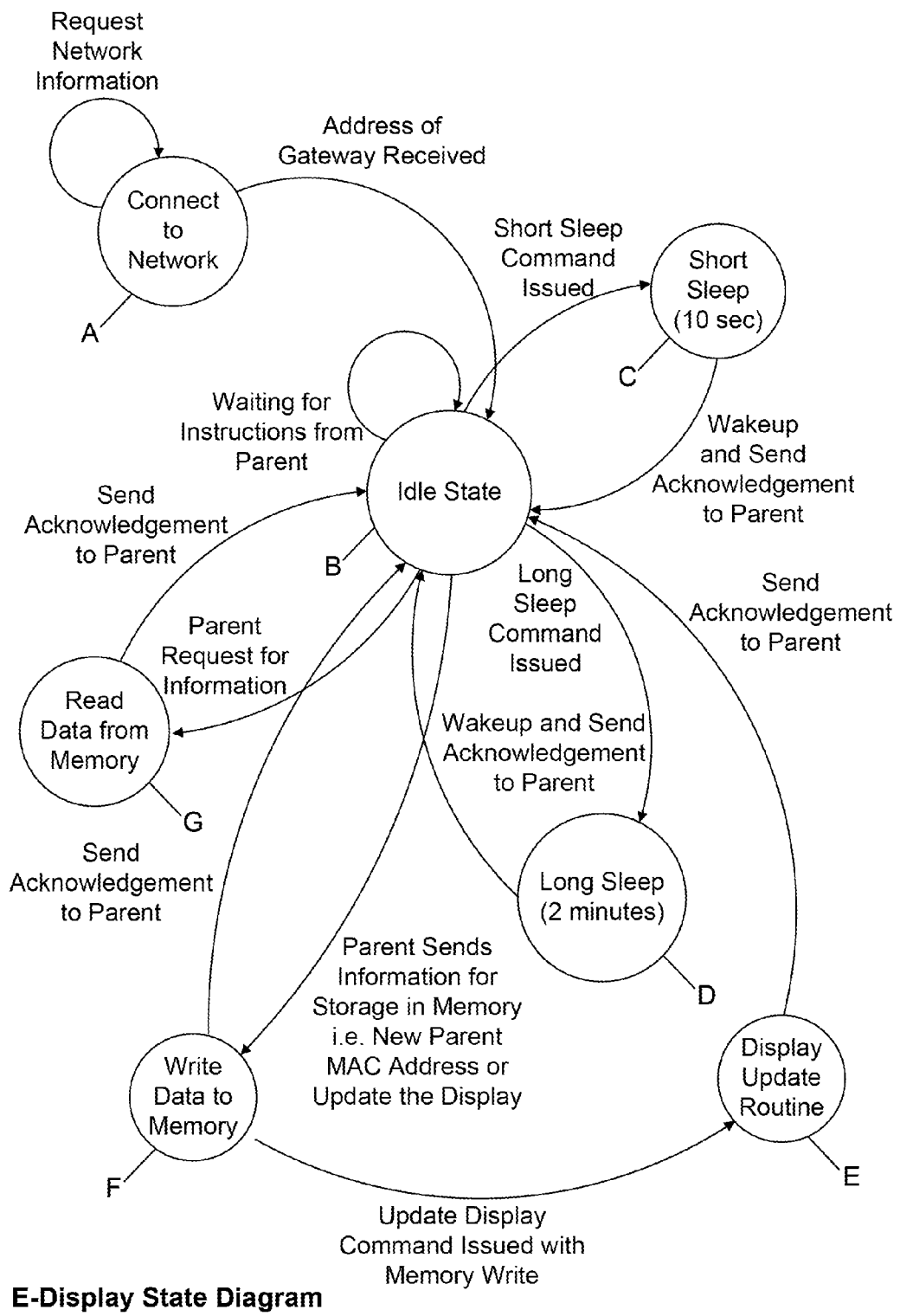
FIG. 6C is a state diagram representation of the wireless electronic-ink based display device of the present invention, depicted in FIGS. 6A and 6B, showing the various states of operation through which the wireless display device passes in automatic response to events occurring on its wireless network.

The state diagram of FIG. 6C illustrates the particular states that the electronic-ink based display device of FIGS. 6A and 6B can undergo during its operation on the wireless communication network of the present invention, namely: (i) a connect to network state; (ii) an idle state; (iii) a short sleep (i.e. 10 second) state; (iv) a long sleep (2 minutes) state; (v) a display update routine state, (vi) a write data to memory state; and (vii) a read data from memory state.

As indicated in FIG. 6C, the display device remains at its connect to network state A while it is requesting network information. The display device transitions to its idle state B when an address of the gateway device is received. The display device remains at its idle state B while it is waiting for instructions from its parent node in the network. The display device transitions from its idle state B to its short sleep state C when a short sleep command is issued and received. The display device remains in its short sleep state for 10 seconds and returns to the idle state B. The display device transitions from its idle state B to its long sleep state D when a long sleep command is issued and received. The display device remains in its long sleep state D for two minutes and then returns to its idle state B. The display device transitions from its idle state D to its write data to memory state E when the parent node sends information for storage in memory (i.e. new parent MAC address or update the display). The display device transitions from its write data to memory state E to its idle state B when it receives a send acknowledgment to its parent node. The display device transitions from its write data to memory state E to its display update routine state F when it receives an update display command issued with the memory write command. The display device transitions from its display update routine to its idle state B when it receives a send acknowledgment to parent node command. The display device transitions from its idle state B to its read data from memory state G when it receives a parent request for information command. The display device transitions from read data from memory state G to its idle state B when it receives a send acknowledgment to parent command.

Figure 6D:
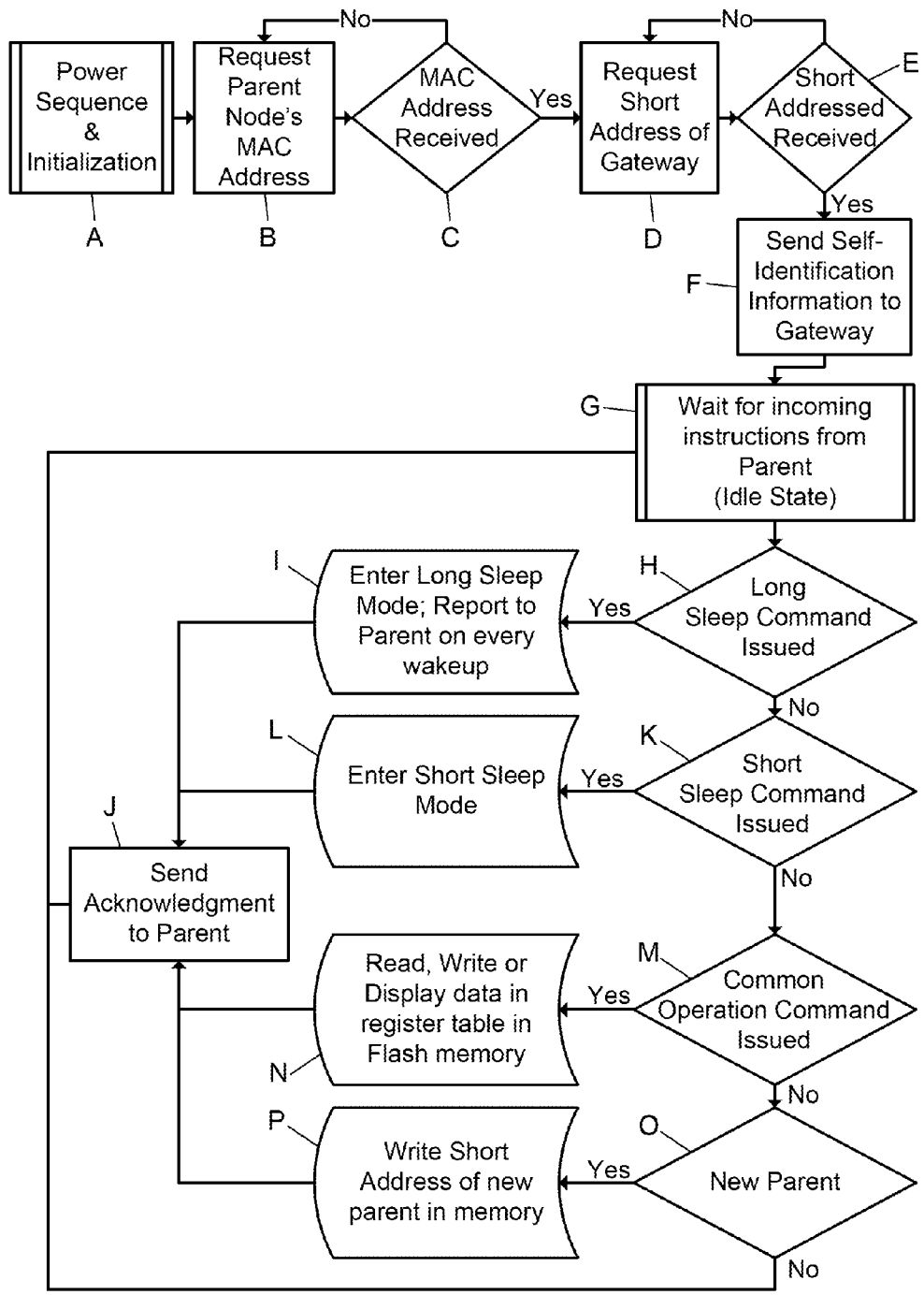
FIG. 6D is a flow chart illustrating the process carried out by the IEEE 802.15.4 firmware contained in each wireless electronic-ink display device in the network of FIGS. 6A through 6C.

FIG. 6D illustrates the process steps carried out by the IEEE 802.15.4 firmware contained in each electronic-ink display device of FIG. 6A deployed in the wireless communication network of FIGS. 1A1, 1A2 and 1C. The firmware flowchart shown in FIG. 6E shows the logical sequence of events that the code has been designed to handle, and provides an alternative illustration of the state diagram of FIG. 5D.

At this juncture, it is appropriate to describe these steps in detail.

Figure 6E:
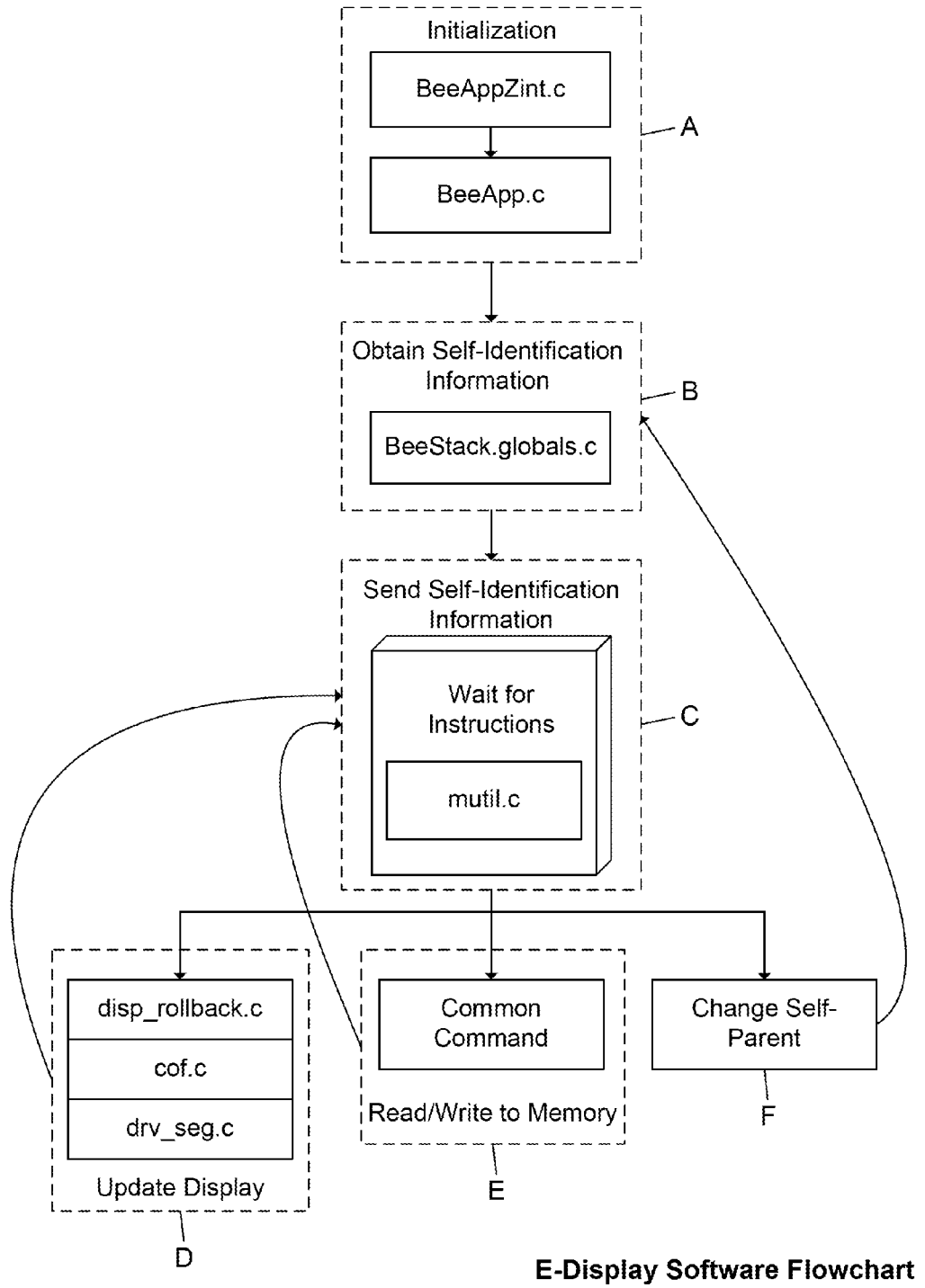
FIG. 6E is a flow chart schematic representation of the wireless electronic-ink display device described in FIG. 6A, illustrating the firmware components employed to carry out processes supported therein.

As indicated at Block A of FIG. 6E, the firmware control process involves powering up and initializing the network.

As indicated at Block B, the MAC address of the parent node is requested.

As indicated at Block C, the firmware control process determines whether or not the MAC address of the parent node has been received. If not, then the firmware control process returns to Block B and waits to receive the parent node's MAC address, and when it does, the firmware control process proceeds to Block D where the short address of the gateway is requested.

At Block E, the firmware control process determines whether or not the short address of the gateway device has been received, and returns to Block D until the short address of the gateway is received. When the short address of the gateway is received, then at Block F, the firmware control process sends self-identification data to the gateway device.

At Block G, the firmware control process waits for incoming instructions from the parent node (i.e. at the idle state).

At Block H, the firmware control process determines whether or not a long sleep command has been issued and received, and if so, then at Block I the control process enters the long sleep mode, and reports to the parent node upon wakeup, and then at Block J sends an acknowledgment to the parent node, and then returns to its idle state, as shown in FIG. 6E.

At Block K, the firmware control process determines whether or not a short sleep command has been issued and received, and if so, then at Block L enters the short sleep mode, and then at Block J sends an acknowledgment to the parent node, and then returns to its idle state, as shown in FIG. 6E.

At Block M, the firmware control process determines whether or not a common operation command has been issued and received, and if so, then at Block N reads, writes, or displays data in the register table in its flash memory, and then at Block J sends an acknowledgment to the parent node, and returns to its idle state, as shown in FIG. 6E.

Finally, at Block O, the firmware control process determines whether or not a new parent node has been assigned to the network end device, and if so, then at Block P writes the short address of the new parent node in its memory, and then at Block J sends an acknowledgment to the parent node, and then returns to its idle state, as shown in FIG. 6E.

As shown in FIG. 6E, the firmware architecture employed in the electronic-ink based display device of FIG. 6A comprises seven C files organized as shown. As indicated at Block A in FIG. 6E, the initialization step is carried out using firmware components BeeAppZin.c and BeeApp.c for configuring the ZigBee wireless network. At Block B, the self-identification information acquisition step is carried out using firmware components BeeStack.globals.c which enables the electronic-ink display device (i.e. sign) to identify itself and obtain its parent's MAC address. At Block C, the self-identification information transmission step is carried out using firmware components mutil.c. When the electronic-ink display device is in the idle state, the mutil.c program is initialized. From this main program, the display device can execute other functions and code depending on the input from its parent node. At Block D, the update display step is carried out using firmware components disp_rollback.c, cof.c and drv_seg.c. At Block E, the read/write to memory step is carried out using firmware components common command.c. Finally, at Block F, the step change self to parent is carried out using firmware components.

The Wireless Network Coordinator Device of the Present Invention

Figure 7B:
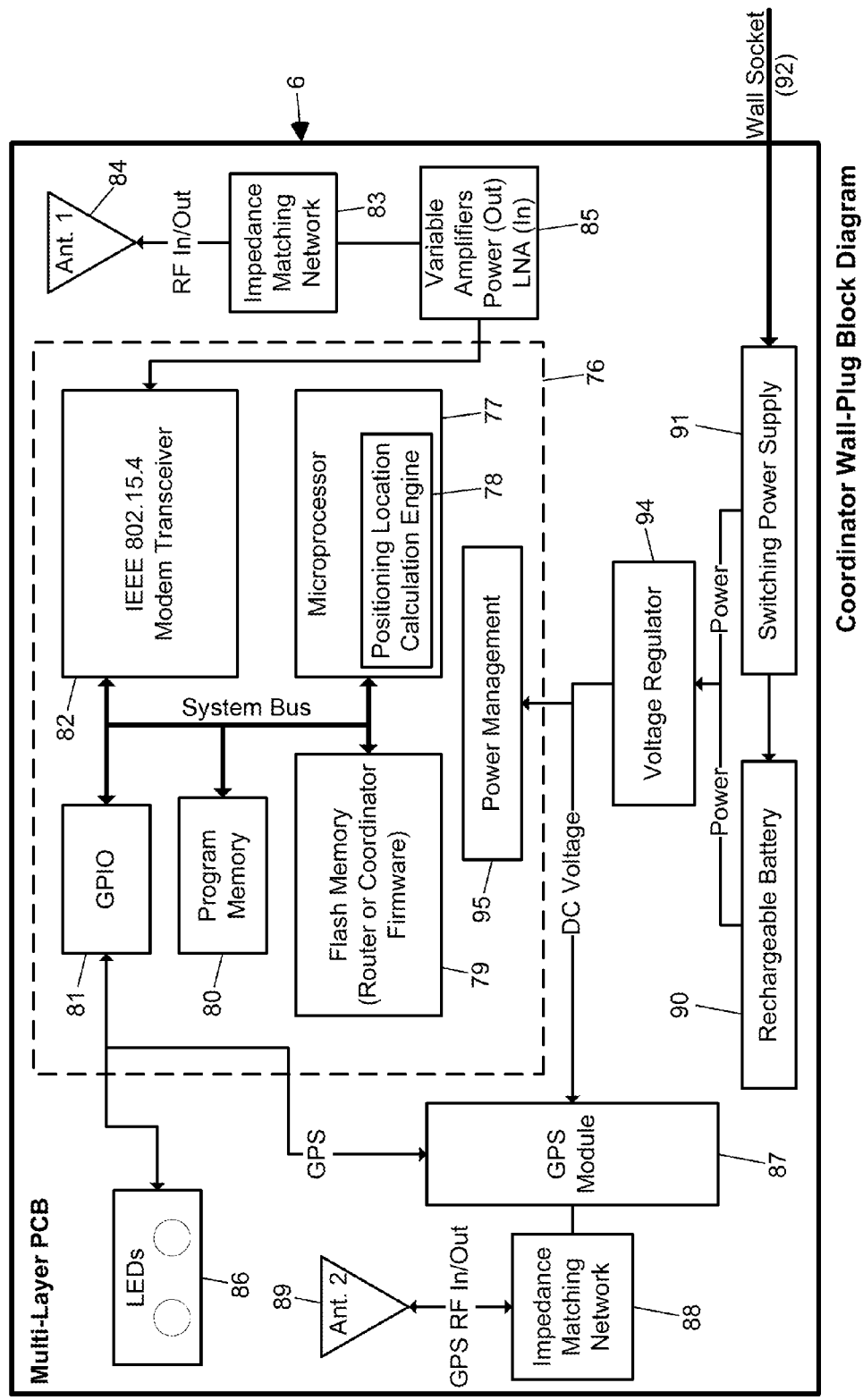
FIG. 7B is a schematic representation of the wireless wall-plug type network coordinator device illustrated in FIG. 7A.
Figure 7C:
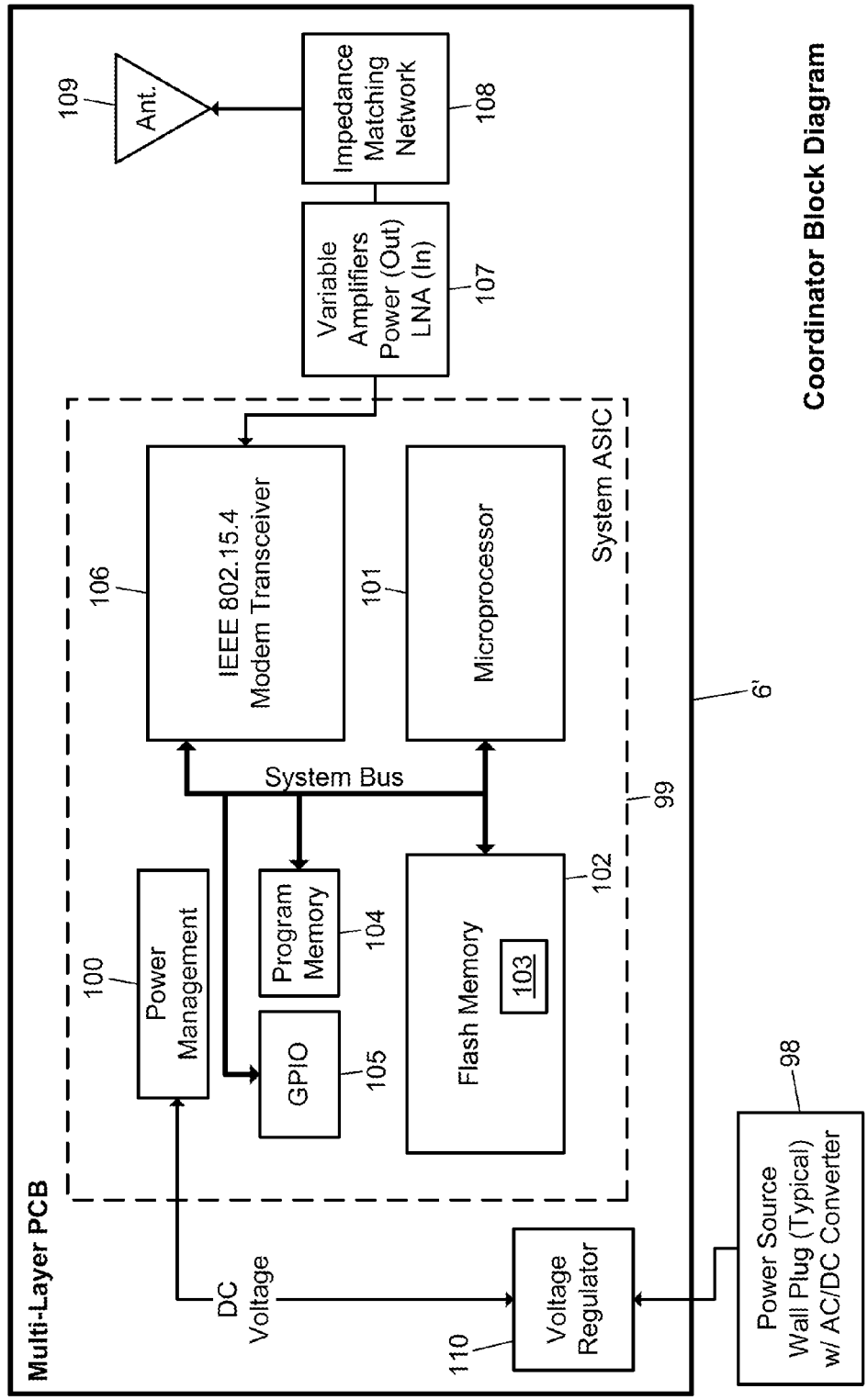
FIG. 7C is a schematic representation of the wireless network coordinator of the present invention that may have an standalone module form factor, with an external wall source 120 VAC-12 VDC power adapter.

As shown in FIGS. 7A1 and 7A2, the network coordinator device of the present invention 6 comprises: a housing 70 made of plastic or other suitable material; a multi-layer PCB 60 as shown in FIG. 7C contained in the housing; an electrical wall plug 71 integrated with the housing and having electrical prongs 72 for plugging into a standard electrical wall socket; LED indicators 73 integrated with the housing, for indicating the status of operation of the network coordinator device; and a securing mechanism 74 for physically securing the network coordinator device to the electrical wall socket, or other fixture, to prevent theft or accidental disconnection during network operation.

The primary function of the network coordinator 6 is to automatically establish a Personal Area Network (PAN) which involves selecting a frequency of operation (e.g. Channels 11 through 26) and assigning a PAN ID number. All network devices that join the wireless network of the present invention must communicate on the selected channel and acknowledge the assigned PAN ID.

As shown in FIG. 7B, the wall-plug type network coordinator device 6 of FIGS. 7A1 and 7A2 comprises: a system control module 76 including a microprocessor 77 with a position location calculation engine 78, flash memory 79 for router or coordinator firmware storage, program memory 80, GPIO submodule 81 connected to an IEEE 802.15.4 modem transceiver 82; an impedance matching network 83 connected to a first RF antenna structure (ANT 1) 84 and interfaced with a variable gain power amplifier (Out Tx) 85 to the transmit line to boost signal strength to increase range in noisy environments, and a variable gain low-noise amplifier (LNA), (In Rx) 85 to the receiver to increase the gain of incoming signals, wherein the gain of these amplifiers is software-controlled so that the signal strength is dynamically changed/adjusted, depending on the characteristics of the ambient environment; LEDs 86 integrated with the housing, for indicating the status of operation of the coordinator; a GPS module 87 interfaced with the GPIO submodule 81 and an impedance matching network 88 connected to a GPS RF in/out antenna structure (ANT 2) 89, to aid in node location using a real-time location system (RTLS), employing the GPS module 87, and position location algorithm scheme 78 using RSSI detection/analysis, or some other similar technology; a rechargeable battery 90 for supplying continuous power to the device in the event of a short-term power failure; a switching power supply module 91 connected to an electrical wall socket via the electrical power plug 71 integrated with the housing shown in FIGS. 7A1 and 7A2; a battery backup source (optional) for maintaining power in the event of short-term power outages and surges; a voltage regulation module 94 interfaced with (i) the power management module 95 and GPS module 87, and (ii) the rechargeable battery 90 and switching power supply 91.

As shown in FIG. 7C, the network coordinator of the present invention 61 can be realized as a standalone module form factor, having an external wall source 120 VAC-12 VDC power adapter 98, and comprising: an ASIC-implemented system control module 99 including a power management module 100, a microprocessor 101, flash memory 102 for router or coordinator firmware storage 103, program memory 104, and a GPIO submodule 105 connected to an IEEE 802.15.4 modem transceiver 106; a variable gain power amplifier (Out Tx) and a variable gain low-noise amplifier (LNA), (In Rx) 107 connected to the IEEE 802.15.4 modem transceiver 106; an impedance matching network 108 connected to the variable gain power amplifier (Out Tx) and a variable gain low-noise amplifier 107; an RF antenna structure (ANT 1) 109 interfaced with the impedance matching network; a voltage regulation module 110 interfaced with the power management module 100; and an external power source 120 VAC-12 VDC power adapter 98 with an AC/DC converter.

Figure 7D:
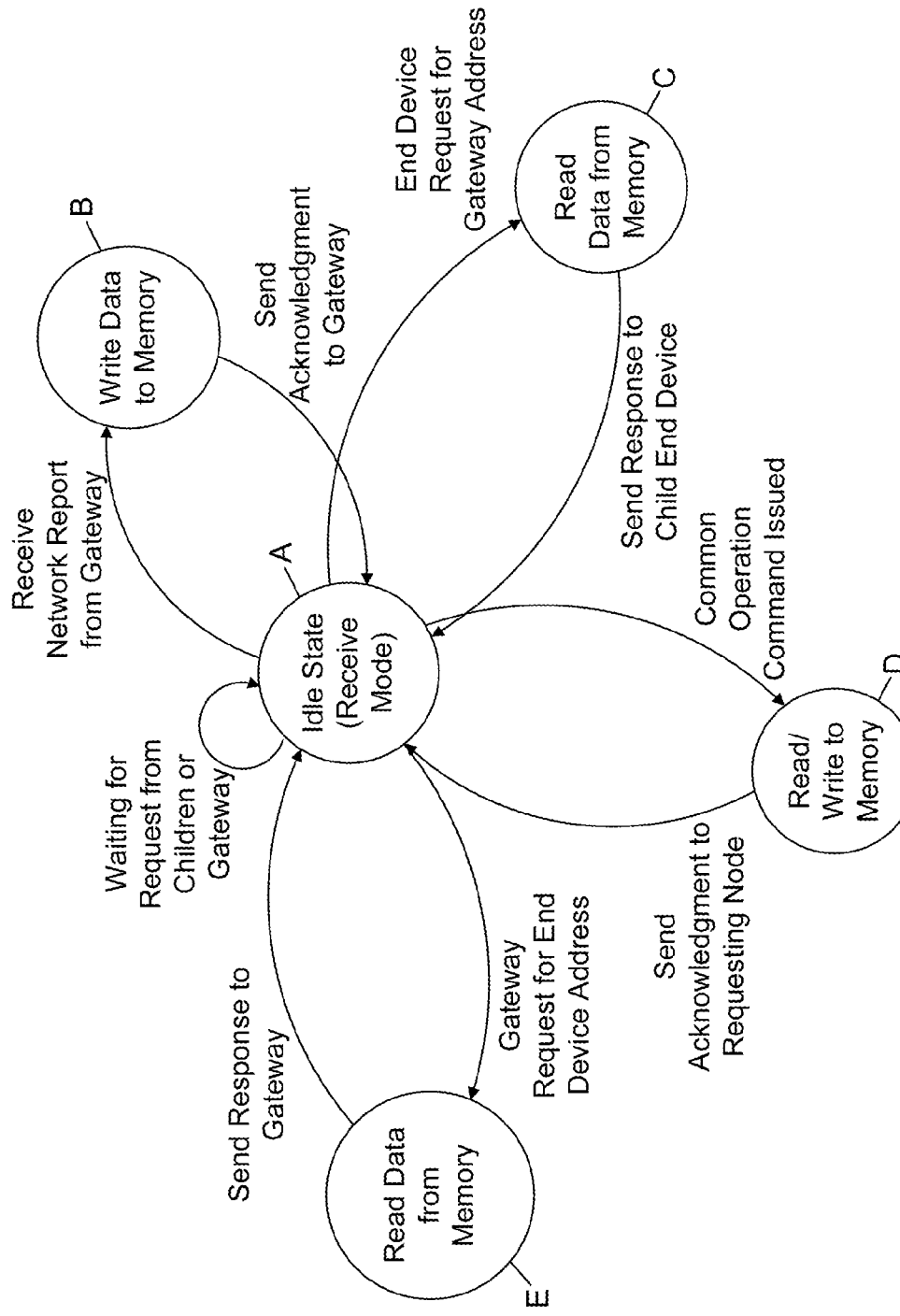
FIG. 7D is a state diagram representation of the wireless network coordinator device of the present invention, depicted in FIGS. 7B and 7C, showing the various states of operation through which the network coordinator device passes in automatic response to events occurring on its network.

As shown in the state diagram of FIG. 7D, the state diagram for the coordinator 6, 6' of FIGS. 7A1 through 7C pass through the various states of operation in automatic response to events occurring on its network, including (i) an idle state (i.e. receive module), (ii) a write to memory state, (iii) a read data from state, (v) a read/write to memory state, and (vi) a read data from memory state.

As indicated in FIG. 7D, the coordinator device remains in its idle state (receive mode) A while waiting for a (data packet) request from children nodes or the gateway device/node. The coordinator device transitions from its idle state A to its write data to memory state B when the coordinator receives a network report from the network gateway device. The coordinator device transitions from its write data to memory state B back to its idle state A after it sends an acknowledgment to the gateway device. The coordinator device transitions from its idle state A to its read data from memory state C when receiving request from a (child node) end device request for a gateway address. The coordinator device transitions from the read data from memory state C back to its idle state A after it sends a response to the child end device. The coordinator device transitions from the idle state A to its read/write to memory state E when it receives an issued common operation command. The coordinator device transitions from the read/write to memory state D back to the idle state after it sends an acknowledgment to the requesting node. The coordinator device transitions from its idle state A to its read data to memory state when it receives a request from the gateway for its end device address. The coordinator device transitions from its read data to memory state back to its idle state A after its sends a response to the gateway device.

Figure 7E:
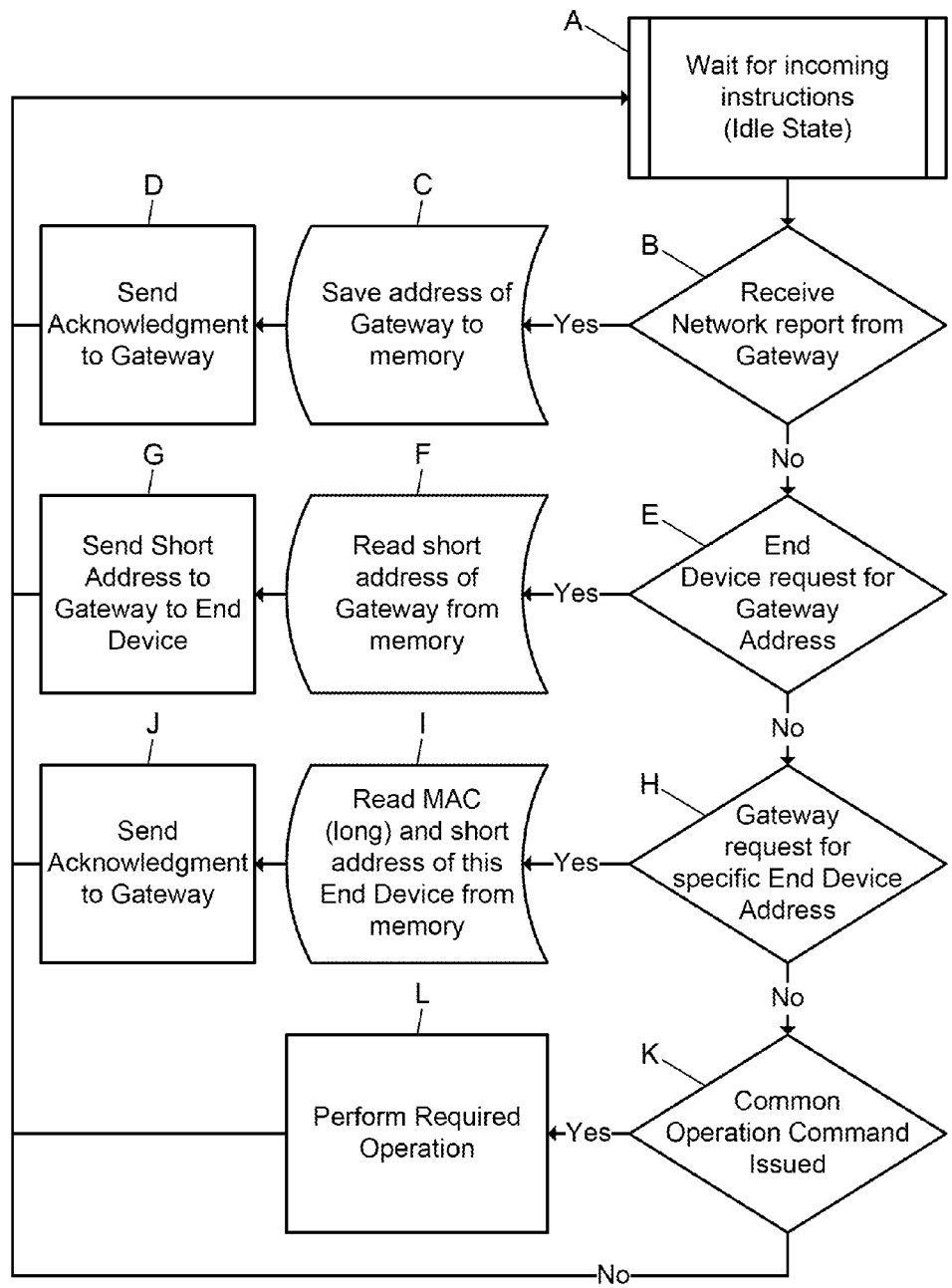
FIG. 7E is a flow chart illustrating the process carried out by the IEEE 802.15.4 firmware contained in the wireless coordinator device in the network of FIGS. 6A and 6C.

FIG. 7E describes the process carried out by firmware contained in the coordinator device 6, 6' in the wireless communication network of the present invention.

At Block A in FIG. 7E, the coordinator waits for incoming instructions (while in its idle state).

At Block B, the coordinator receives network report from the gateway device.

At Block C, the coordinator saves the address of the gateway device to memory.

At Block D, the coordinator sends an acknowledgment to the gateway device, and returns tour the idle state at Block A.

At Block E, the coordinator receives request for gateway address from end device.

At Block F, the coordinator reads the short address of the gateway device from memory.

At Block G, the coordinator sends the short address of the gateway to the requesting end device, and returns to the idle state at Block A.

At Block H, the coordinator receives a request for an end device address from the gateway device.

At Block I, the coordinator reads from its memory, the (long) and short MAC addresses of the end device.

At Block J, the coordinator sends an acknowledgement to the gateway, and then returns to the idle state at Block A.

At Block K, the coordinator receives an issued common operation command.

At Block L, the coordinator performs the required operation, and returns to the idle state.

FIG. 7F shows a MAC Address Look-UP Table stored in the coordinator device of the present invention, supporting the IEEE 802.15.4 network protocol, and showing, for each network device, the network device number assigned to the network device, the type of the network device, and the MAC address assigned to the network device.

Figure 7G:
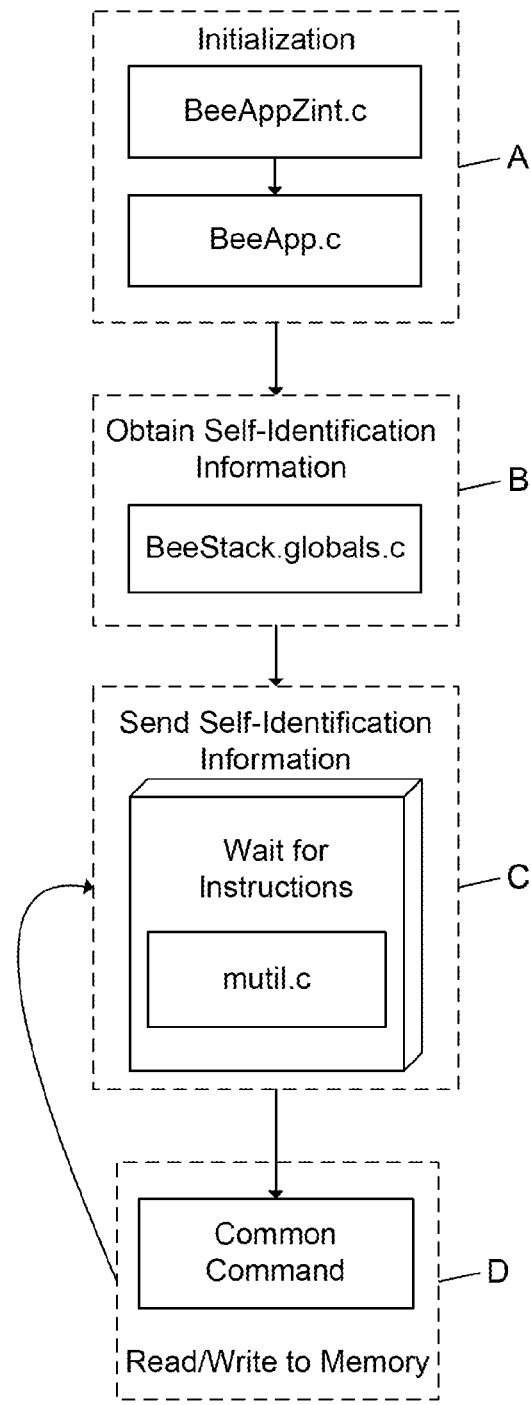
FIG. 7G is a flow chart schematic representation of the wireless electronic-ink display device described in FIG. 6D, illustrating the firmware components employed to carry out processes supported therein.

As shown in FIG. 7G, the firmware architecture employed in the electronic-ink based display device (e.g. sign) comprises seven C files organized as shown. As indicated at Block A in FIG. 7G, the initialization step is carried out using firmware components BeeAppZin.c and BeeApp.c for configuring the ZigBee wireless network. At Block B, the self-identification information acquisition step is carried out using firmware components BeeStack.globals.c which enables the electronic-ink display device (i.e. sign) to identify itself and obtain its parent's MAC address. At Block C, the self-identification information transmission step is carried out using firmware components mutil.c. When the electronic-ink sign is in the idle state, the mutil.c program is initialized. From this main program, the sign can execute other functions and code depending on the input from its parent node. At Block D, the read/write to memory step is carried out using firmware components common command.c.

Network Router Device of the Present Invention

Figure 8B:
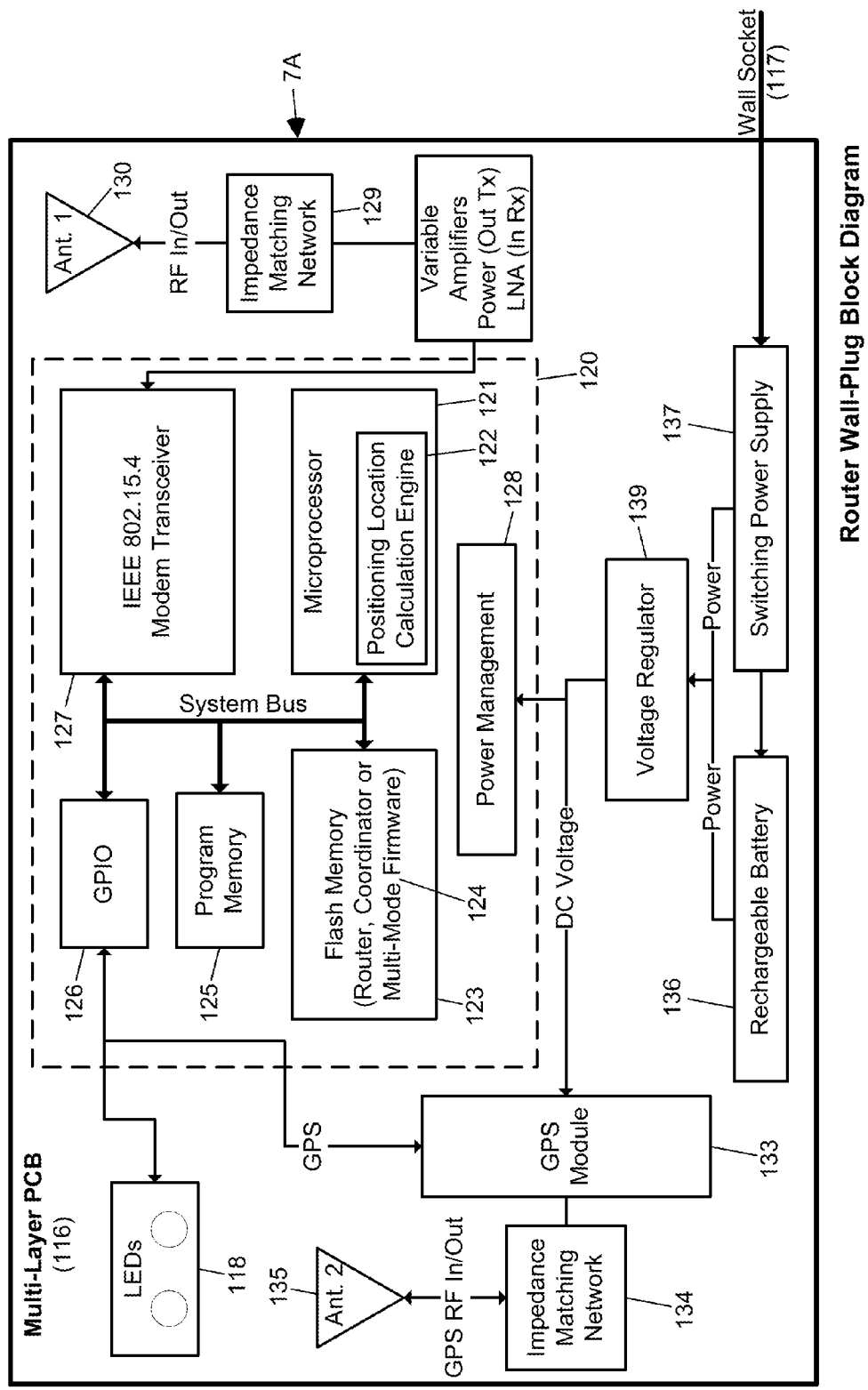
FIG. 8B is a schematic representation of the wireless wall-plug type network router device illustrated in FIG. 8A1.

In FIGS. 8A1 and 8A2, the network router device of the present invention 7A is shown comprising: a housing 115 of compact construction, made from molded plastic or other suitable material; a multi-layer printed circuit board (PCB) 116 populated with the systems, circuits and devices shown in FIG. 8B; an electrical wall plug 117 integrated with the housing and having electrical prongs for plugging into a standard electrical wall socket; LED indicators 118 electrically connected to the PCB 116, for visually indicating the status of operation of the network coordinator device; and a securing mechanism 119 integrated with the housing, for physically securing the housing to the electrical wall socket to prevent theft or accidental disconnection during network operation.

In the illustrative embodiments disclosed herein, the router device 7A can utilize substantially the same plastic housing as the coordinator device described in detail above, and also may be implemented using substantially the same hardware components. In some illustrative embodiments of the present invention, shown in FIGS. 8G through 8H2, the primary difference between the router and coordinator will reside primarily in the firmware employed in the devices, and the functionalities provided by each such network component of the present invention.

However, in other illustrative embodiments of the present invention, the router device will also include firmware supporting the functions of a network coordinator, so that the router device of the present invention may serve multiple functions and dynamically switch and reconfigure into a coordinator device in the event that the originally designated coordinator is permanently or temporally disabled. By virtue of this multi-mode feature of router of the present invention, these is no need to wait for a network user to find a failed network coordinator and replace it, as one of the multi-mode routers in the network of the present invention will automatically reconfigure itself to perform the coordinator function, virtually in real-time.

As shown in FIG. 8B, the wall-plug type network router device 7A of FIGS. 8A1 and 8A2 comprises: on its multilayer PCB 116, a system control module 120 including a microprocessor 121 including a position location calculation engine 122, flash memory 123 for router and/or multi-mode (router/coordinator) firmware storage 124, program memory 125, GPIO submodule 126 connected to an IEEE 802.15.4 modem transceiver 127 and power management module 128; an impedance matching network 129 connected to a first RF antenna structure (ANT 1) 130 and interfaced with a variable gain power amplifier on the transmit line (Out Tx) and a variable gain low-noise amplifier (LNA) on the receive line (In Rx) 131; LEDs 118 for indicating the status of operation of the GPIO; a GPS module 133 interfaced with the GPIO submodule 126 and an impedance matching network 135 connected to a GPS RF in/out antenna structure (ANT 2) 135, to aid in node location using a real-time location system (RTLS), employing the GPS module 133, and position location algorithm scheme 122 using RSSI detection/analysis, or other technology; a rechargeable battery 136 for supplying continuous power to the device in the event of a short-term power failure; a switching power supply module 137 connected to an electrical wall (120 VAC) socket via the electrical power plug 117 integrated with the housing 115; a battery backup source 138 for maintaining power in the event of short-term power outages and surges; a voltage regulation module 139 interfaced with (i) the power management module 128 and GPS module 133, and (ii) the rechargeable battery 136 and switching power supply 137.

Figure 8C:
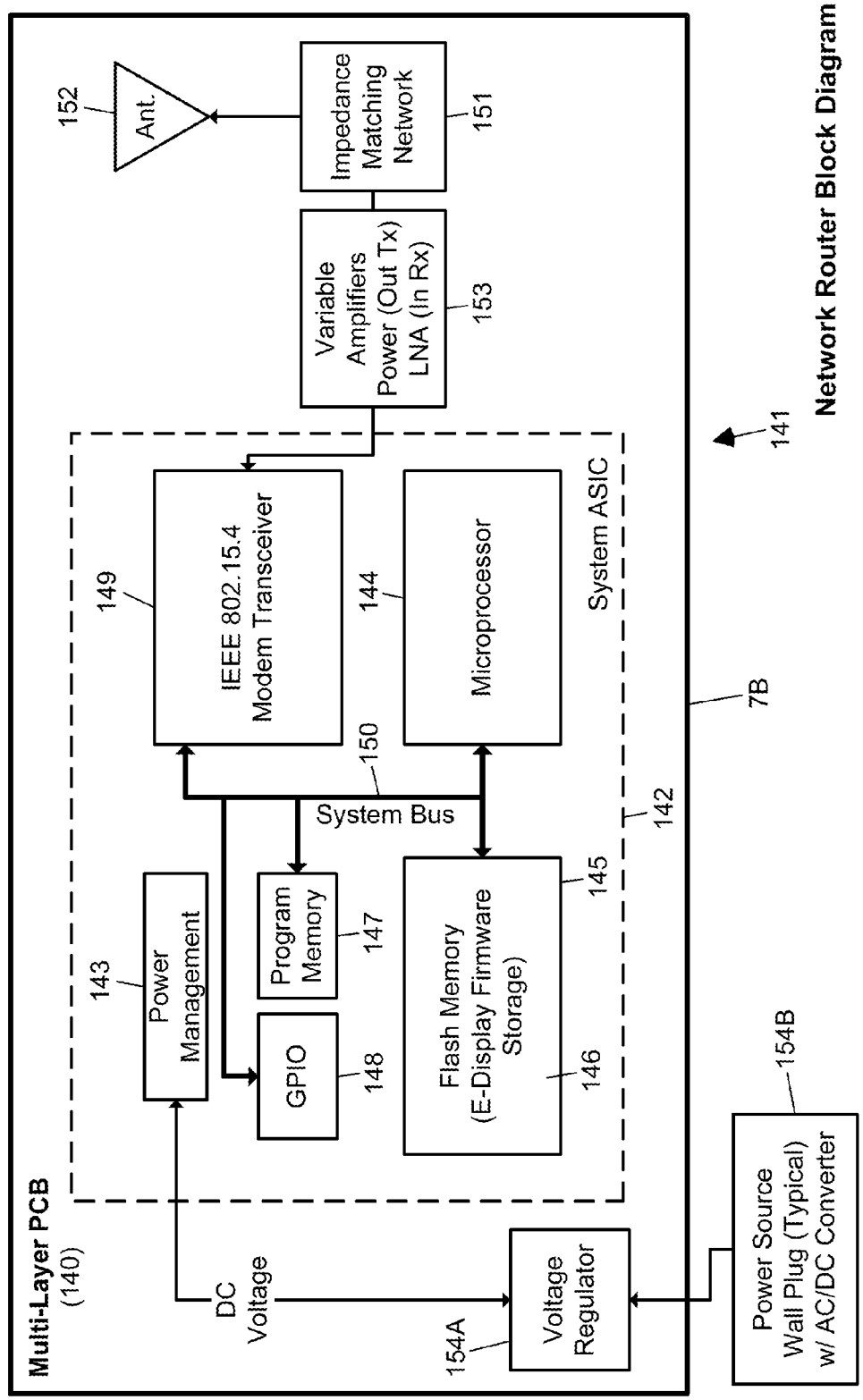
FIG. 8C is a schematic representation of the wireless network router of the present invention which may have a housing with a standalone module form factor, and an external wall source 120 VAC-12 VDC power adapter.

In FIG. 8C, an alternative embodiment of the network router of the present invention 7B is shown, employing a housing with a standalone module form factor, provided with an external wall source 120 VAC-12 VDC power adapter. As shown the network router module 7B comprises: a multilayer PCB board 140 within the housing 141, supporting the an ASIC-implemented system control module 142 including a power management module 143, a microprocessor 144, flash memory 145 for router and coordinator firmware storage 146, program memory 147 for storing programs during run-time, and GPIO submodule 148 connected to an IEEE 802.15.4 modem transceiver 149 through system bus 150; an impedance matching network 151 connected to a dipole or other type RF antenna structure (ANT 1) 152 and interfaced with a variable gain power amplifier (Out Tx) along the transmission line and a variable gain low-noise amplifier (LNA), (In Rx) 153 along the receiving line; a voltage regulation module 154A interfaced with the power management module 143; and an external power source 154B with a 120 VAC-12 VDC power adapter integrated therein.

When implementing the above-specified design for the network router module 7B of the present invention, the microprocessor, Tx/Rx amplifiers, program memory and flash memory, can all reside on a monolithic system ASIC (SOC), while F-antenna structure 151 may be integrated into the PCB 140, or be realized as a chip-based antenna to decrease the required footprint for the module.

Figure 8D:
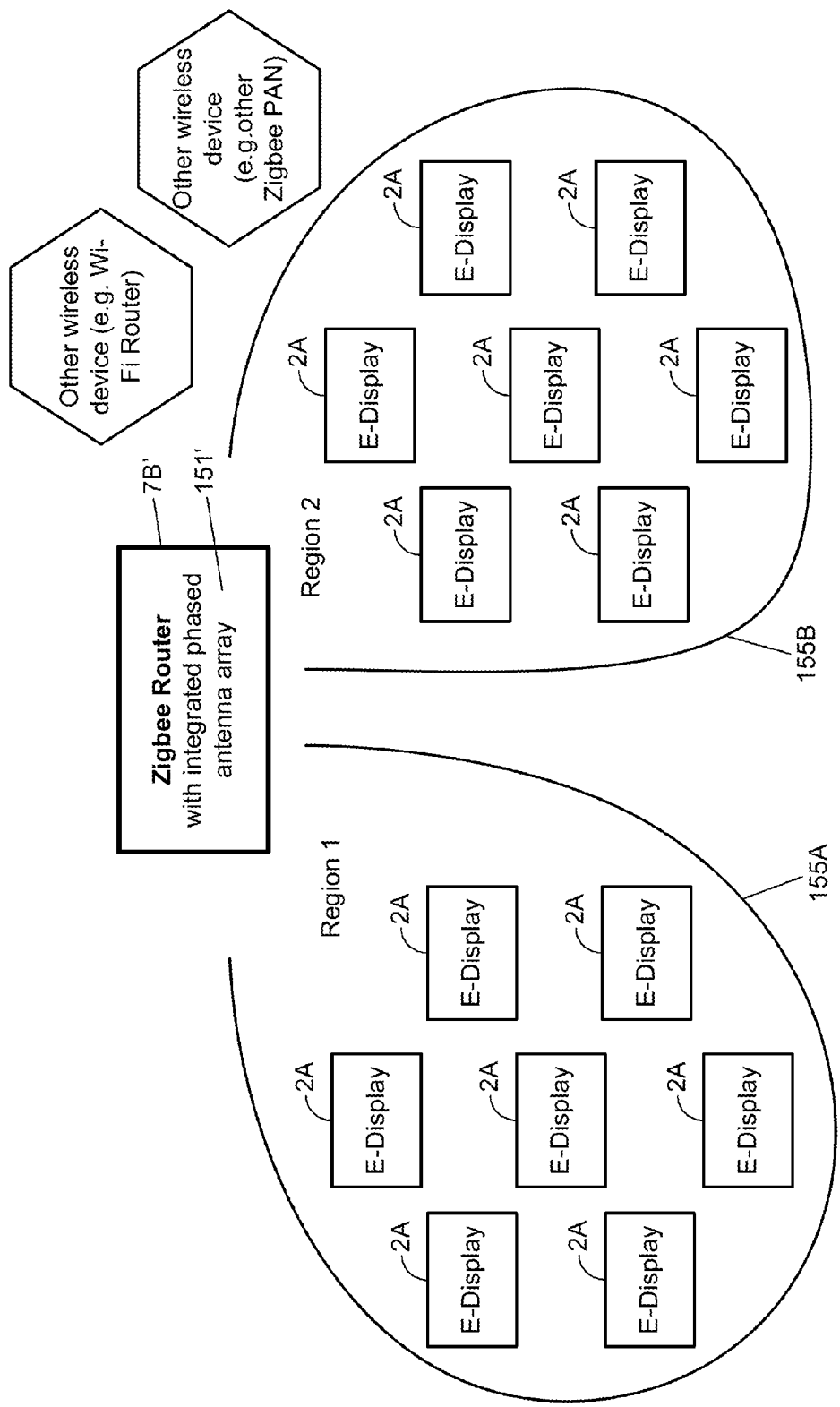
FIG. 8D is a schematic representation of a wireless network router device of the present invention having an integrated phased-array antenna structure, supporting multi-region isolation, utilizing beam steering principles of operation, for illuminating multiple electronic-ink devices over separate regions.

FIG. 8D shows the network router device of the present invention 7B having an integrated phased-array antenna structure 151, supporting the spatial isolation of multi-regions 155A-155B, utilizing beam steering principles of operation, for illuminating multiple electronic-ink devices 7A over separate regions 155A-155B. Utilizing its phased-array antenna structure 151', the network router device 7B' selects the desired region of operation based on principles which will be described in detail hereinafter.

The phased-array antenna structure or system employed in the router of the present invention is a group of antennas in which the relative phases of the respective signals feeding the antenna structure are varied so that the effective radiation pattern of the array is reinforced in a desired direction and suppressed in undesired directions. As shown in FIG. 8D, the network router 7B utilizes this array to isolate groups of network devices that are spatially separated from one another, as shown.

In FIG. 8D, there is shown two separated regions 155A-155B that are addressed separately by the phased-array antenna structure of the present invention. Region 1 155A may be selected by using the array to form a beam of radiation in its general direction. Region 2 155B may be selected by sweeping the beam directed at Region 1, into Region 2, thereby temporarily isolating Region 1 from the network and bringing Region 2 online to the network. Furthermore, in an effort to increase the integrity of the coexistence between multiple wireless networks, wireless devices not integral to the wireless network of the present invention will not be illuminated with radiation. This is achieved by suppressing the transmission of radiation in the general direction of such wireless devices.

Figure 8E:
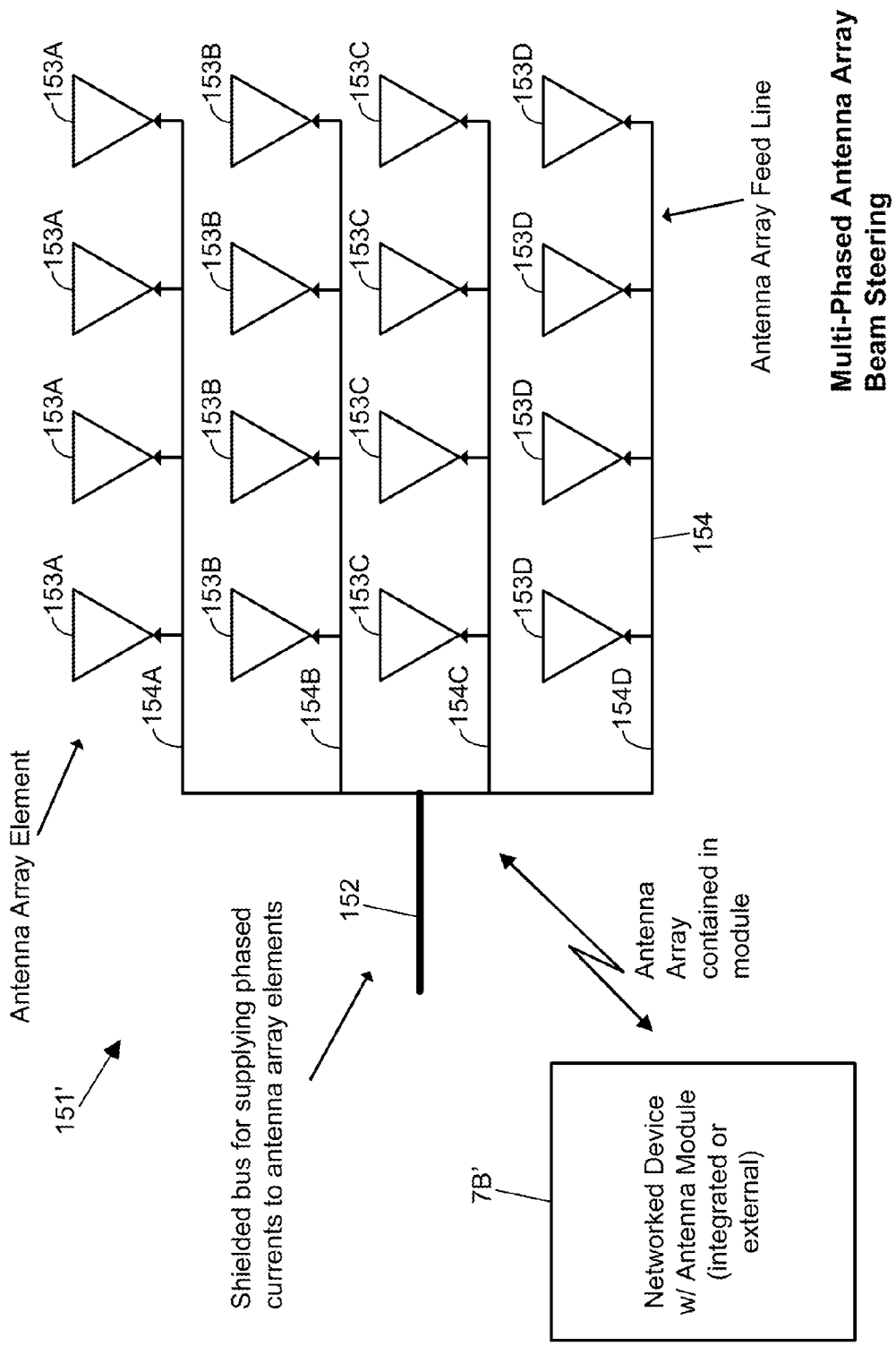
FIG. 8E is a schematic representation of the phased-array antenna structure of FIG. 8D, integrated within the housing of the wireless network router device of the present invention, and showing the shielded bus for supplying phased currents to the plurality of antenna array elements.

FIG. 8E shows the components of the phased-array antenna structure 151' that is integrated within the housing of the network router device of the present invention. As shown, a shielded bus 152 supplies phased electrical currents to its plurality of active antenna array elements 153A through 153D forming a multi-element (4×4) phase-array. As shown, each antenna element along a common feed line is coupled to a common source or load. When driven, the phase-array antenna system 151' produces a directive-type electromagnetic radiation pattern which may be varied by modifying the source of signal energy presented to each antenna element. The input to the antenna structure is connected to the input/output electronics of the router device. The signal transmitted or received by the router device may be compensated in the electronics for each antenna array. For example, the phase of the electrical currents supplied from the transmitter to each of the sixteen array elements, can be varied in such a way that a directive radiation pattern (i.e. main lobe) is formed with a half-power beam-width of 70 degrees. This main lobe may then be swept from 10 to 160 degrees in the x-direction by varying the phase of the currents supplied independently to each element in the antenna array, in a manner known in the art.

Figure 8F:
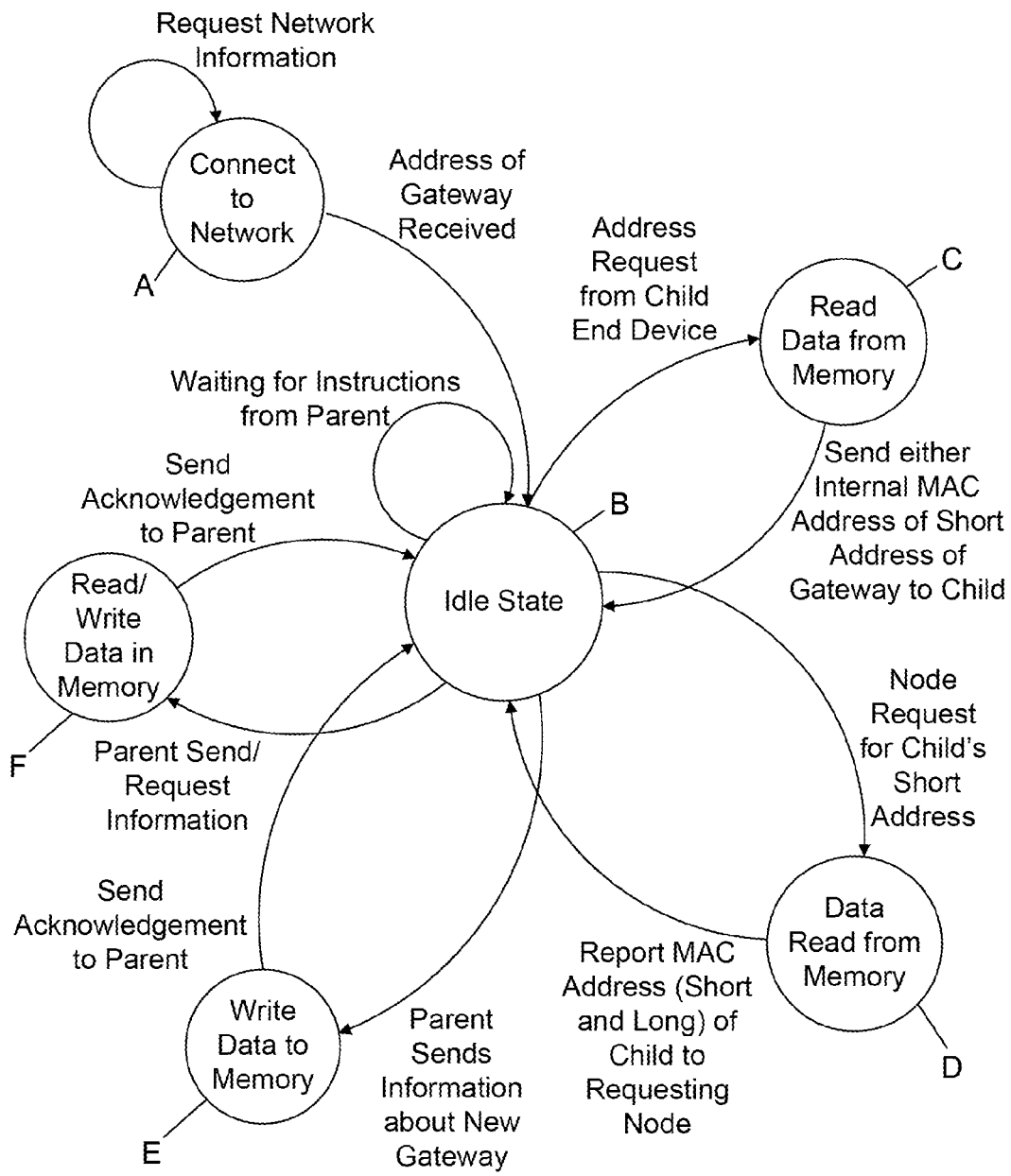
FIG. 8F is a state diagram representation of the wireless network router device of the present invention, depicted in FIGS. 8B and 8E, showing the various states of operation through which the network router device passes in automatic response to events occurring on its network.

FIG. 8F shows a state diagram for the network router device of the present invention, depicted in FIGS. 8B and 8E, illustrating the various states of operation through which the network router device passes in automatic response to events occurring on its network, including (i) connect to network state, (ii) an idle state (i.e. receive mode), (iii) a write to memory state, (iv) a read data from state, (v) a read/write to memory state, and (vi) a read data from memory state, and various conditions which trigger state transitions.

In general, upon power up, the router begins to search for available networks within its RF range. If a coordinator in its vicinity has established a network, then the router will join or connect to the network. The gateway in the network will then send its address to the router. The router will use this address to communicate with the host system when necessary. The router now enters an idle state. From here, different states can be activated depending on input from either the routers parent device, or the router's children. In an illustrative configuration of the network of the present invention, each router may have up to 20 children. This implies that each router can support 14 end-devices (e.g. electronic-ink display devices) and 6 additional routers. The child node of each router in the network is considered to be one layer below the parent node of the router. There is no limit to the number of layers that can be configured in the network, although there are tradeoffs when having too many network layers. One of these tradeoffs is network latency between the PC host system and the targeted end-device.

In view of the above overview, it is appropriate to now describe the particular states of the router device in greater detail below.

As shown in FIG. 8F, the router remains in its connect to network state A when it is requesting network information, and it transitions to the idle state B when it receives the address of the gateway node. The router transitions from its idle state to its read data from memory state C when receiving a request from a child end device, for its internal MAC address. The router transitions back to its idle state B after it sends either the internal MAC address, or short address of the gateway, to the child end device. The router transitions from its idle state B to its data read from memory state D when it receives a request from a node for the short address of a child node. The router transitions back to its idle node B after it reports the short or long MAC address of the child node, to the requesting node. The router transitions from its idle state B to its write data to memory state C when it receives new information about the gateway, from its parent node. The router returns to the idle state B after it sends an acknowledgement to the parent node. The router transitions from its idle state B to its read/write data in memory state when it receives a request to send information from its parent node. The router returns back to its idle state B after the router sends an acknowledgement to the requesting parent node.

Figure 8G:
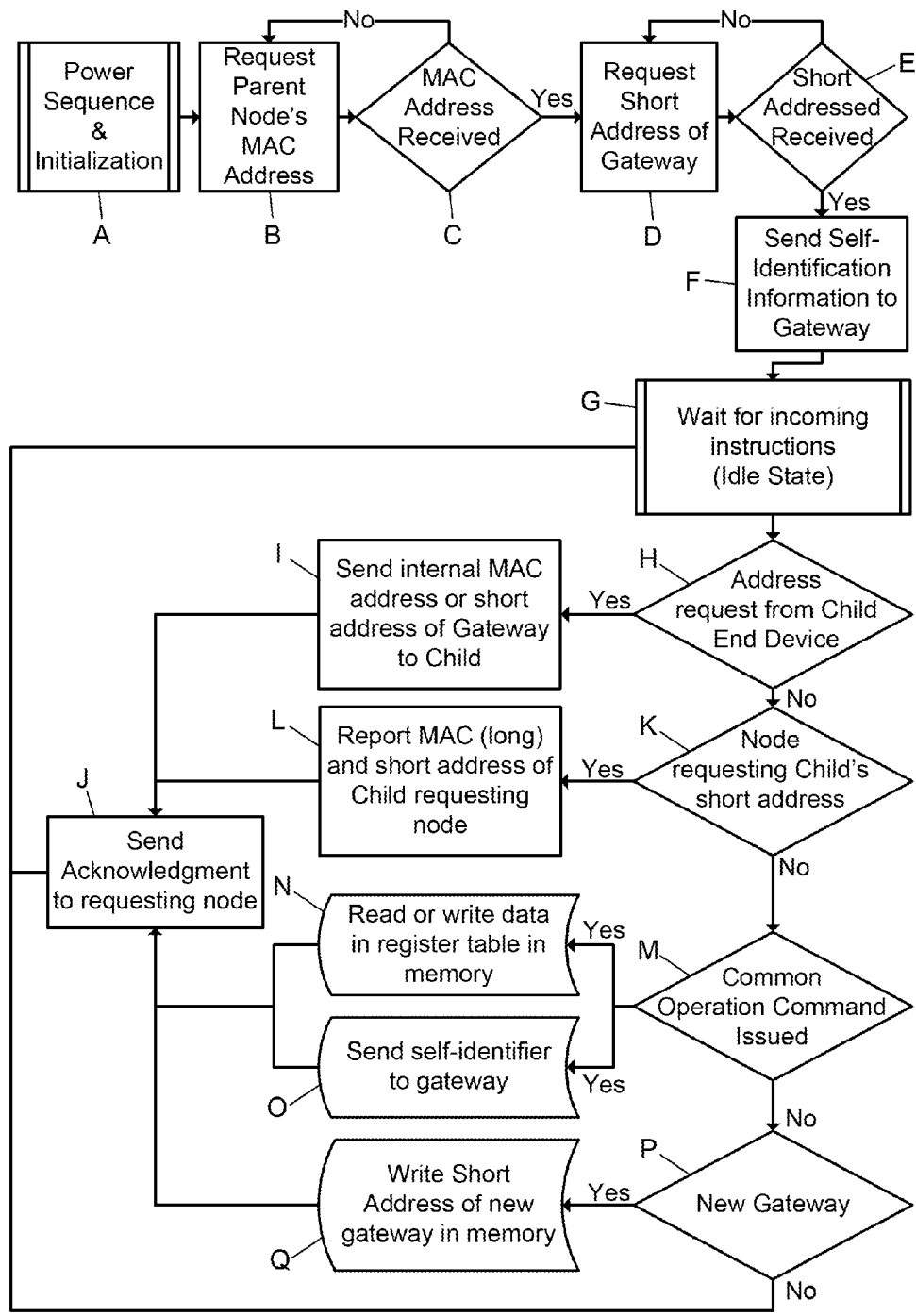
FIG. 8G is a flow chart illustrating the process carried out by the IEEE 802.15.4 firmware contained in the router device in the network of FIGS. 8A1 and 8F.

FIG. 8G provides an alternative way of describing the process carried out by the ZigBee IEEE 802.15.4 firmware contained in the router device in the network of FIGS. 8A1, 8A2 and 8F.

At Block A in the flow chart of FIG. 8G, the router firmware control process in the router first powers up and initializes its internal system.

At Block B, the router requests the MAC address for its parent node.

At Block C, the router remains in a control loop between Blocks B and C until it determines that the MAC address of the parent node has been received, and then proceeds to Block D.

At Block D, the router remains in a control loop between D and E until it receives the short address of the gateway, and then proceeds to Block F.

At Block F, the router sends self-identification information to the gateway and then proceeds to Block G.

At Block G, the router waits for incoming instructions (while configured in its idle state).

At Block H, the router determines whether an address request from a child end device has been received, and if so, then at Block I, it sends the internal MAC address, or short address of the gateway device, to the child end device, and then at Block J, sends an acknowledgment to the requesting node, and returns to the idle state.

At Block K, if the router does not receive the address from the child end device, then the router determines whether a node request for a child's short address has been received, if so, then at Block L, it reports the MAC address (long) and the short address of the child requesting node, and at Block J, sends an acknowledgment to the requesting node, and returns to the idle state.

At Block M, if the router does not receive the child's short address at Block K, then the router determines whether a common operation command has been issued, if so, then at Blocks N and O, reads or writes data in a register table in memory and sends a self-identifier to the gateway, and then at Block J, sends an acknowledgment to the requesting node, and returns to the idle state.

At Block P, if the router does not receive a common operation command at Block M, then the router determines whether a new gateway has been added to the network, if so, then at Block Q writes the short address of the new gateway in memory, and at Block J sends an acknowledgment to the requesting node, and returns to the idle state at Block G. If the router does not determine at Block P that a new gateway has been added to the network, then the router directly returns to the idle state.

Multi-Mode Router Device of the Present Invention

FIGS. 8H1 and 8H2 show the state diagram for the multi-mode network router of the present invention 7C. As shown, the multi-mode router passes through various states of operation, during its multi-mode operation, in automatic response to events occurring on its network, namely: a power up and initialization state; request network information state; switch to coordinator function/state; search for coordinator state; connect to network state; create network (i.e. PAN ID & channel); coordinator state diagram; higher-level coordinator search; hand current subnetwork over to coordinator; revert to router function; idle state; read data from memory; read data from memory; write data to memory; and read/write data in memory.

As illustrated in FIGS. 8H1 and 8H2, the router powers up and initializes during its power up and initialization state A, and then transitions to its request network information state B, where the router requests network information (i.e. searches for a network coordinator and a network to join). If the router finds network information, then it transitions to its connect to network state C, and when it receives the address of the network gateway, it enters its idle state D. The router transitions from its idle state D to its read data from memory state F when receiving a request from a child end device, for its internal MAC address. The router transitions back to its idle state D after it sends either the internal MAC address, or short address of the gateway, to the child end device. The router transitions from its idle state D to its data read from memory state G when it receives a request from a node for the short address of a child node. The router transitions back to its idle state D after it reports the (short or long) MAC address of the child node, to the requesting node. The router transitions from its idle state D to its write data to memory state H when it receives new information about the gateway, from its parent node. The router returns to the idle state D after it sends an acknowledgement to the parent node. The router transitions from its idle state D to its read/write data in memory state I when it receives a request to send information from its parent node. The router returns back to its idle state D after the router sends an acknowledgement to the requesting parent node.

If at the request network information state B, the router cannot find a network to join (i.e. network information is unavailable and time-out has expired), then the router transitions to the switch to coordinator function state J, at which time it transitions to create network state (e.g. PAN ID & channel) K.

When the network has been created (i.e. established), the router transitions to its coordinator state functions L (illustrated in FIGS. 7D and 7E), and transitions to the higher level coordinator search state M when requested to look for a higher level coordinator. If the router cannot find a higher level coordinator at the higher level coordinator search state M, then the router returns back to the coordinator state functions L. If the router does find a higher level coordinator, then it transitions to the hand current sub-network over to the coordinator state N. When the network transfer is complete, then the router transitions to revert to router function/state O, and then returns to the request network information state B, as indicated in FIGS. 8H1 and 8H2.

Figure 8I:
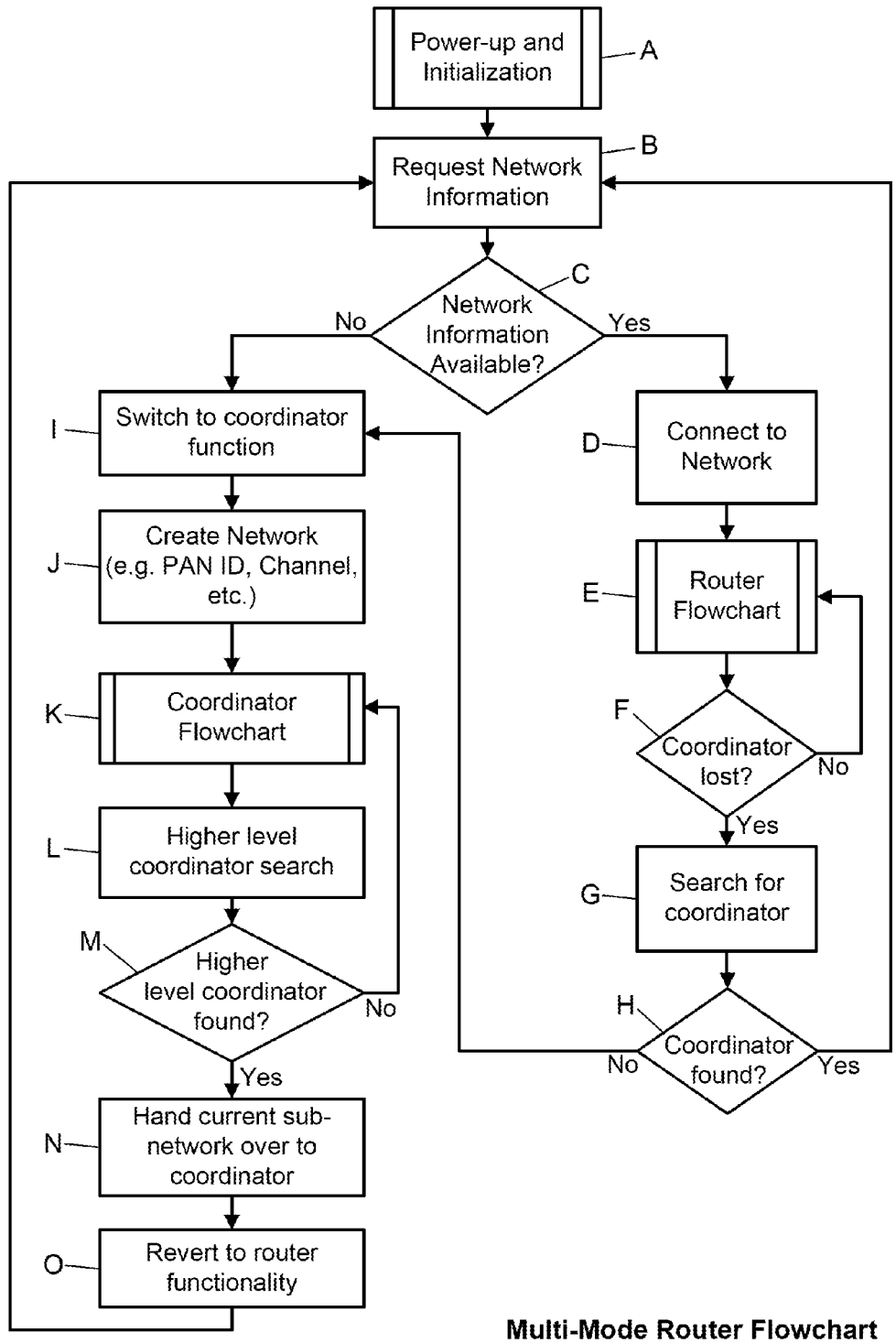
FIG. 8I is a flow chart illustrating the process carried out by the firmware contained in the wireless multi-mode network router device of the present invention shown in FIGS. 8G through 8H2.

FIG. 8I illustrates the process carried out by the firmware contained in the wireless multi-mode network router device of FIGS. 8H1 and 8H2.

At Block A in FIG. 8I, the multi-mode router powers up and initializes. Then at Block B it requests network information for an available network it may join. At Block C, the router determines whether or not any networks are available to join. If there is at least one available network to join, then it connects to one of the networks at Block D. Then at Block E, the router performs the function of a router as indicated in FIGS. 8F and 8G. At Block F, the router determines whether or not the network coordinator has been lost (for any reason). If communication with the network coordinator has not been lost, then the router returns to its router functions indicated at Block E, and if communication with the network coordinator has been lost, then the router proceeds to Block G and searches for a network coordinator.

At Block H, the router determines whether or not a network coordinator has been found, and if so, then returns to Block B where it resumes requesting network information associated with the found coordinator. However, if the coordinator has not been found, then the router proceeds to Block I, reconfiguration and switches to its coordinator functions. Then the router, in its coordinator states of operation, proceeds to Block K and creates a network (e.g. Personal Area Network (PAN) ID, Channel, etc). At Block K, the router performs its coordinator state functions indicated in FIGS. 7D and 7E, and then at Block L searches for a higher level coordinator on the network. At Block M, the router then determines whether or not a higher level coordinator has been found, and if not, returns to Block K, as shown. However, if the router does find a higher level coordinator at Block M, then at Block N, the router hands over the current subnetwork under its control to the higher level coordinator. After the subnetwork hand-over is completed at Block N, then at Block O the router reverts to its router functionalities, and returns to Block B and continues requesting network information.

Figure 8J:
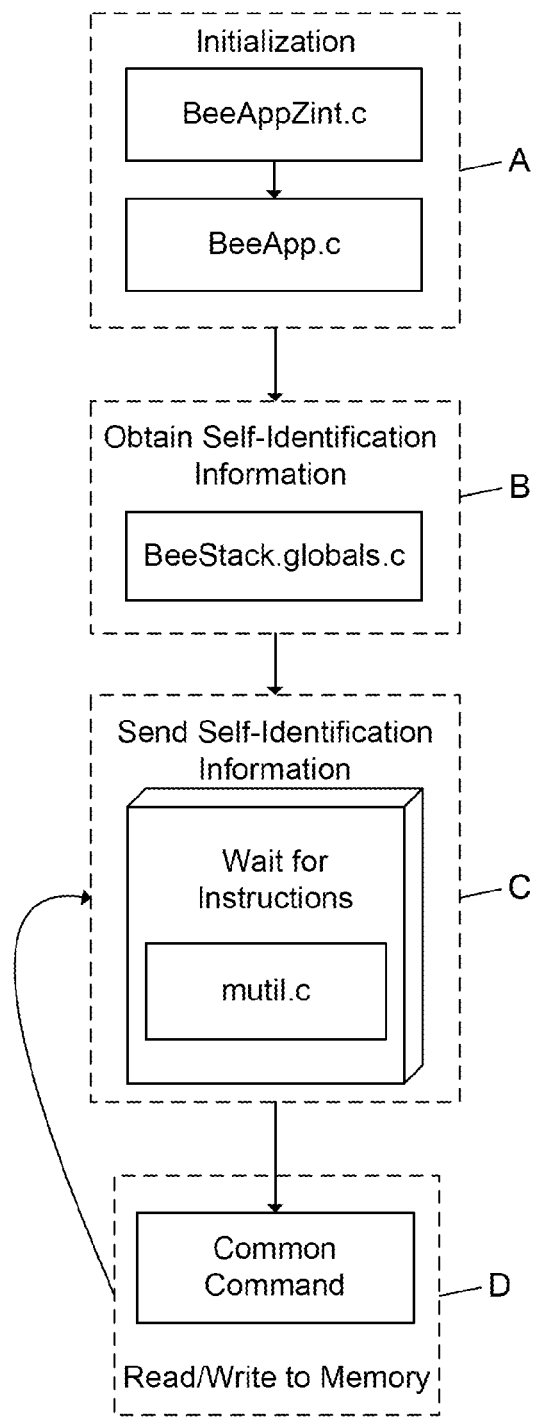
FIG. 8J is a flow chart schematic representation of the router devices described in FIGS. 8G and 8I, illustrating the firmware components employed to carry out processes supported therein.

As shown in FIG. 8J, the firmware architecture employed in the router devices of described in FIG. 8G or 8I, generally comprises five C files organized as shown. As indicated at Block A in FIG. 8F, the initialization step is carried out using firmware components BeeAppZin.c and BeeApp.c for configuring the ZigBee wireless network. At Block B, the self-identification information acquisition step is carried out using firmware components BeeStack.globals.c which enables each network device, e.g. electronic-ink display, to identify itself on the network and obtain its parent's MAC address. At Block C, the self-identification information transmission step is carried out using firmware components mutil.c. When the router is in the idle state, the mutil.c program is initialized. At Block D, the router can read/write to memory using firmware components common command.c, and support both its children and parent devices.

Figure 9A:
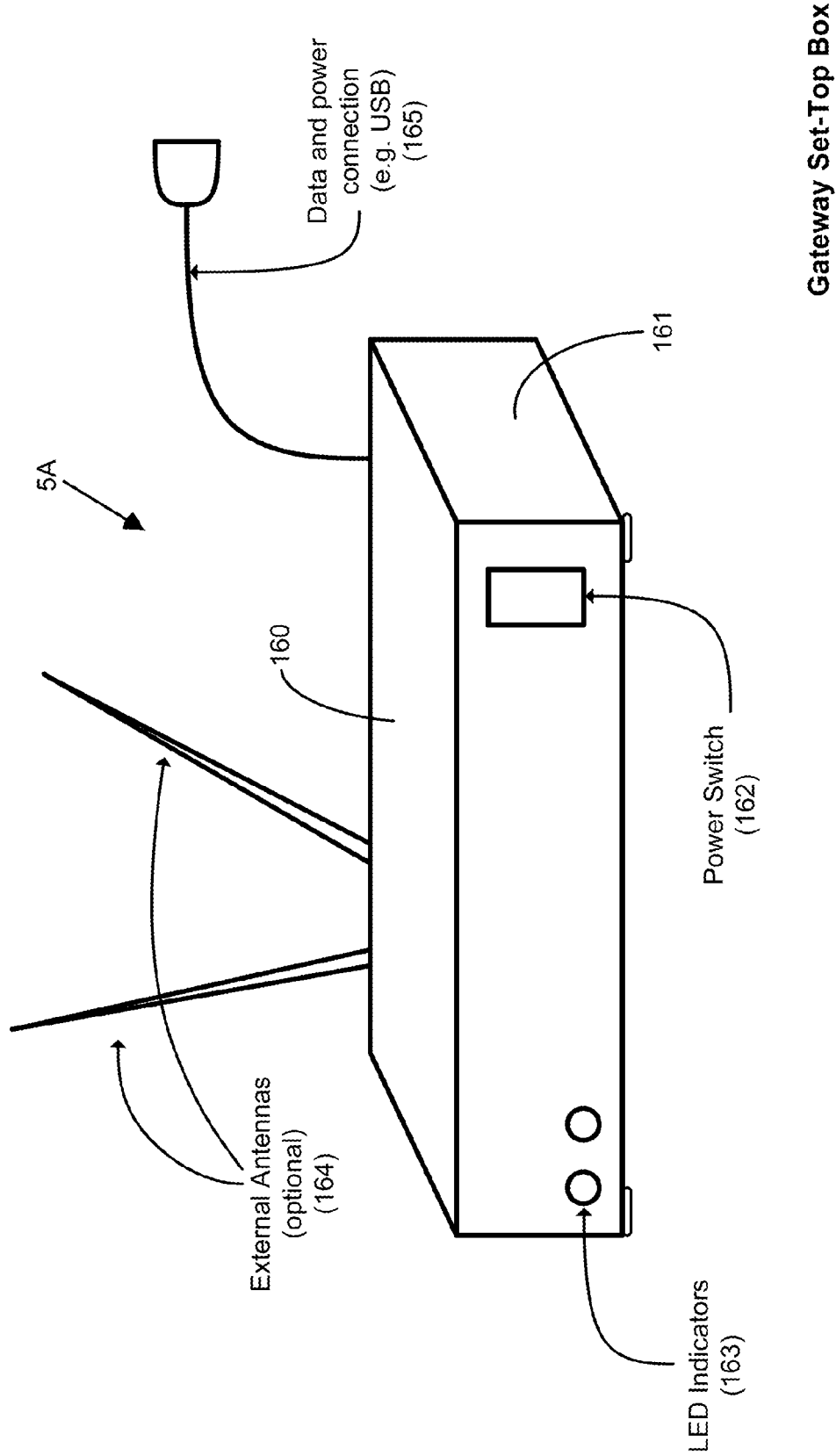
FIG. 9A is a perspective view of a wireless gateway set-top box for use in the wireless communication network of the present invention, illustrated in FIGS. 1A1 through 1C.

Gateway Set-Top Box for Use in the Wireless Communication Network of the Present Invention FIG. 9A shows a gateway set-top box for use in the wireless communication network of the present invention, illustrated in FIGS. 1A1 through 1C. As shown in FIG. 9A, the gateway set-top box 5A comprises: a housing 160; a multi-layer PCB 161 populated with the subsystems, circuits and devices represented in FIG. 9B; a power switch 162 integrated with the housing; LED indicators 163 integrated with the housing; (optional) external antennas 164 for communication with wireless nodes in the wireless communication network; and a data and power connector 165 for connection of data/power cable such as a USB cable.

The function of the gateway set-top box 5A is to provide a link between the host computer 21A, 21B and wireless mesh communication network of the present invention. As shown in FIGS. 1A and 2, the gateway box 5A communicates with the coordinator 6 to gain access to the various children nodes in the network. Implementation of the gateway set-top box can be implemented using substantially the same hardware design as used for the router and the coordinator devices of the present invention, described above in great detail. However, in the gateway box of the illustrative embodiment, electrical power can be delivered to the box by way of the USB port on the host computer 21A, 21B. Unlike the coordinator device, the gateway device may connect/disconnect from the network at will without any disruption to the network. However, when the gateway is down or disconnected from the network, the host systems 21A, 21B are incapable of manipulating the network or extracting data from it.

Figure 9B:
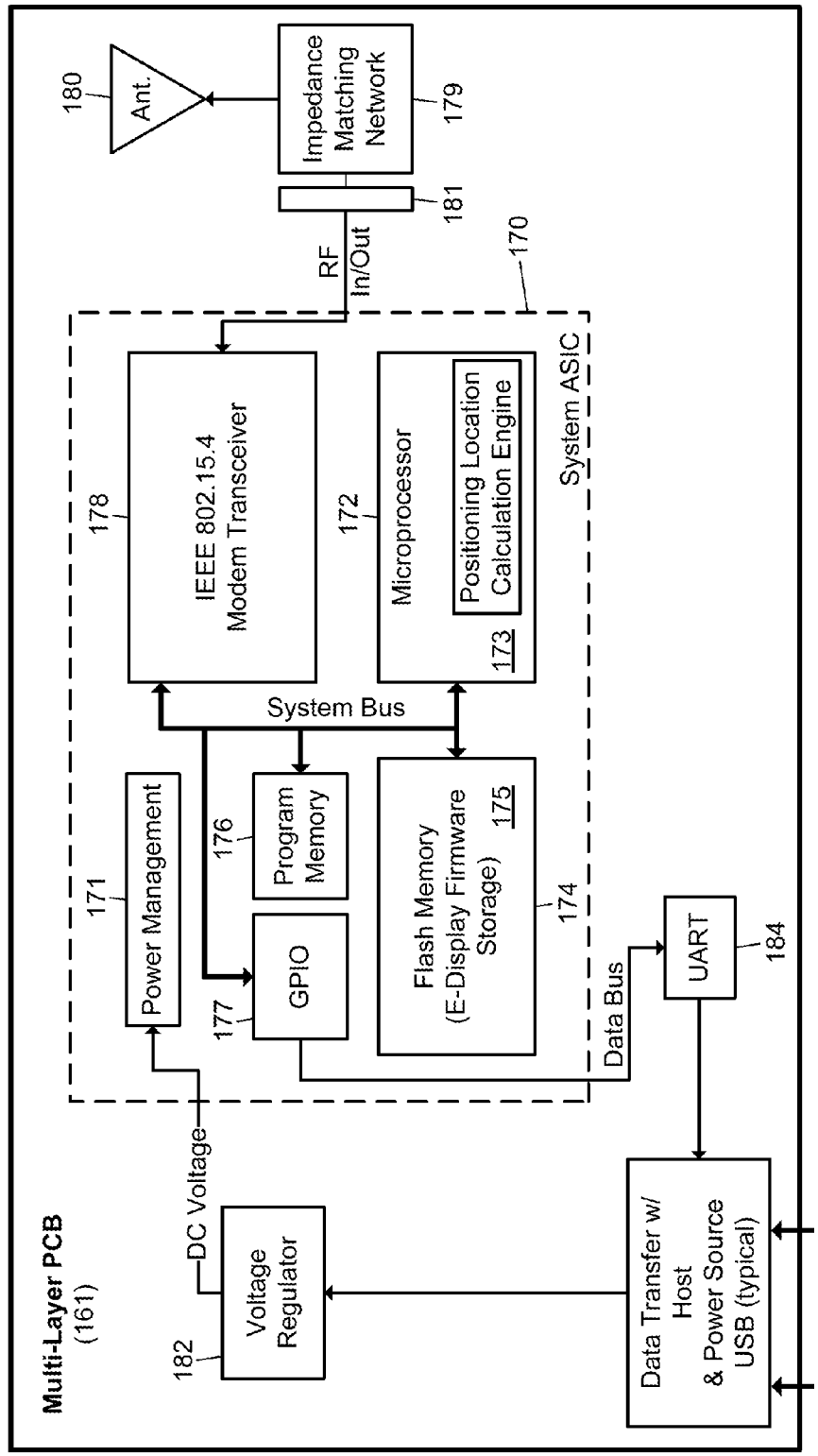
FIG. 9B is a schematic representation of the wireless gateway set-top box illustrated in FIG. 9A.

In FIG. 9B, the gateway set-top box 5A of FIG. 9A is shown comprising: an ASIC-implemented system control module 170 realized on a multi-layer PCB board 161 and including a power management module 171, a microprocessor 172 with an integrated position calculation engine 173, flash memory 174 for gateway firmware 175 storage, program memory 176 for executing programs in run-time, and a GPIO submodule 177 connected to an IEEE 802.15.4 modem transceiver 178; an impedance matching network 179 connected to an RF antenna structure (ANT 1) 180 and interfaced with a variable gain power amplifier (Out Tx) and a variable gain low-noise amplifier (LNA), (In Rx) 181 which are connected to the modem transceiver 178; a voltage regulation module 182 interfaced with the power management module 171, and a data transfer module 185 with power source lines 165, that interconnect with a host system 21A, 21B via a data and power communication interface (USB) 185. The communication interface 184 between the host system (data lines) and the ASIC 170 can be implemented using a SiLabs USB-to-UART chip, or the like.

Figure 9C:
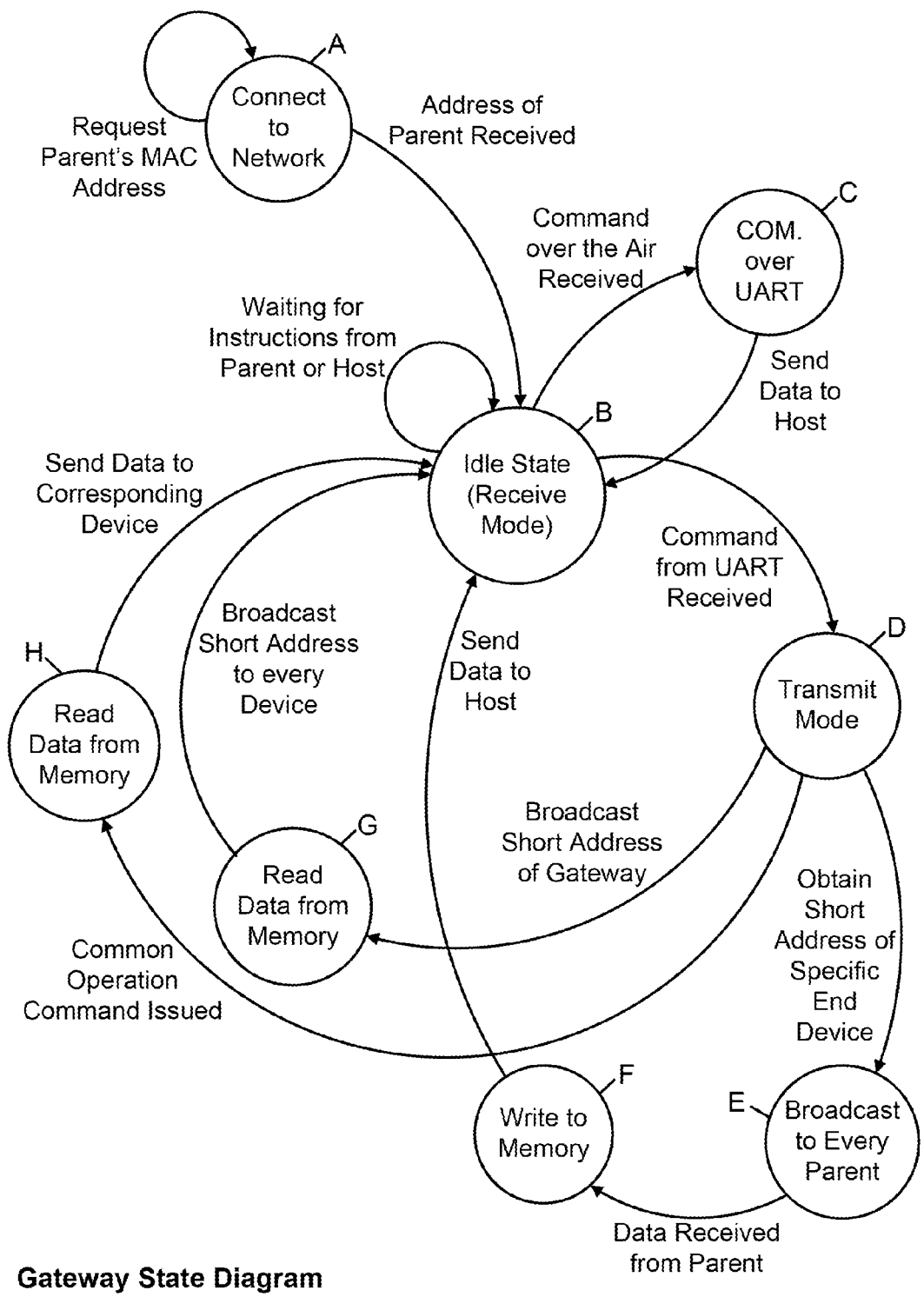
FIG. 9C is a state diagram representation of the wireless gateway set-top box of the present invention, depicted in FIGS. 9A and 7B, showing the various states of operation through which the wireless network coordinator device passes in automatic response to events occurring on its network.

In general, upon power up, the gateway set-top box 5A begins to search for a wireless network. The gateway may join the network through a detected parent device. The parent device can be either a router or the network coordinator. Once the address of the parent has been received, the gateway enters an idle state B. The gateway may move to another state of operation when receiving an input command, by way of either its UART 184 or its wireless interface (180, 179, 178). FIG. 9C depicts the different states that may be invoked in the gateway, in response to particular events and conditions, and how the gateway moves from one state to the next state. After any sequence of states, the gateway always returns back to its idle state B, and waits for the next input command.

Figure 9D:
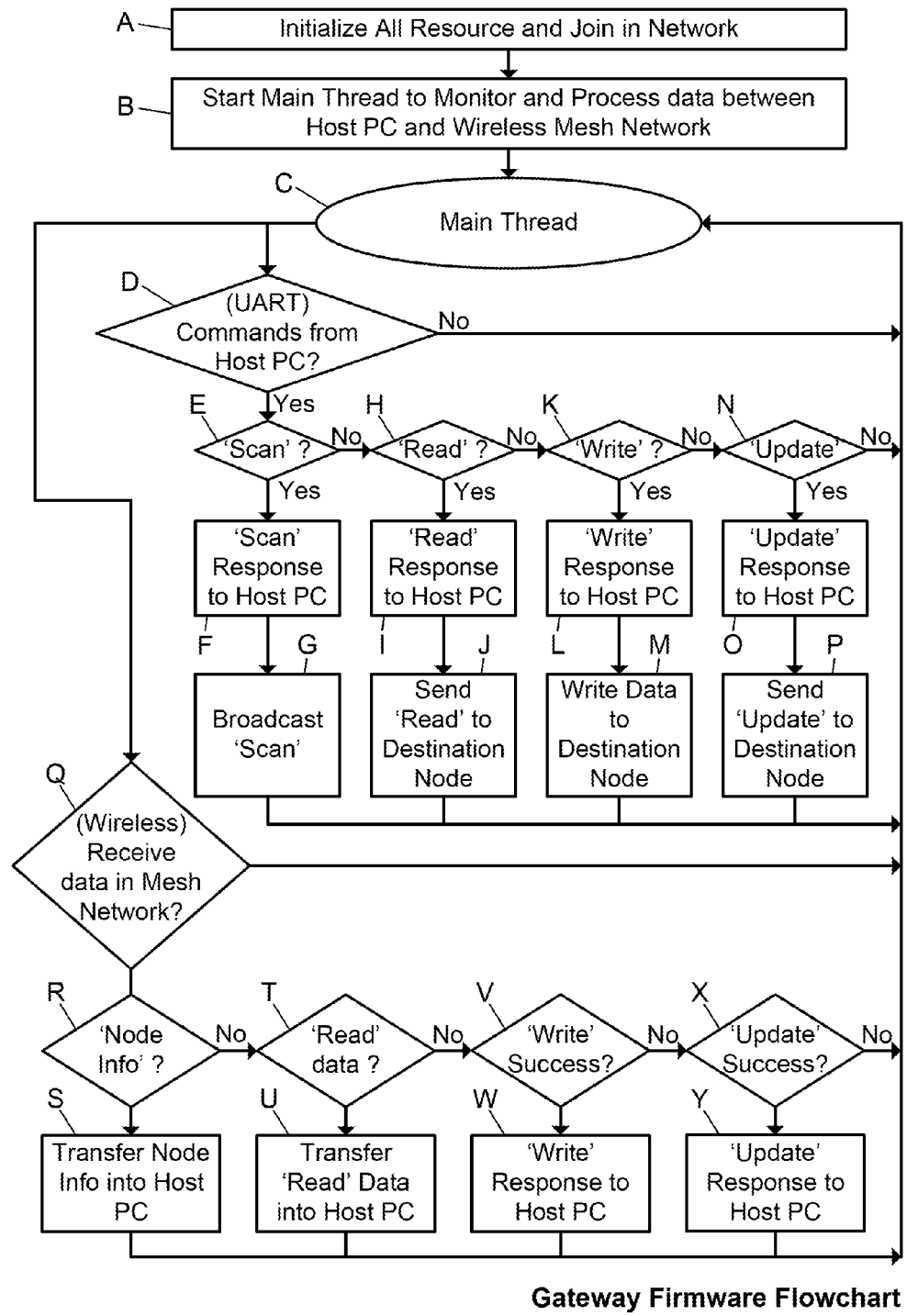
FIG. 9D is a flow chart schematic representation illustrating the steps carried out by the firmware within the wireless gateway set-top box illustrated in FIG. 9A.

In FIG. 9D, the state diagram describes in greater detail the particular states of operation through which the gateway set-top box passes in automatic response to events occurring on its network, including (i) a connect to network state, (ii) an idle state (i.e. receive mode), (iii) a COM over UART state, (iv) a transmit state (mode), (v) a broadcast to every parent node state, (vi) a write to memory state, (vii) a read data from memory state, and (viii) a read data from memory state.

As indicated in FIG. 9C, the gateway remains in its connect to network state when it is requesting its parent's MAC address, and it transitions to the idle state B when it receives the address of its parent node. The gateway transitions from its idle state B to its COM over UART state C when a command over the airway is received by the gateway. The gateway returns back to the idle state B after it sends data to its host system. The gateway transitions from idle state to the transmit data state D when a command from the UART is received. The gateway transitions from its transmit state to its broadcast to every parent state E when it obtains the short address of a specific end device. The gateway transitions from the broadcast to very parent state E to its write to memory state when data is received from its parent node. The gateway transitions from its write to memory state F to its idle state after it sends data to its host system. The gateway transitions from its transmit state D to its read data from memory state G after it broadcasts the short address of the gateway, wherein the gateway transitions from its read data from memory state G back to its idle state B after it broadcasts a short address to every end device in the network. The gateway transitions from the transmit state D to the read data from memory state H when a common operation command is issued. The gateway transitions from its read data from memory state H to its idle B state after its sends data to the corresponding device.

FIG. 9D describes the steps carried out by the firmware control process within the gateway set-top box 5A of FIG. 9A.

At Block A in FIG. 9D, the gateway set-top box 5A involves initializing all resources and joining in the wireless network, At Block B, the firmware control process starts its main thread to monitor and process data between the host PC and the wireless network.

At Block C, the gateway firmware control process enters its main thread, from which several possible paths can be taken, as shown in FIG. 9D.

At Block D, the firmware control process determines whether the UART 184 has received commands from the host PC and also the type of command received. If the UART has not received any command, then the gateway firmware control process returns to the main thread at Block C.

If the UART has received commands, then the gateway firmware control process determines whether a scan command has been received, and if so, then at Block E sends the scan response to the host PC, at Block F broadcasts the scan commands, and then returns to the main thread at Block C.

If a scan command has not been received, then at Block H the gateway firmware control process determines whether a read command has been received, and if so, then at Block I sends the read response to the host PC, at Block J sends the read command to the destination node, and returns to the main thread at Block C.

If a read command is not received at Block H, then at Block K, the gateway firmware control process determines whether a write command has been received, and if so, then at Block L sends the write response to the host PC, at Block M writes data to the destination node, and returns to the main thread at Block C.

If the gateway firmware control process determines that a write command has not been received at Block K, then at Block N determines whether a update command has been received, and if so, then at Block O sends the write response to the host PC, at Block P sends the update command to the destination node, and returns to the main thread.

If the gateway firmware control process determines that an update command has not been received at Block N, then the firmware control process returns to the main thread at Block C.

In the event that at Block Q, the gateway firmware control process determines that the gateway has not received (wirelessly) data from the wireless mesh network, then the firmware control process returns to the main thread at Block C.

In the event that at Block Q the gateway firmware control process does receive (wirelessly) data from the wireless mesh network, then the gateway firmware control process determines at Block R whether node information has been received, and if so, at Block S transfers the node information into the host PC, and returns to the main thread.

In the event that at Block R the gateway firmware control process does not receive a node information request, then at Block T, the gateway firmware control process determines whether read data has been received, and if so, then at Block U transfers the read info into the host PC, and returns to the main thread at Block C.

In the event that at Block T the gateway firmware control process does not receive a read data command, then at Block V, the gateway firmware control process determines whether a write data has been received, and if so, then at Block W writes a response into the host PC, and returns to the main thread.

In the event that at Block V the gateway firmware control process does not receive a write command, then at Block X, the gateway firmware control process determines whether an update command has been received, and if so, then at Block Y transfers the update response into the host PC, and returns to the main thread.

Figure 9E:
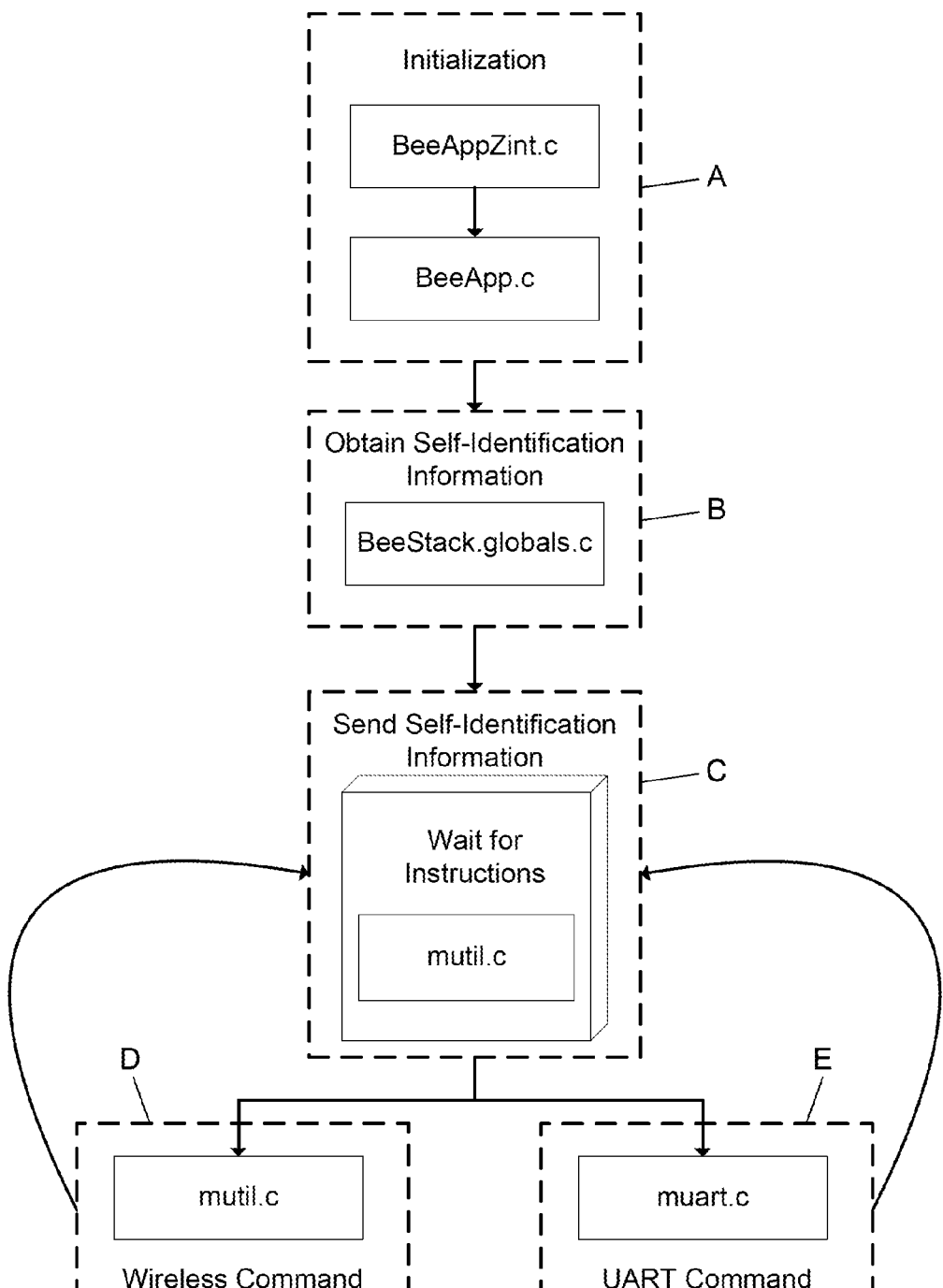
FIG. 9E is a flow chart schematic representation of the wireless gateway set-top box illustrated in FIG. 9A, illustrating the firmware components employed to carry out processes supported therein.

As shown in FIG. 9E, the firmware architecture employed in the gateway set-top box device comprises six C files organized as shown. As indicated at Block A in FIG. 9E, the initialization step is carried out using firmware components BeeAppZin.c and BeeApp.c for configuring the wireless mesh network. At Block B, the self-identification information acquisition step is carried out using firmware components BeeStack.globals.c which enables the gateway box to identify itself and obtain its parent's MAC address. At Block C, the self-identification information transmission step is carried out using firmware components mutil.c. When the gateway box is in the idle state, the mutil.c program is initialized, and the gateway box can support communication between both the UART and the wireless interface. At Block D, the gateway box can send wireless commands using firmware component mutil.c. At Block E, the gateway box 5A can receive UART commands using firmware component muart.c.

Network Protocol Translation (NPT) Based Gateway Device for Use in a Wireless Communication Network of the Present Invention FIGS. 9F1 and 9F2 show a network protocol translation (NPT) based gateway device 5A for use in a wireless communication network of the present invention, as illustrated in FIGS. 1A1 through 1C.

Figure 9G:
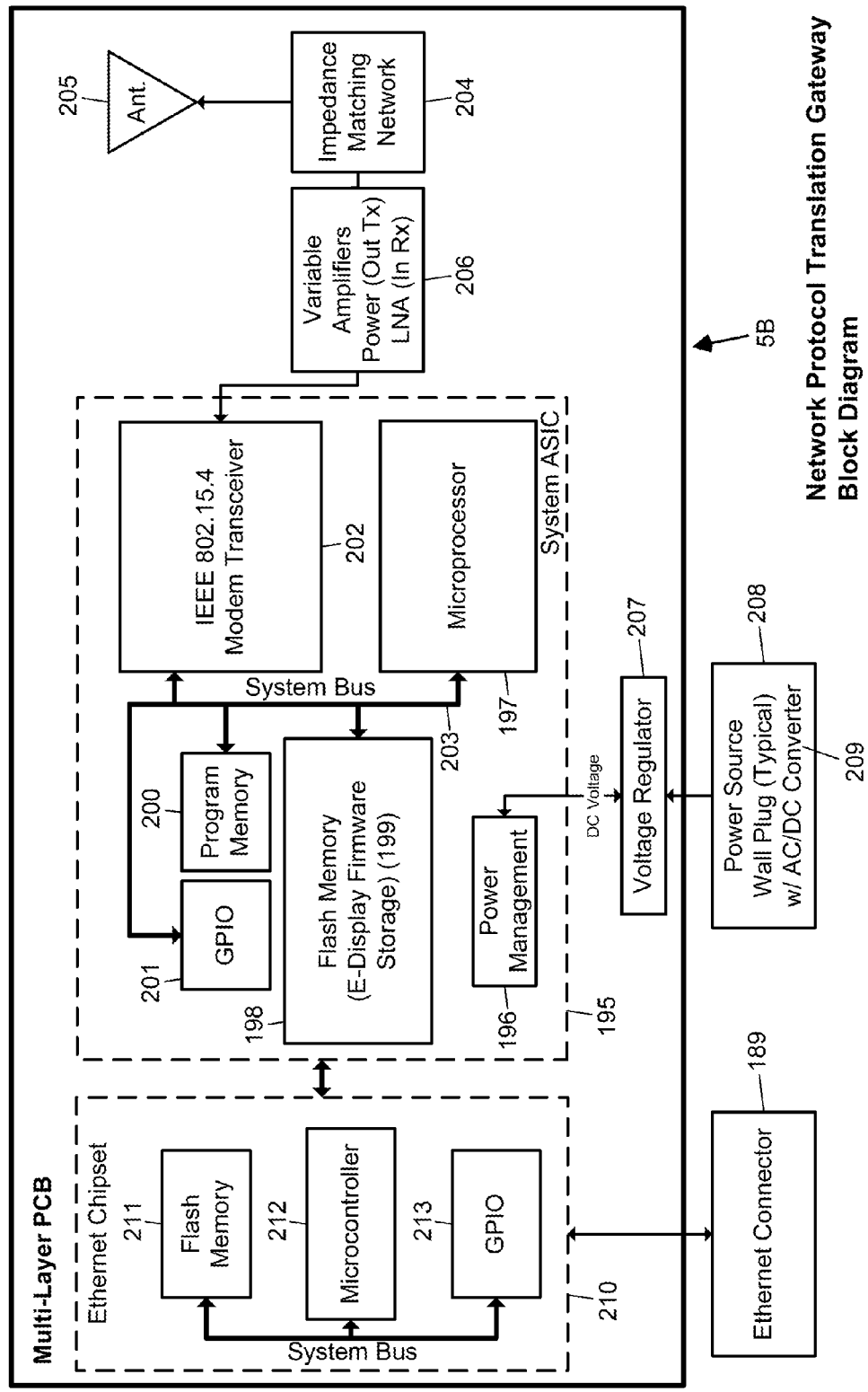
FIG. 9G is a schematic representation of the wireless network protocol translation gateway device illustrated in FIGS. 9F1 and 9F2.

As shown in FIGS. 9F1 and 9F2, the NPT-based gateway device 5B comprises: a housing 186; a multi-layer PCB 87 supporting the subsystems, circuits and devices illustrated in FIG. 9G; electrical power plug prongs 188 integrated with the housing; an Ethernet connector jack 189 integrated with the housing, for connecting an Ethernet cable thereto; LED indicators 191 integrated with the housing; (optional) external antennas 192 integrated with the housing; and a securing mechanism 193 integrated with the housing, for physically securing the housing to an electrical wall socket, or other fixture, to prevent theft or unauthorized movement.

In FIG. 9G, the NPT-based gateway device 5B of FIGS. 9F1 and 9F2, is shown comprising: (i) an ASIC-implemented system control module 195, including a power management module 196, a microprocessor 197, flash memory 198 for gateway firmware 199 storage, program memory 200 for executing firmware programs during run-time, and a GPIO submodule 201 connected to an IEEE 802.15.4 modem transceiver 202, with all components being interfaced by way of a system bus 203 (ii) an impedance matching network 204 connected to an RF antenna structure (ANT) 205 and interfaced with a variable gain power amplifier (Out Tx) and a variable gain low-noise amplifier (LNA), (In Rx) 206 which is interfaced to the IEEE 802.15.4 modem transceiver 202; (iii) a voltage regulation module 207 interfaced with the power management module 196 and to a power source wall plug module 208 having an AC/DC converter 209; and (iv) an Ethernet chipset 210 interfaced with the system ASIC 195 and an Ethernet connector 189 integrated with the housing, and including a flash memory 211 for storing firmware for the gateway device and its network translation services, a microcontroller 212 for executing firmware programs and instructions, and a GP/IO 213 for supporting I/O services.

While not shown in a state diagram, the NPT-based gateway device 5B will have states of operation that are similar to the gateway set-top box 5B described above. Also, the NPT-based gateway device 5B will have the same firmware components as used in the gateway set-top box described above, plus firmware components that support network protocol translation e.g. from ZigBee to Ethernet communication protocols, and from Ethernet to ZigBee communication protocols.

Managing Electronic-Ink Based Display Devices on Wireless Communication Networks through Gateway Devices Using Databases and Web-Based GUIs Supported on a PC-Level Host Systems Having described the architecture, topology and implementation of the wireless electronic-ink display device communication network of the present invention, it is appropriate at this juncture to describe different ways in which the wireless communication network of the present invention can be easily and efficiently managed from both local and remote locations.

In FIG. 10A, there is shown an exemplary graphical user interface (GUI) screen which could be generated by the electronic-ink display messaging management application 700 installed on the network management computer systems 21A and 21B, described above, and/or remote client computing machines having access to the LAN of these network management systems. As shown, this GUI, and its application and supporting database, are designed to allow a network administrator (or others) to remotely manage, via a Web browser, (i) the messaging programmed onto each display electronic-ink display device in the wireless network, along with its sign/display identification number and description, as well as (ii) the states of the network map, the open communication port, the close/end communication port, and the network database, supporting one or more wireless communication networks.

In FIG. 10B, there is shown an exemplary GUI screen, also generated by the management application 700 installed on the network management computer systems 21A and 21B, and/or remote client computing machines having access to the LAN of these network management systems. As shown, this GUI, and its application and supporting database, are designed to allow a network administrator to remotely manage, via a Web browser, the tables in the wireless network database, holding information on each network device, including, device number on the network (e.g. 0000002030), device type (e.g. coordinator, gateway, router, end device, etc.), MAC address assigned to device (e.g. 683AB9C90011), description of device/association with other devices, currently programmed message for display on the device.

In FIG. 10C, there is shown another exemplary GUI screen generated by the management application 700, and showing a network map representation of an exemplary wireless network configuration according to the present invention, allowing information maintained on each node in the network (e.g. device number, MAC address, node description, current message display) to be displayed in expanded form when the network administrator selects the network node to be detailed.

Referring to FIG. 10A, the network-management GUI shown therein provides a network administrator or manager with a very easy way to access and manage a wireless mesh communication network, of the kind illustrated in FIGS. 1A, 1B and 1C. Underlying the network management GUI, there is provided a library of API's, packaged into a software development kit (SDK), for creating custom applications that run on the host system shown in FIGS. 1A, 1B and 1C.

In an illustrative embodiment, the GUI-based network management interface application of the present invention comprises a library of standard Microsoft Windows DLL files, for integration into the host PC-level computing systems 21A, 21B, 21C, performed by the end-user or systems integrator. This library provides for a flexible development environment so that an end-user can have a fully-customized solution without becoming involved with the underlying technical details of the wireless communication network. The SDK also contains a reference GUI employing a simple database for managing information relating to a population of electronic-ink display devices (e.g. e-signs). In the simplest application, the GUI and its supporting interface library will provide an end-user with access to the network for purposes of locating, updating and managing electronic-ink display devices, electronic-ink display sensors, and other end-devices on the network. In some low-volume installations, the network GUI can be extended sufficiently to manage the network itself, including its routers, coordinator(s), gateways, NPT modules, network management modules, and the like.

In the preferred embodiment of the present invention, the network-management GUI is realized as a shell wrapped around a set of APIs that provides access to the network via the gateway 5A, in FIGS. 1A, 1B and 1C. Communication between the host computing systems 21A, 21B, 21C and the network gateway 5A is established by opening the corresponding COM port, indicated on the network GUI shown in FIG. 10A. A user may select any multiplicity of electronic-ink display devices (i.e. e-displays), and then write a value (or set of values) to their display(s) by pressing the Send Data button. Once the Send Data button has been activated on the GUI, the host computing system 21A, 21B, or 21C calls the appropriate library functions to access the gateway. In turn, the gateway is instructed as to which e-displays should be addressed, along with the corresponding value(s) and/or messages (however complex) to be written to the e-display. Each e-display device addressed returns an acknowledgment of receipt of the message. This status is confirmed on the network management GUI at completion of the e-display update, or after a timeout period. The GUI can also poll each e-display for its current display value, and for the current display value to be written to memory on the host system, and then displayed on the GUI.

In an alternative embodiment, application server software (i.e. middleware) can be installed on the application server 22A, 22B, for directly connecting a wireless communication network of the present invention to a back-end database system (RDBMS). With this alternative arrangement, each application server 22A, 22B and its RDBMS can support a greater set of network management services for a large class of Web-based end-users charged with responsibility of managing e-display devices, e-display sensors, and other end-devices on the wireless communication network of the present invention.

Regardless of the arrangement employed, such network management functionalities will provide a user-friendly management console to deploy and manage wireless communication networks of the present invention. To facilitate the configuration of such wireless networks, a network management suite will be provided, consisting of tools for system integrators and operators to configure, deploy and manage one or more wireless communication networks, as illustrated in FIGS. 1A, 1B and 1C. The network management suite will enable users to upload settings, implement business rules, and ensure a seamless exchange of information between the wireless networks and the relevant back-office management system(s). The network management suite can be developed to work on any computer running any type of operating system (OS), including WindowsXP or Vista, Apple OSX, and Linux, for example. A single version of the management suite software can be used to manage several wireless communication networks, for example, over an Internet connection, dial-up or wireless connection (Wi-Fi, GPRS, 3G, CDMA, etc.), as described hereinabove. The management suite will support network deployment, configuration and maintenance, and enable business rules and provides a graphical display of the locations of all components in any particular wireless network. The network management suite will typically include XML, ODBC, SOAP and other industry standard interfaces, as well as contain a toolbox to create custom components and plug-ins.

At this juncture, it is appropriate to describe the functionality of the GUI as well as how data packet communication occurs between the host system supporting the GUI, and the gateway to the wireless communication network to be managed in accordance with the principles of the present invention.

Referring to FIG. 10B, there is shown a GUI displaying a number of information fields associated with an exemplary network database. Once network device information has been saved in the network database, maintained on the host system or on a database server, as shown in FIGS. 1A1 through 1C. The saved information is then forwarded to the network. For example, changing the price value from $8.99 to $5.96 on the T-Shirts row in the network database will result in a change in the display value on the corresponding e-display associated with T-shirts to $5.96. The device type and MAC address for each node of the network is read from the database by the GUI-based host application, displayed on the database fields represented in the GUI screen of FIG. 10B, and then written to the electronic-ink display signs when the administrator selects the Save & Close button. A user may enter a description for each device on the network that is intuitive, so that instead of looking for an e-display having a MAC address of 33321BD7C465, one would just need to look for T-Shirts.

Referring now to FIG. 10C, there is shown another exemplary GUI for displaying the network as a network map. In the illustrative embodiment, each network end-device is mapped onto a tree structure displaying the interconnection between devices on the network. FIG. 10C shows what such a network map might look like with four end-devices and two routers on the network. The Refresh Map button updates the network map to reflect the current state of the network. Devices that have left or joined the network will be shown automatically in the network map, and automatically placed in the correct position on the network "tree" structure, in a totally transparent manner to both the network administrator and users of the network.

As shown in FIG. 10C, upon moving the mouse pointer over each circle on the network map automatically opens a popup dialog box displaying network information specific to each node in the network. In the example of FIG. 10C, end-device 2 (ED2) has been selected by the mouse pointer. The displayed information provides quick feedback to the user about the particular state of the node. In the illustrative embodiment of the present invention, a user is able to manipulate information provided in the popup box and have that information reflected in the network. For example, the user can change the description or currently display value for device #5 (Coffee). Other implementations could incorporate password authentication for secure installations.

In FIGS. 10D through 10H, four flowcharts are shown describing four APIs used in the wireless network of the present invention. Each flowchart describes the process according to which each API functions.

Figure 10E:
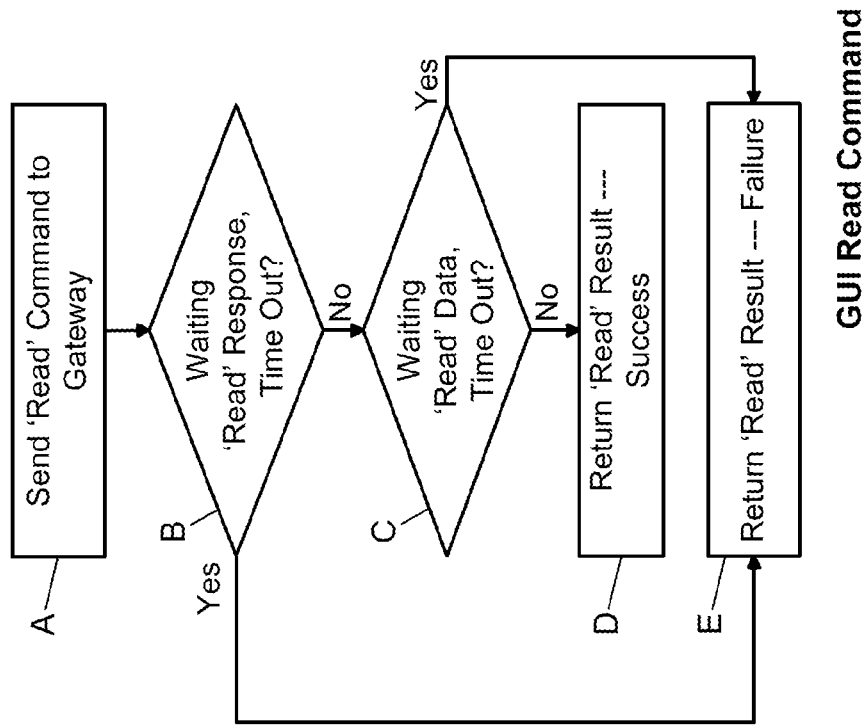
FIG. 10E is a flow chart illustrating the steps carried out when the read command is sent to the network gateway devices shown in FIGS. 9A and 9F.
Figure 10D:
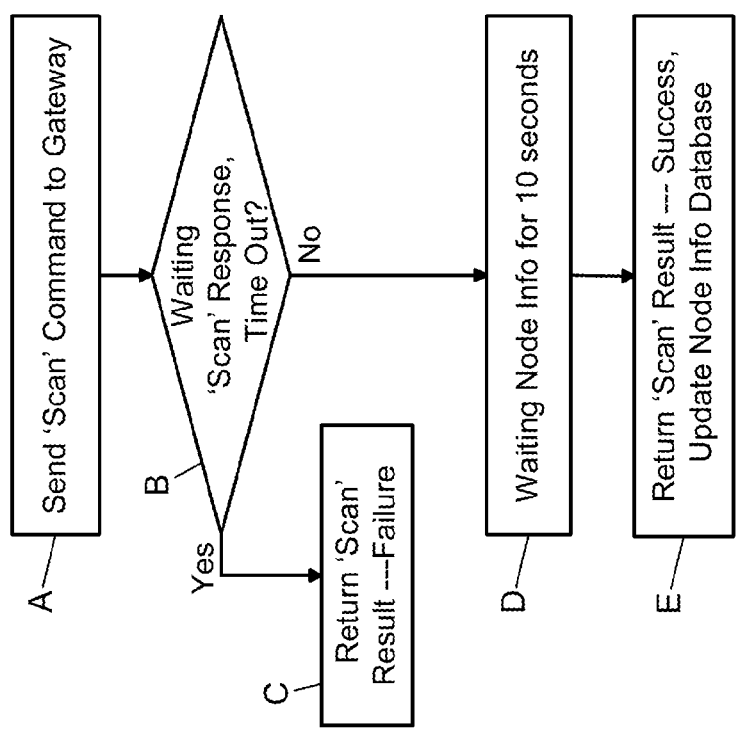
FIG. 10D is a flow chart illustrating the steps carried out when the scan command is sent to the network gateway devices shown in FIGS. 9A and 9F, node information database is updated, and then the network map GUI is updated with newly scanned node information.

Sending the "Scan Command" to the Gateway Device of a Wireless Communication Network of the Present Invention FIG. 10D illustrates the steps carried out when the host computer sends a "scan command" to a gateway device to a wireless communication network of the present invention. In general, the scan command is generally issued once the GUI has been opened to scan the network for available nodes. It may also be issued at a later time to refresh the GUI. However, this is generally not needed since a node joining the network once the GUI has been opened, is automatically detected. This newly detected/scanned node is added to the main page of the GUI, the network database, and the network map.

As indicated at Block A in FIG. 10D, the first step of executing the "scan command" API function involves the host computer sending the scan command to the gateway. Then at Block B, the host computer waits for a scan response from the gateway within the timeout period. If a timeout occurs, then at Block C the gateway returns a scan result=failure. However, if there is no time out at Block B, then at Block D, the host computer waits for requested node information from the network, for 10 seconds. Then, when at Block E, the host computer receives the returned scan result, it determines that the scan result=success, and updates the node information database with the scan result data. Thereafter, the host computer automatically updates the network map GUI with the newly-scanned network node information.

Sending the "Read Command" to the Gateway Device of a Wireless Communication Network of the Present Invention FIG. 10E illustrates the steps carried out when the host computer sends a "read command" to a gateway device to a wireless communication network of the present invention. In general, this API function is instantiated anytime a user at the host system needs to retrieve something from memory stored in a device on the wireless network of the present invention.

As indicated at Block A in FIG. 10E, the first step of executing the read command API function involves the host computer sending the read command to the gateway. Then at Block B, the host computer waits for a read response from the gateway, within the timeout period. If a timeout occurs, then at Block E the gateway returns a read result=failure. However, if there is no time out at Block B, then at Block C, the host computer waits for requested read data from the network (e.g. for 10 seconds). Then, when at Block D, the host computer receives the returned read data result, it determines that the read result=success.

Figure 10G:
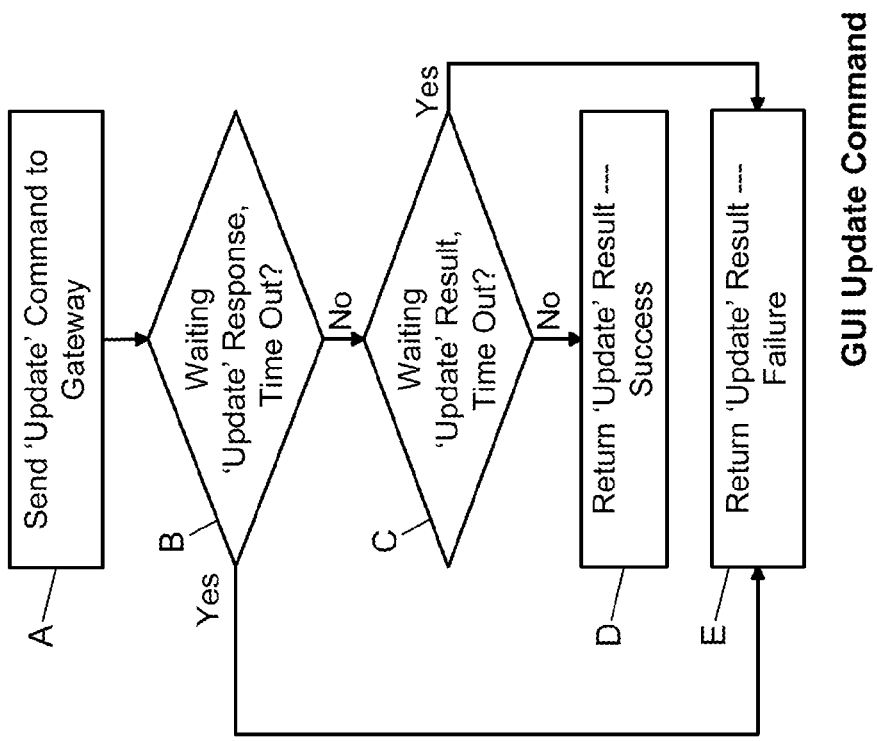
FIG. 10G is a flow chart illustrating the steps carried out when the update command is set to the network gateway devices shown in FIGS. 9A and 9F.
Figure 10F:
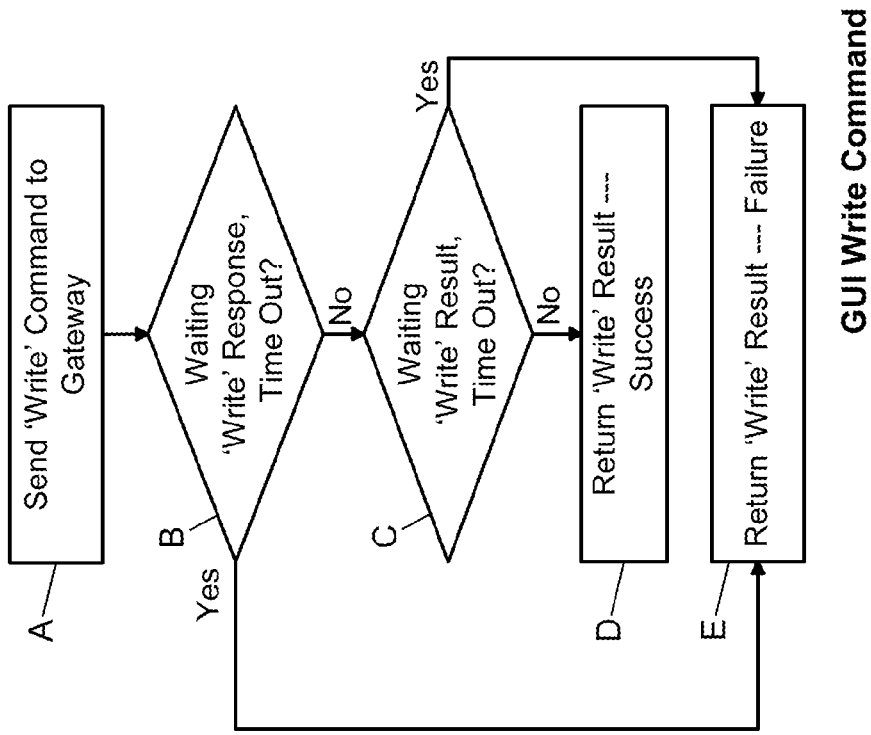
FIG. 10F is a flow chart illustrating the steps carried out when the write command is set to the network gateway devices shown in FIGS. 9A and 9F.

Sending the "Write Command" API Function to the Gateway Device of a Wireless Communication Network of the Present Invention FIG. 10F illustrates the steps carried out when the host computer sends a "write command" to a gateway device on a wireless communication network of the present invention. In general, this function is used anytime information needs to be written from the host system to memory in any particular device on the wireless network of the present invention.

As indicated at Block A in FIG. 10F, the first step of executing the write command API function involves the host computer sending the write command to the gateway. Then at Block B, the host computer waits for a write response from the gateway, within the timeout period. If a timeout occurs, then at Block E the gateway returns a write result=failure. However, if there is no time out at Block B, then at Block C, the host computer waits for the write result from the network (e.g. for 10 seconds). Then, when at Block D, the host computer receives the returned write data result, it determines that the write result=success.

Sending the "Update Command" API Function to the Gateway Device

FIG. 10G illustrates the steps carried out when the host computer system sends an "update command" to a gateway device to a wireless communication network of the present invention. In general, this command is used whenever an electronic-ink display device (e.g. e-display) needs to be updated on the network. This API function utilizes a timeout function to monitor the success of the e-display update. If the e-display returns an acknowledgment that the message was received within the timeout period, then the GUI displays that the action was a success.

As indicated at Block A in FIG. 10G, the first step of executing the update command API function involves the host computer sending the update command to the gateway. Then at Block B, the host computer waits for an update response from the gateway, within the timeout period. If a timeout occurs, then at Block E the gateway returns an update result=failure. However, if there is no time out at Block B, then at Block C, the host computer waits for the update result from the network (e.g. for 10 seconds). Then, when at Block D, the host computer receives the returned update result, it determines that the update result=success.

Figure 10H:
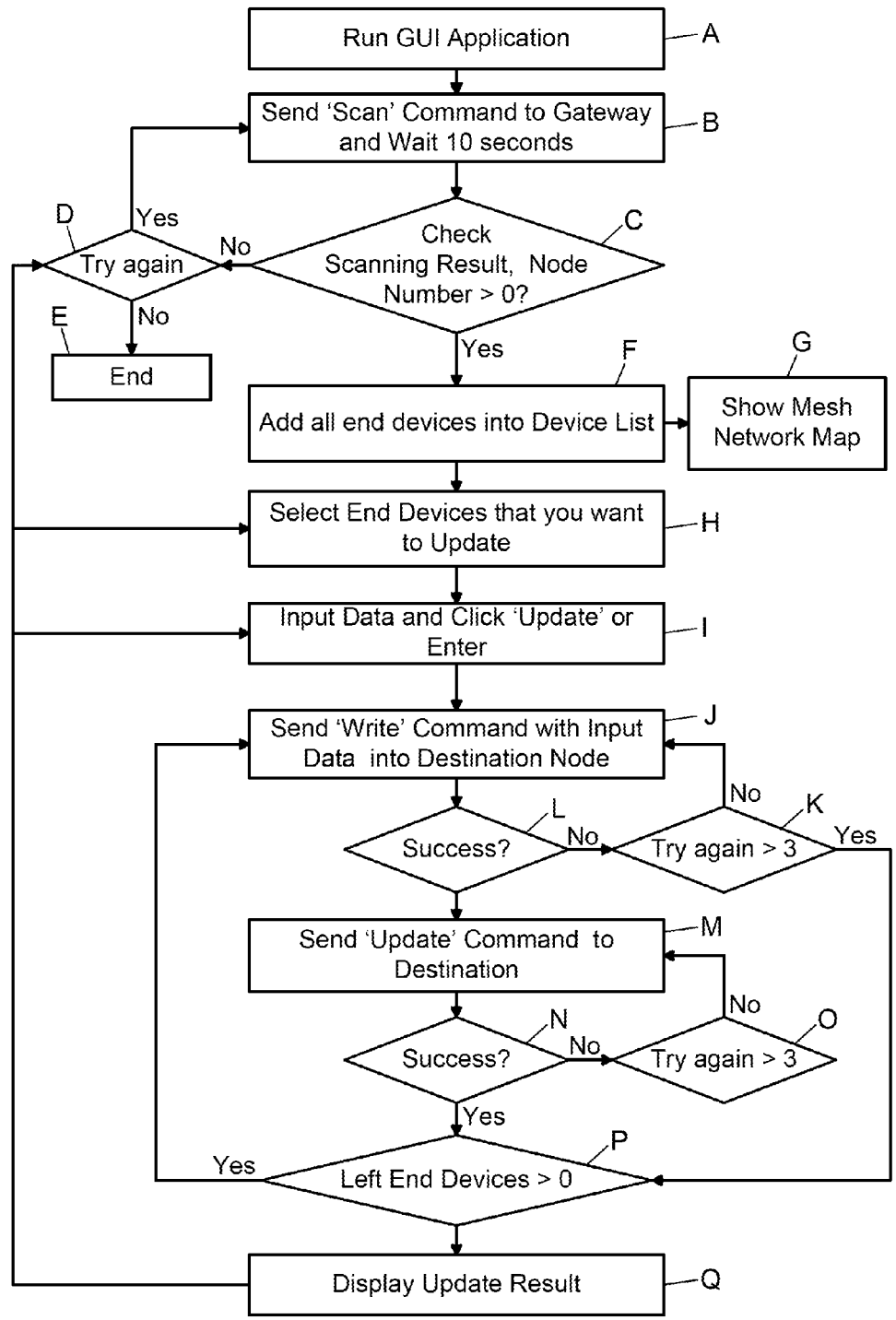
FIG. 10H is a flow chart illustrating the steps carried out when the GUI Application is run on the host system interfaced with either of the network gateway devices shown in FIGS. 9A and 9F.

Running the GUI-Based Network Management Application on the Host System Interfaced With the Gateway of the Wireless Network of the Present Invention FIG. 10H illustrates the steps carried out when the GUI-based network management application of the present invention is run on the host system 21A, 21B interfaced with a gateway device 5 to the wireless communication network 9 of the present invention. In the illustrative embodiment, the GUI-based network management application supports a number of basic network functions, including: (i) sending the scan command to the gateway device, executing the scan command, collecting node information, updating the network device list, and showing the mesh network map; (ii) sending the read commands to end devices from which data is to be read; (iii); sending write commands to end devices into which data is to be written; and (iv) sending update commands to end devices to be updated.

Referring now to FIG. 10H, the process of running the GUI-based network management application of the present invention will be described in greater detail. Notably, the network management application incorporates the four API functions illustrated in FIGS. 10D through 10G, and works in conjunction with the gateway process described in FIG. 9D.

As indicated at Block A in FIG. 10H, the first step of the process involves running the GUI-based network management application on the host computer system. Then at Block B, the host computer sends a scan command to the gateway and waits 10 seconds. At Block C, the host computer checks the scanning results to determine that the returned node number is greater than 0, and if not, then at Block D the host computer either tries again and returns to Block B, or ends at Block E. If at Block C the host computer determines that the returned node number is greater than 0, then at Block F, the host computer adds all end devices into the network device list, and then at Block G displays the mesh network map at the host computer.

At Block H, the user/administrator selects end devices that s/he wants to update with messages, and at Block I, inputs data into the GUI screen, as shown, for example, in FIGS. 10A and 10B, and then clicks the Update or Enter button on the GUI screen.

At Block I, the user then sends the write command with input data (i.e. new message display to be programmed) to a destination node(s), and if the write command is not successful at Block L, then the host computer will try again at Block K, up to three times. If the host computer is not successful after three times, then it proceeds to Block P to determine whether there are any end nodes left for processing. When there are no more nodes left for processing, then the updated results (i.e. successful writing into the memory of network nodes, and updating of the displays thereon) is displayed on the GUI screen of the host computer, and then the host computer system returns to either Block J or Block D, as the case may be.

When the write command is successful at Block L, then at Block N the host computer 21A, 21B will send the update command to the destination node (now having the newly written display data in its memory). If the update command is not successful at Block N, then the host computer will try sending the update command to the destination node, up to three more times, as indicated at Block O. When the update command is successful at Block N, the host computer determines at Block P whether or not there are any more nodes in the network to be processed with write and update commands, by the operations indicated at Blocks J through O. When no more nodes, to which display data has been written, remain for updating, the host computer at Block Q then displays the update results for all network nodes graphically represented on the GUI screen of the host computer, as illustrated in FIG. 10C.

Figure 11A:
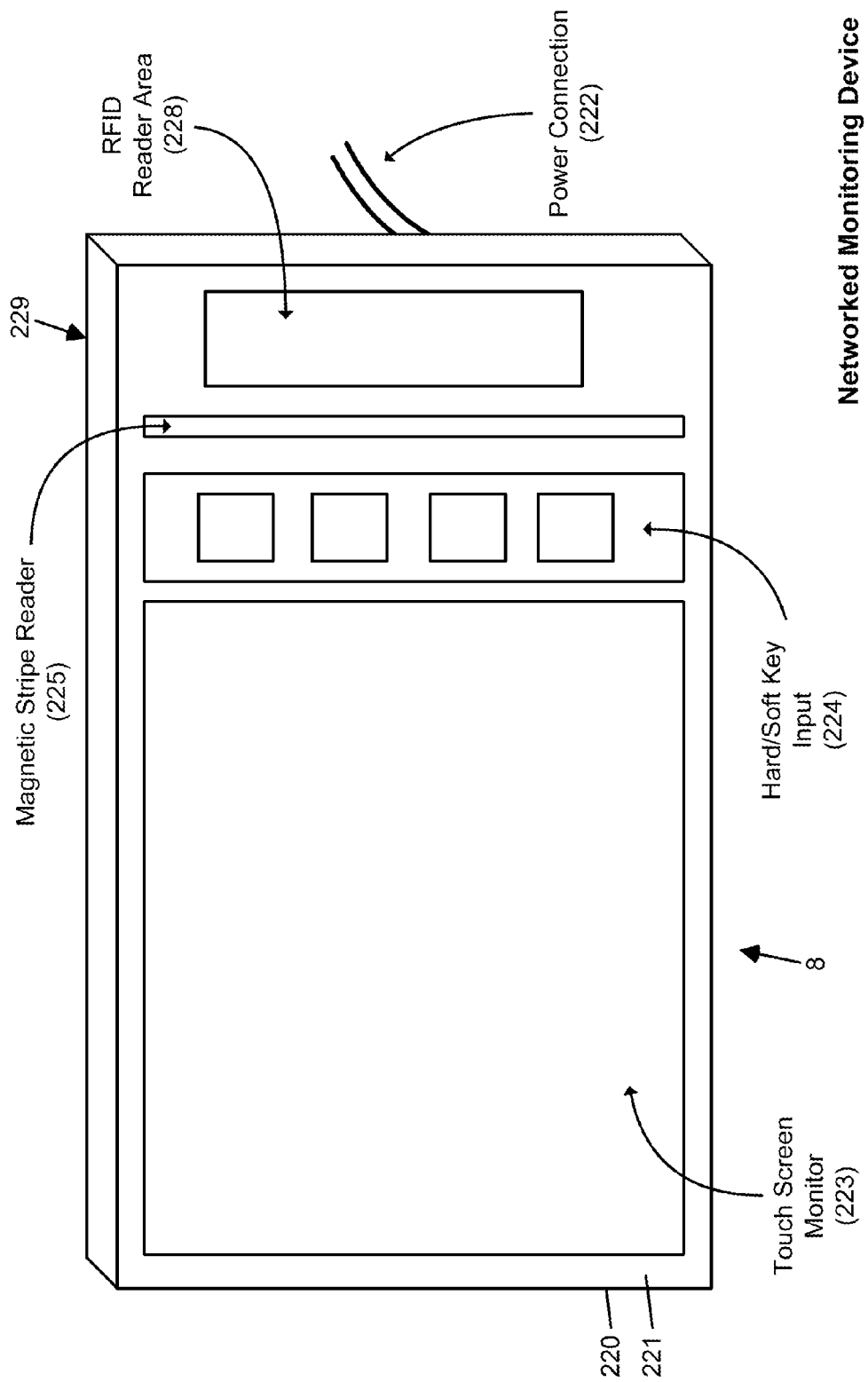
FIG. 11A is a perspective view of a wireless network monitoring and control device for use in a wireless communication network of the present invention, as illustrated in FIGS. 1A, 1B and 1C.
Figure 11B:
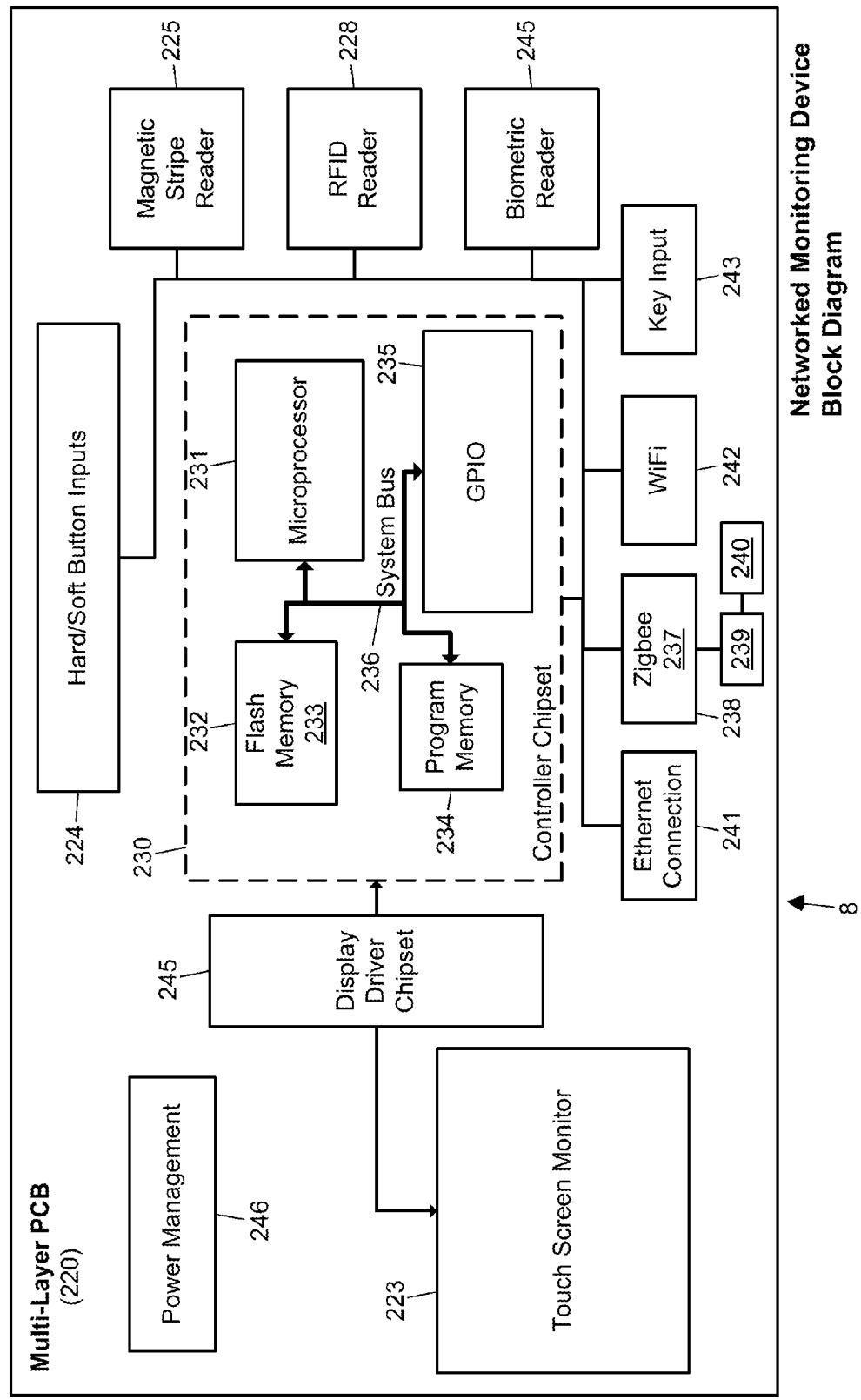
FIG. 11B is a schematic representation of the wireless network monitoring and control device illustrated in FIG. 11A.
Figure 11C:
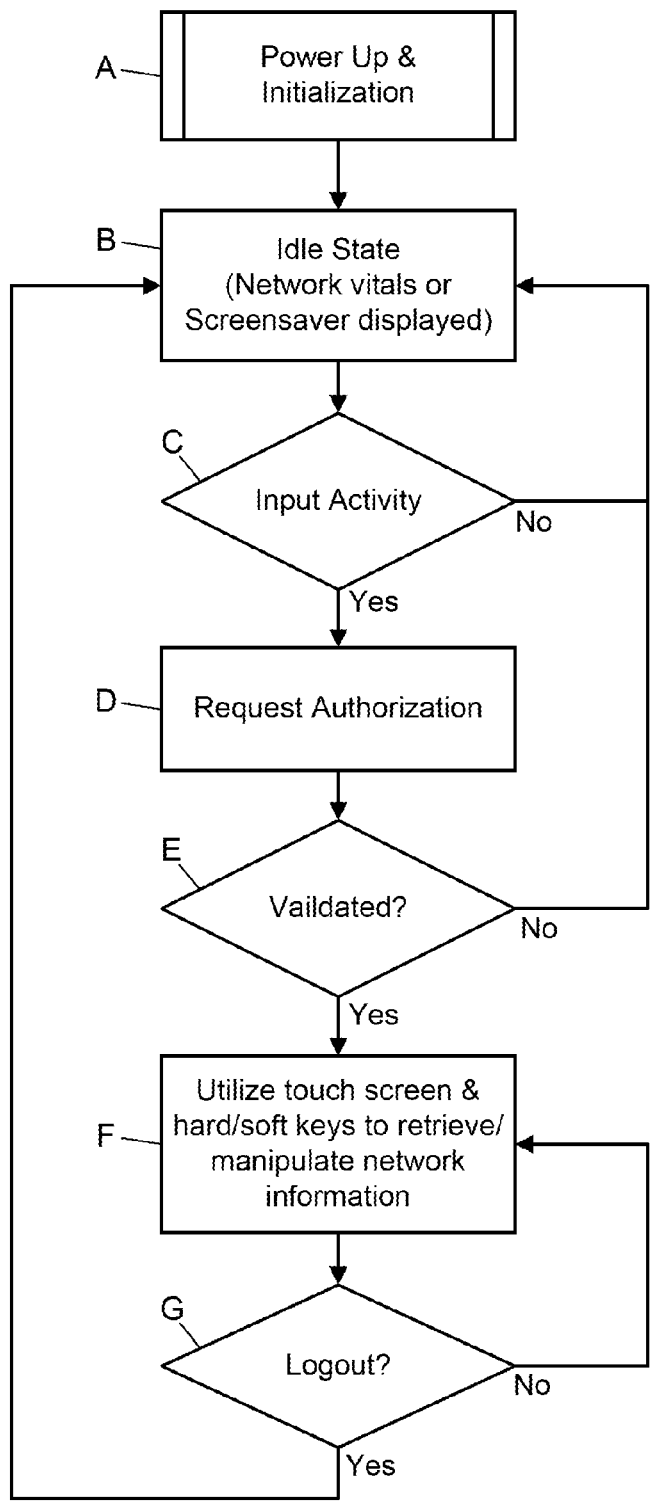
FIG. 11C is flow chart illustrating the steps carried out by the firmware control process within the wireless network monitoring and control device illustrated in FIG. 11A.

Networked Monitoring and Control Device for Use in a Wireless Communication Network of the Present Invention Referring to FIGS. 11A through 11C, a network monitoring and control device 8 according to the present invention is shown for use in a wireless communication network as illustrated, for example, in FIGS. 1A1 through 1C.

As shown in FIG. 11A, networked monitoring and control device 8 comprises: a compact housing 220 for mounting on a wall or other surface, or hand-supportable mobile use; a multi-layer PCB 221 populated with the subsystems, circuits and devices illustrated in FIG. 11B; an electrical power connector 222 integrated with the housing for supplying electrical power to the device; a touch-screen LCD (or electronic-ink) display panel 223 integrated with the housing; a plurality of hard/soft-type key inputs 224; a magnetic-stripe reader 225 integrated into the housing, for reading magnetic-stripe cards 226 with network access security codes and electronic-ink display labels integrated therein, as taught in copending U.S. application Ser. No. 12/154,427, incorporated herein by reference; an RFID reader module 228 integrated within the housing; and one or more RF antennas 229 contained within the housing, for supporting wireless RF communication with devices in the wireless mesh communication network of the present invention.

As shown in FIG. 11B, the network monitoring and control device 8 comprises: a controller chipset 230 including a microprocessor 231, flash memory 232 for monitoring device firmware 233 storage, program memory 234, and a GPIO submodule 235 interfaced via a system bus 236; a RF module 237, including an IEEE 802.15.4 modem transceiver 238, and an impedance matching network 239 connected to an RF antenna structure 240; an Ethernet interface module 241 having a connector integrated with the housing; a WIFI module 242 including an antenna structure mounted within the housing; a keyboard input device 243 integrated with the housing, or the touch-screen LCD panel 223: a biometric reader 244 integrated with the housing, for enabling biometric access to the device; an RFID reader 228 integrated with the housing, for reading RFID cards, chips and other components; a magnetic strip-reader 225 integrated with the housing, reading magnetic-stripe cards encoded with digital information; hard/soft keypad input/selection buttons 224 integrated with the housing, for entering commands and specific kinds of data into the device; a display driver chipset 245 interfaced with the touch-screen LCD panel 223, for enabling display of information on the LCD panel and the entering of information into the device by way of touch-screen data input operations; and (iii) a power management module 246 for managing power supplied to the device through a 120 VAC power supply, or appropriate power adapter. As shown in FIG. 11B, each of these components are populated, supported and/or connected to the multi-layer PCB board 220 contained in the device housing.

FIG. 11C illustrates the steps carried out by the firmware control process within the network monitoring and control device of FIG. 11A.

At Block A in FIG. 11C, the first step of the device involves powering up and initializing the device.

At Block B, the device enters its idle state and displays network vitals or a screen player during its idle state of operation.

At Block C, the device determines whether there is any input activity on the device, and if not, then returns to its idle state at Block B. However, if input activity is detected at Block C, then the device requests network access authorization at Block D, and then at Block E determines validation of such a request. If network access authorization is not validated at Block E, then the device returns to its idle state at Block B. However, if network access authorization is validated at Block E, then the device at Block F allows the user to utilize the touch-screen panel and hard/soft-type keys to retrieve and manipulate (i.e. manage) network information, as allowed by the host system, described hereinabove.

At Block G, the device determines whether or not the user has logged out from the device, and if not, then returns to Block F allowing network manipulation and management operations. When the user logs out from the device, the device returns to its idle state at Block B, as indicated in FIG. 11C.
Node Position Tracking Module for Use in a Wireless Communication Network of the Present Invention FIGS. 12A1 and 12A illustrate a node position tracking (NPT) module 10 for use in a wireless communication network of the present invention.

Figure 12B:
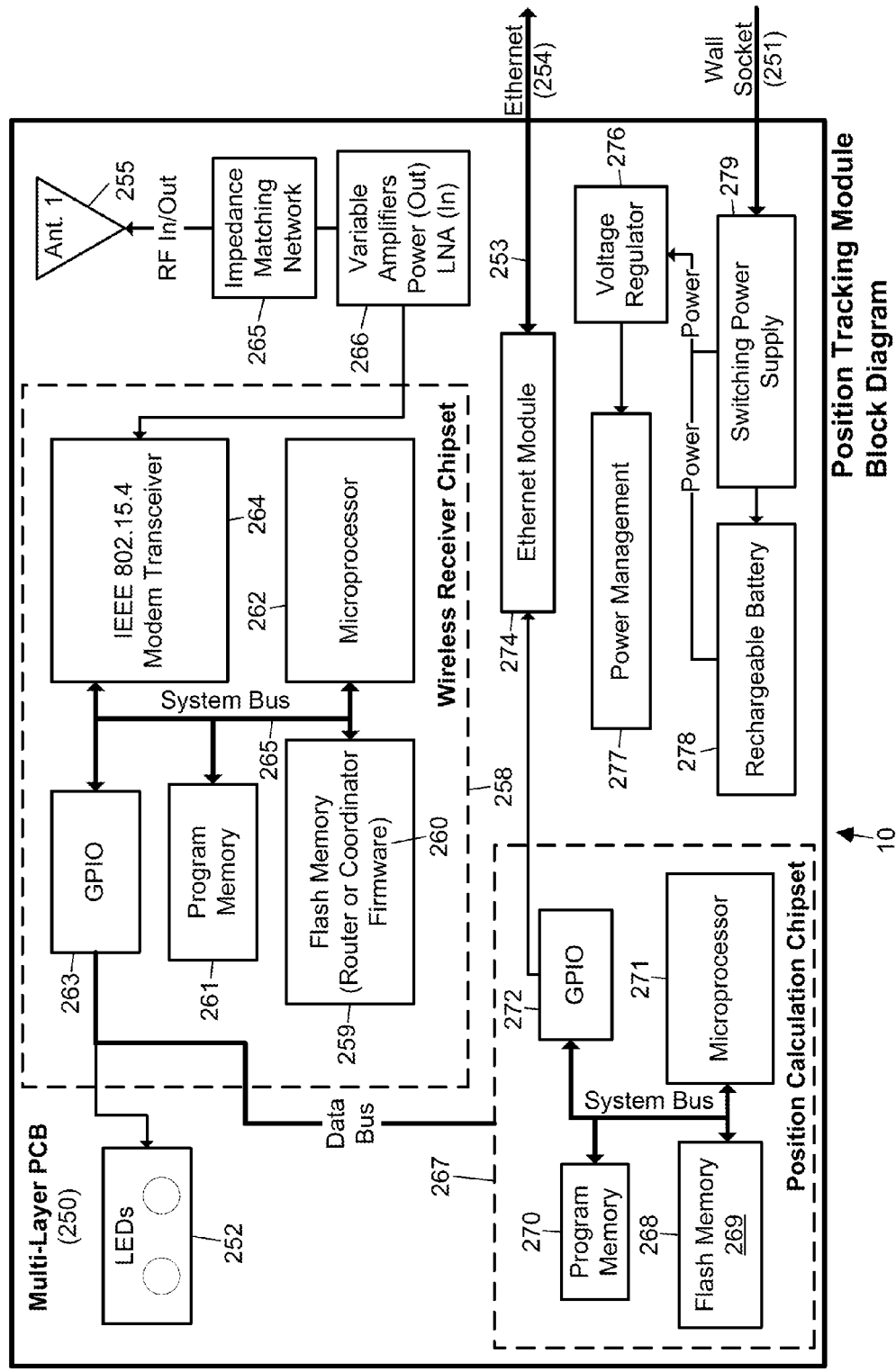
FIG. 12B is a schematic representation of the wireless node position tracking module illustrated in FIGS. 12A1 and 12A2.

As shown in FIGS. 1A1 through 1C, the NPT module 10 comprises: a compact housing 249 for mounting on a wall or other surface; a multi-layer PCB 250 disposed in the housing, for populating and/or supporting subsystems, modules and circuits indicated in FIG. 12B; an electrical power plug connector 251 integrated with the housing, for supply electrical power to the device; LED indicators 252 integrated within the housing, for indicating the state of operation of the device; an Ethernet connector 253 integrated with the housing, for receiving an Ethernet cable 254; one or more RF antennas 255 integrated with or contained in the housing; and a securing mechanism 256 for physically securing the housing to the electrical wall socket or other fixture.

As shown in FIG. 12B, the node position tracking (NPT) module 10 of FIG. 10A comprises: a wireless receiver chipset 258 including a first flash memory 259 for firmware storage 260, a first program memory 261 for storing firmware instructions, a first microprocessor 262 for executing instructions in the first program memory, and a first GPIO submodule 263 connected to an IEEE 802.15.4 modem transceiver 264 interfaced to a system bus 265; an impedance matching network 265 connected to a first RF antenna structure (ANT 1) 255 and interfaced with a variable gain power amplifier (Out Tx) and a variable gain low-noise amplifier (LNA), (In Rx) 266; LEDs 252 for indicating the status of operation of the GPIO; a position calculation chipset 267 including (i) a second flash memory 268 for storing position calculation firmware 269, (ii) a second program memory 270 for buffering the position calculation firmware during run-time, (iii) a second microprocessor 271 for executing instructions in the second program memory, during run-time, and (iv) a GPIO module 272 interfaced via a system bus 273; an Ethernet module 274 interfaced to the second GPIO module 272 and output Ethernet connector 253; and a voltage regulator module 276 connected to a power management module 277; a rechargeable battery 278; and a switching power supply 279 as shown, and to connected to an electrical (120 VAC) wall socket 251.

Figure 12C:
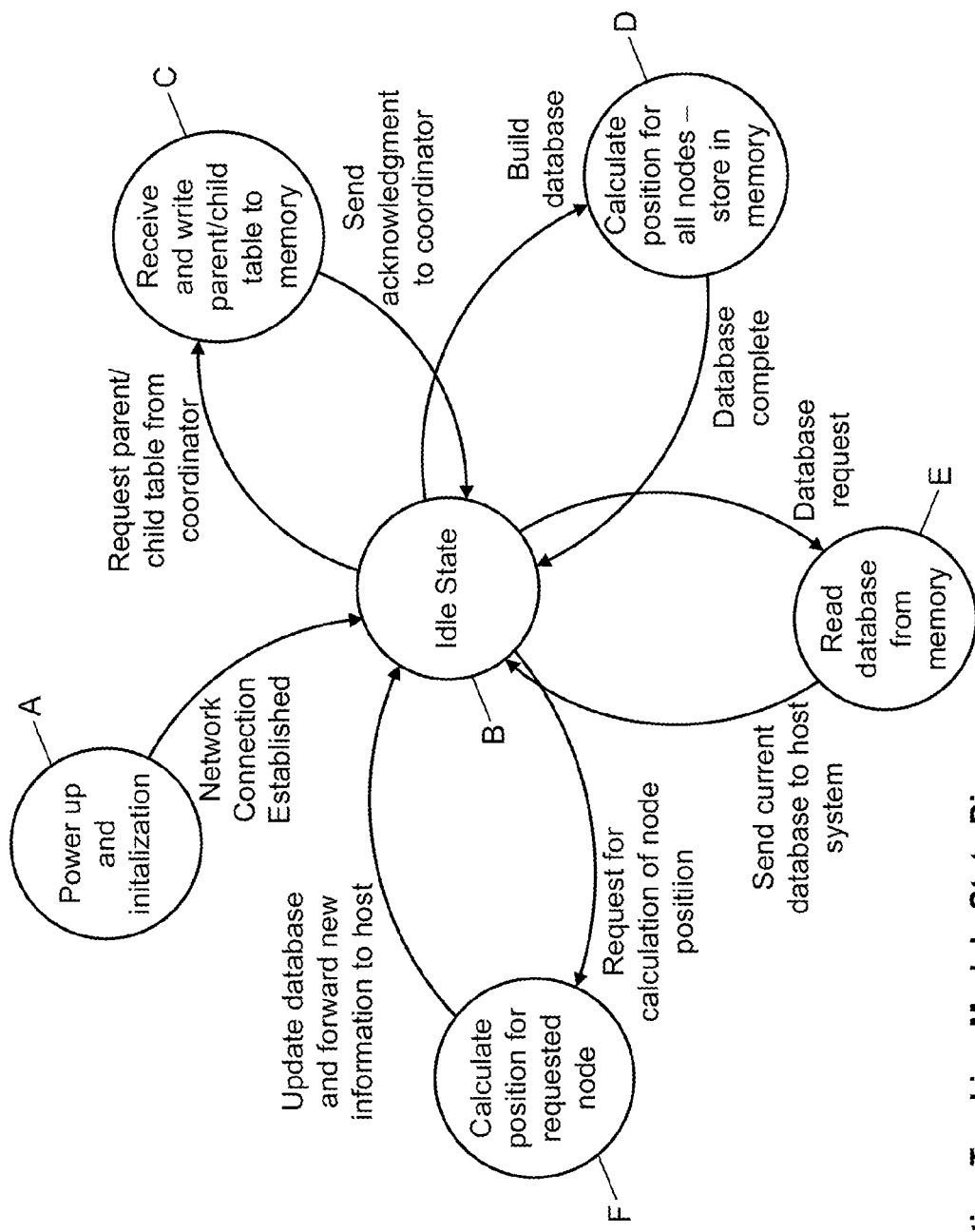
FIG. 12C is a state diagram representation of the wireless node position tracking (NPT) module, depicted in FIGS. 12A1 through 12B, showing the various states of operation through which wireless node position tracking module passes in automatic response to events occurring on its network.

FIG. 12C shows a state diagram for the NPT module 10 of FIGS. 12A1, 12A2, and 12B, indicating the various states of operation through which the NPT module passes in automatic response to events occurring on its network, including (i) power up and initialization state, (ii) an idle state (i.e. receive mode), (iii) a receive and write parent/child table to memory state, (iv) a calculate position of all nodes and store in memory state, (v) a read database from memory state, and (vi) a calculate position for requested node state.

As indicated in FIG. 12C, the device transitions from its power up and initialization state A to its idle state B when the NPT module establishes a network connection. The NPT module transitions from its idle state B to the receive and write parent/child table to memory state C when the NPT module receives a parent/child table from the coordinator device, and returns to the idle state B after the NPT module sends acknowledgement to the coordinator. The NPT module transitions from its idle state to its calculate position for all nodes and store in memory state D when it receives a request to build a node position database, and returns to its idle state after the building of the database has been completed. The NPT module transitions from its idle state B to its read database from memory state E when it receives a database request from the host system, and returns to the idle state after it sends the current database to the host system. The NPT module transitions from its idle state B to its calculate position for requested node state F when it receives a request for calculation of node position, and returns to the idle state B after it has updated the database and forwarded the new information to the host system.

Figure 12D:
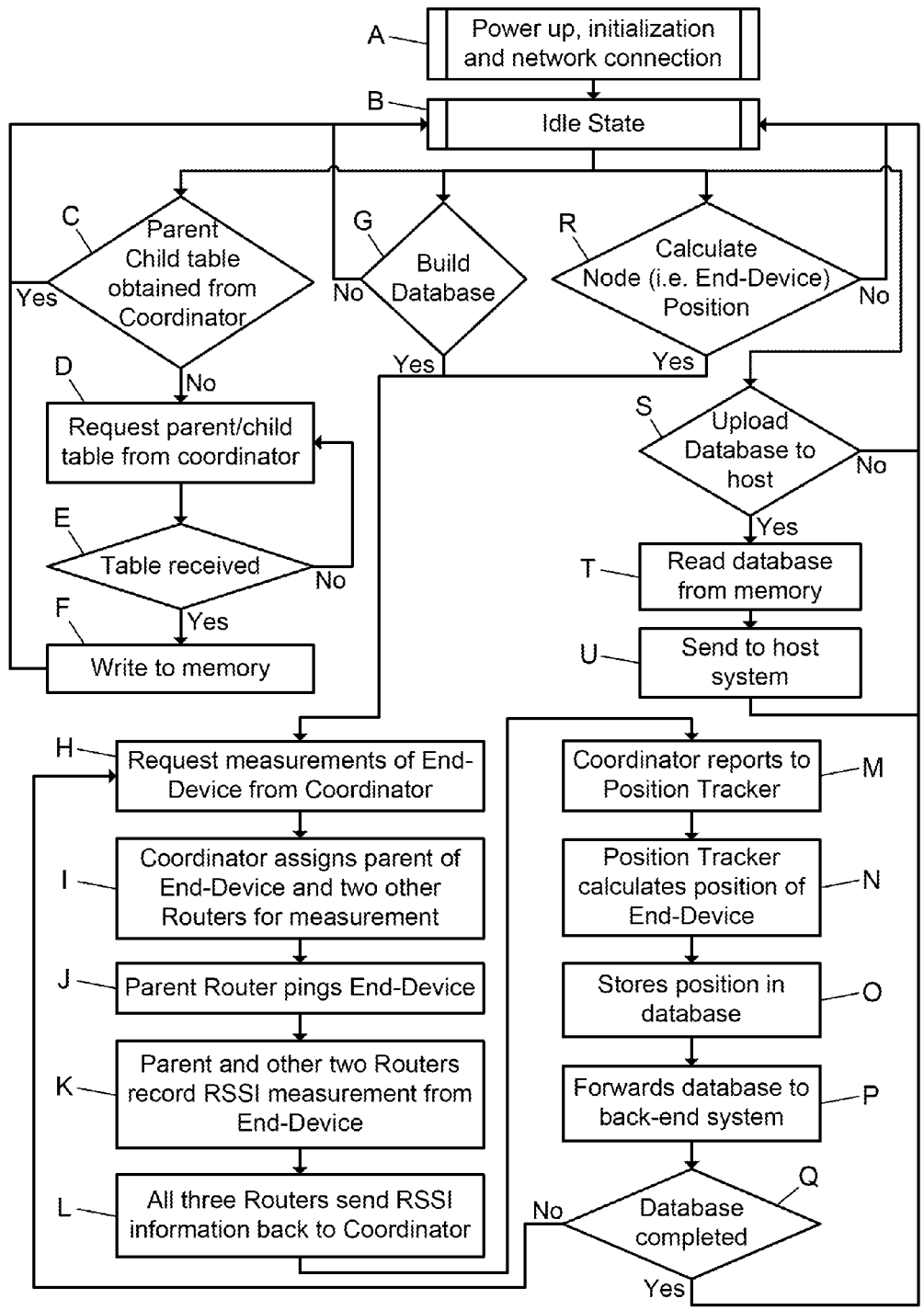
FIG. 12D is a flow chart showing the steps carried out by the control process in the wireless node position tracking module of FIGS. 12A1 through 12C.
Figure 13A:
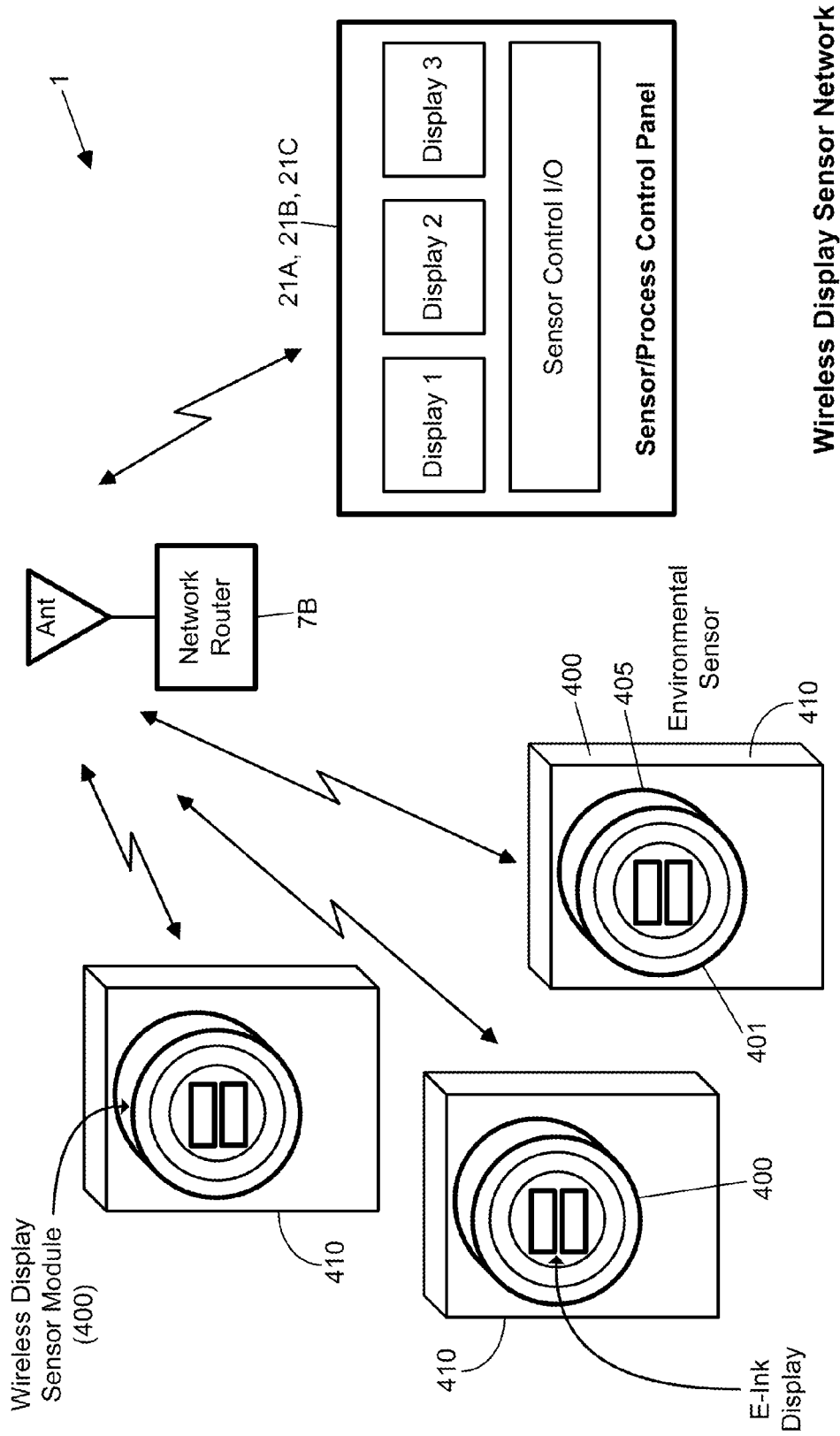
FIG. 13A is a schematic representation of a wireless display sensor network.
Figure 13B:
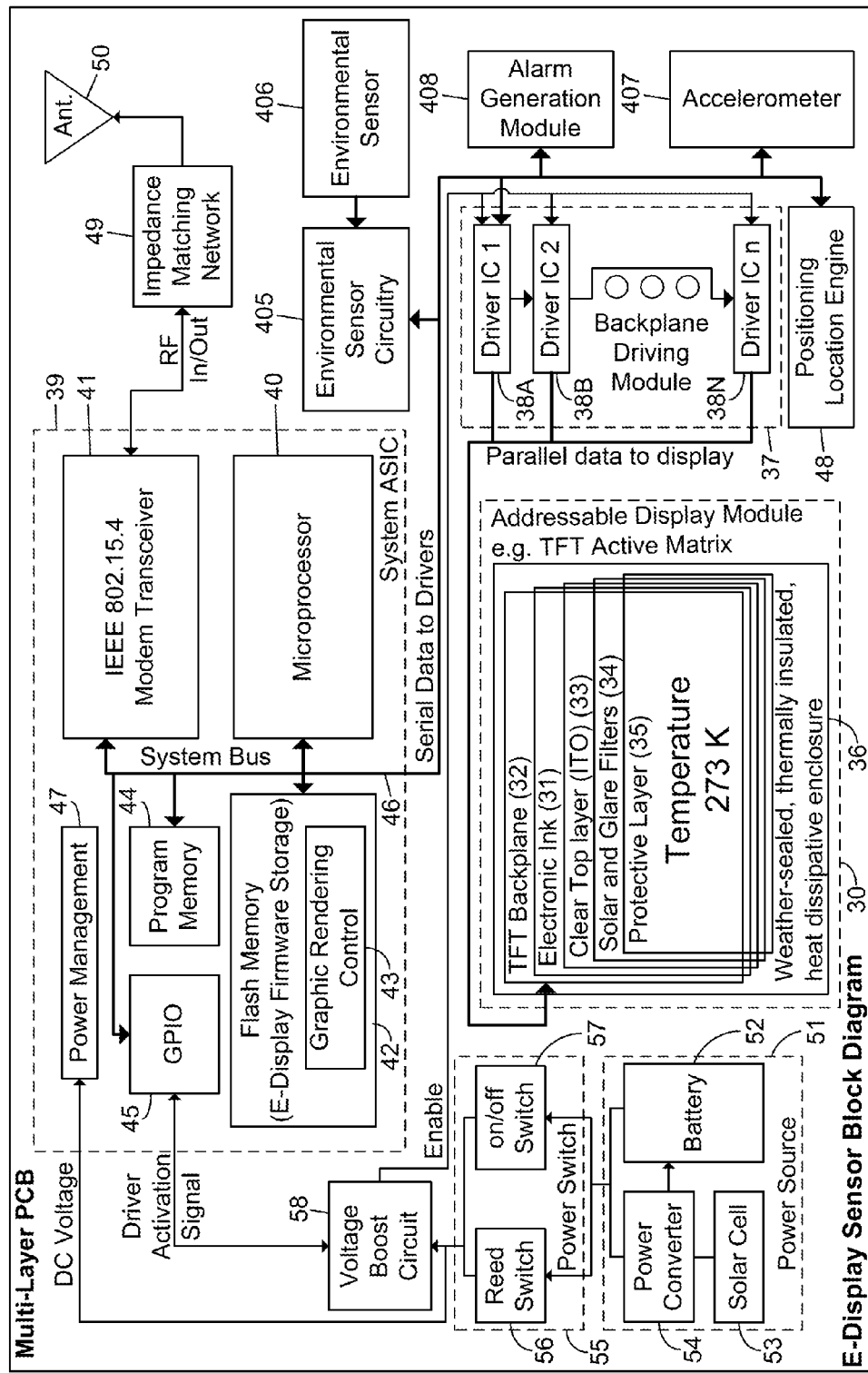
FIG. 13B is a schematic representation of an e-display sensor.
Figure 13C:
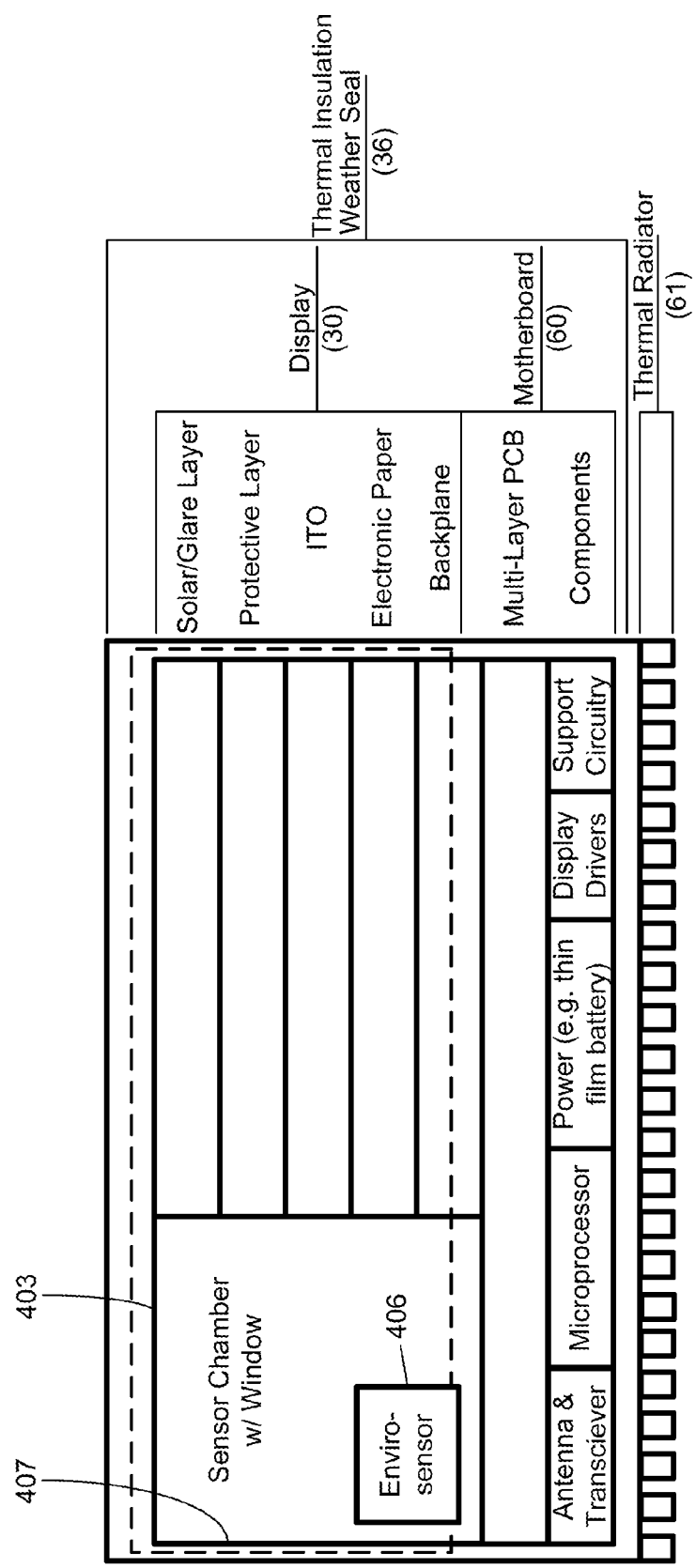
FIG. 13C is a cross-sectional schematic representation of an e-display sensor showing its stacked display structure.
Figure 13D:
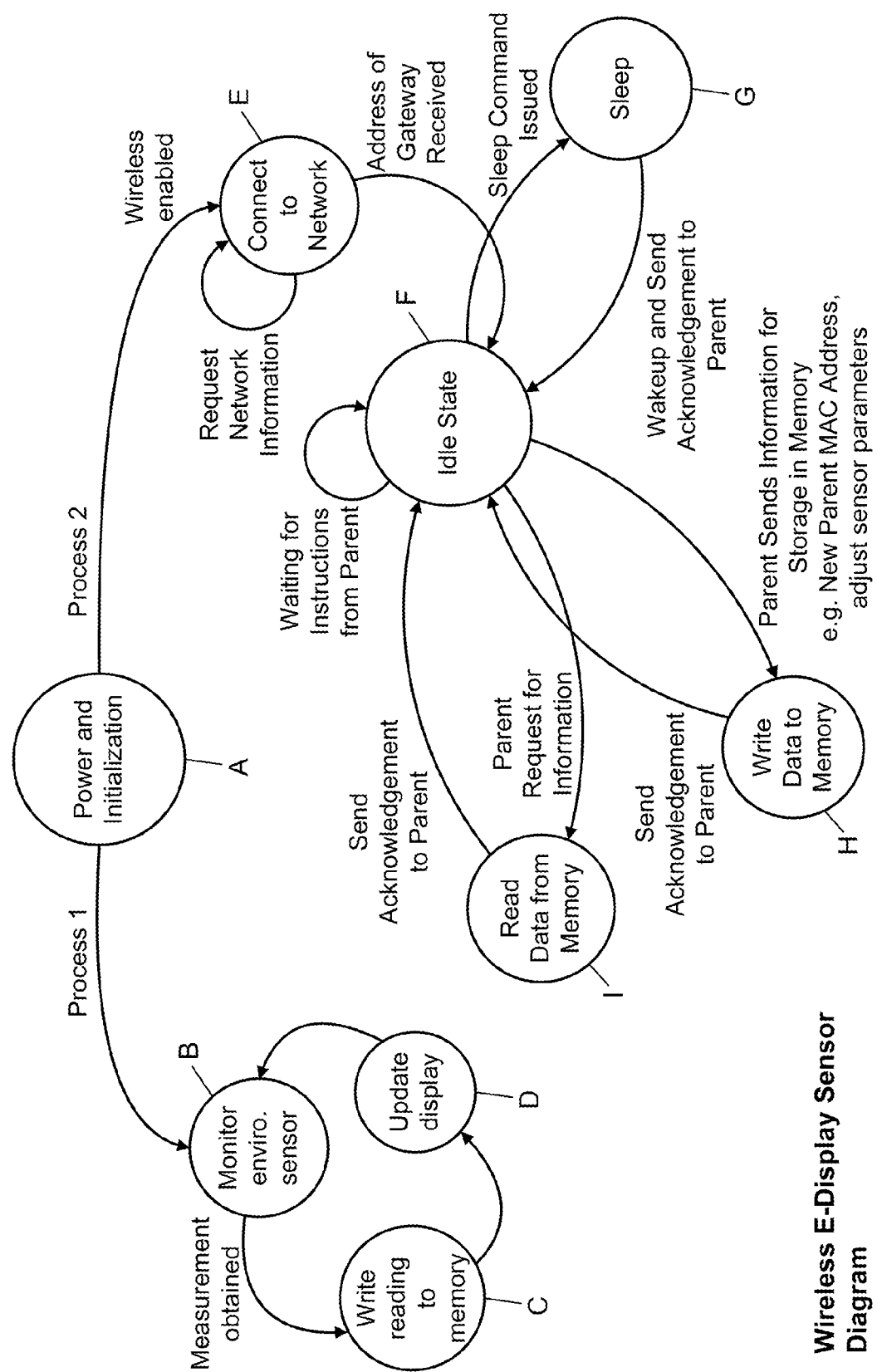
FIG. 13D is a state diagram representation of a wireless e-display sensor.
Figure 13E:
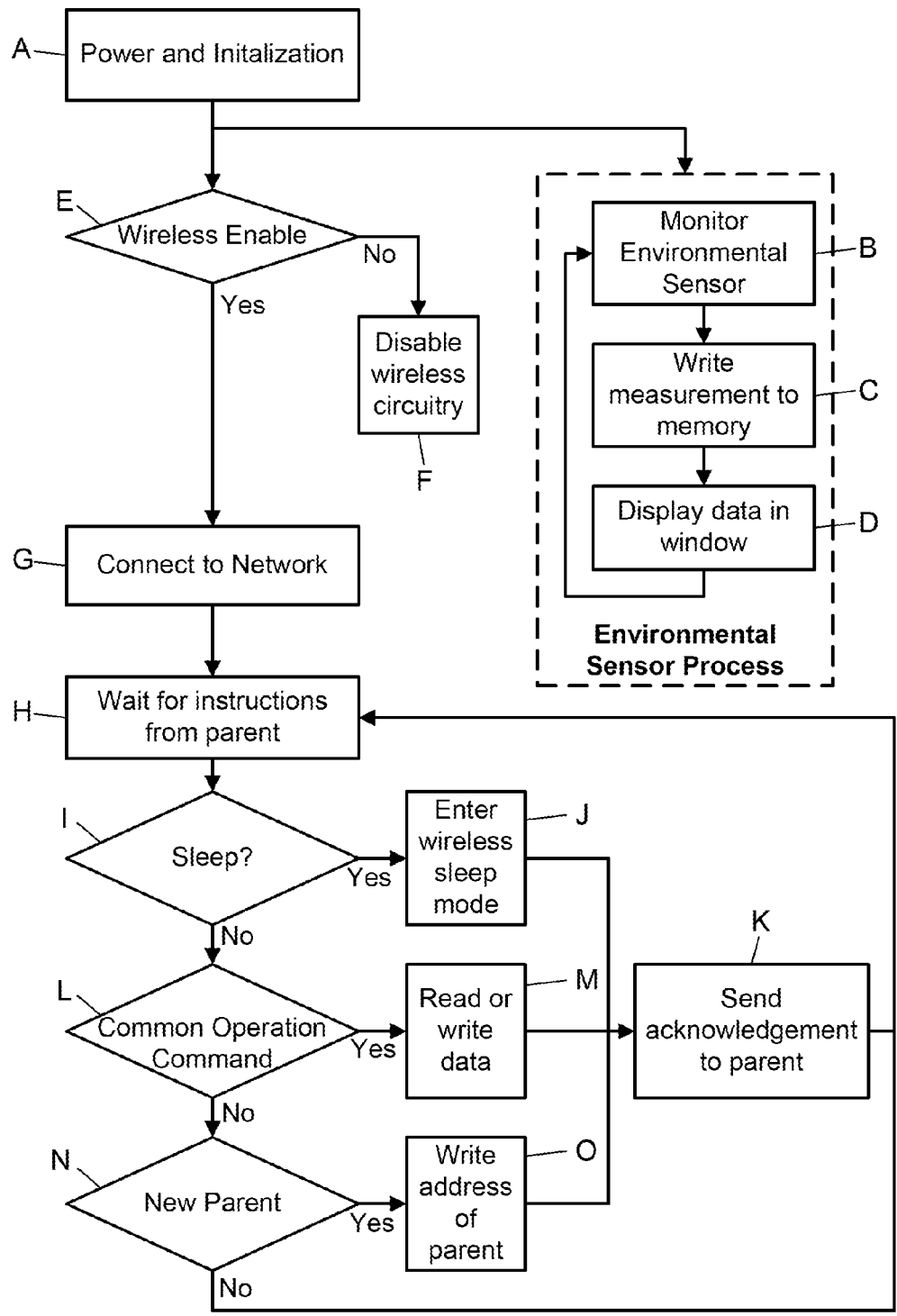
FIG. 13E is a flowchart for a wireless e-display sensor.

FIG. 12D describes the steps carried out by the control process in the NP module of FIGS. 12A1 through 12C.

At Block A in FIG. 12D, the control process in the NPT device 10 begins by powering up, initializing and establishing a network connection.

At Block B, the NPT device attains its idle state, and from there, can take one of four specified paths through its complex control process: (i) requesting parent-child table from network coordinator during Blocks C through F; (ii) building a node position database during Blocks G through Q; (iii) calculating node positions during Blocks R through Q; and (iv) uploading node position database to host system during Blocks S through U.
Requesting the Parent-Child Table from the Network Coordinator As indicated at Block C, the control process in the NPT device determines whether the parent/child table has been obtained from the network coordinator, and if yes, then the control process returns to the idle state indicated at Block B. However, if the device has not received the parent/child table from the coordinator, then at Block D it request the parent/child table from the coordinator, and continues to dwell at Block E until the parent/child table is received, and when it is received, at Block F the device writes the received parent/child table to its memory and then returns to its idle state at Block B.
Building a Node Position Database At Block G, the control process in the NPT device determines whether it has received a request to build a node position database from the host system, and if not, then it returns to its idle state at Block B. However, if the device does receive a build node position database request, then at Block H it requests, from the wireless coordinator, position measurements for each wireless end node-device in the network, referenced from a pre-specified frame of reference.

At Block I, network coordinator assigns the parent of the ZigBee end device, and two other network routers, the tasking of being involved in making the position measurement of the ZED.

At Block J, the parent of the wireless end device pings the wireless end device, and at Block K, the parent and the other two wireless routers record the RSSI measurements received from the wireless end device under measurement.

At Block L, all three routers, indicated above, sends their collected RSSI measurements back to the coordinator for processing.

At Block M, the network coordinator reports this information to the NPT module, and at Block N, the NPT module calculates the position of the wireless end device under measurement, and at Block O stores the measured position of the end device in the node position database. At Block P, the NPT module forwards the node position database back to the host computer and database servers in the network's backend system.

At Block Q, the NPT module determines whether or not the node position database has been updated for all nodes in the network (i.e. listed on the network deice list maintained by the coordinator), and if not, then returns to Block H, to request that position measurements be taken for any remaining, non-measured wireless end devices (i.e. nodes). When all such position measurements have been made, recorded and processed according to Blocks H through P, then the NPT module returns to its idle state at Block B in FIG. 12D.

Calculating Node Positions in the Wireless Network of the Present Invention

At Block R, the control process in the NPT device/module determines whether it has received a request to calculate node (end-device) position from the host system. If the NPT device has not received such request from the host system, then it returns to its idle state at Block B. However, if the device does receive a calculate node position request, then at Block H it requests, from the wireless coordinator, position measurements for each wireless end-node device in the network, referenced from a pre-specified frame of reference.

At Block I, network coordinator assigns the parent of the wireless end-device, and two other network routers, the tasking of being involved in making the position measurement of the ZED.

At Block J, the parent of the wireless end device pings the wireless end-device, and at Block K, the parent and the other two wireless routers record the RSSI measurements received from the wireless end-device under measurement.

At Block L, all three routers, indicated above, sends their collected RSSI measurements back to the coordinator for processing.

At Block M, the network coordinator reports this collected RSSI information to the NPT module, and at Block N, the NPT module uses this collected RSSI data to calculate collected RSSI the position of the wireless end-device under measurement. At Block O, the NPT module stores the calculated/measured position of the end-device, in the node position database. At Block P, the NPT module forwards the node position database back to the host computer and database server in the backend system of the wireless network.

At Block Q, the NPT module determines whether or not the node position database has been updated for all nodes in the network (i.e. listed on the network device list maintained by the coordinator). If not, then the NPT module returns to Block H, to request that position measurements be taken for any remaining, non-measured wireless end-devices (i.e. nodes). When all such position measurements have been made, recorded and processed according to Blocks H through P, then the NPT module returns to its idle state at Block B in shown FIG. 12D.

Uploading the Node Position Database to the Host System

At Block S, the control process in the NPT device/module determines whether it has received a request to update the node position database from the host system. If the NPT module has not received such a request from the host system, then it returns to its idle state at Block B. However, if the device does receive a request to update the node position database, then at Block T it reads the node position database from its local memory, and then at Block U, sends it to the host system, and returns to its idle state B at Block B.

Method and Apparatus for Planning and Designing Electronic-Ink Digital Display Communication Networks Of the Present Invention At this juncture, it will be helpful to describe various kinds of network planning and design tools that have been developed for practicing the electronic-ink digital display communication networking apparatus and methods of the present invention in various deployment environments.

According to another object of the present invention, software tools are provided to help network planners and designers during the planning and design stages of any particular project involving the installation of a wireless electronic-ink display device communication network. Such software tools, preferably installed on a PC-level network design computer, will include an environment modeling module that is used to (i) assign RF characteristics to primary boundaries conditions in environment (e.g. walls, doors, windows, skylights, stairwell, etc.), (ii) place network components, e.g. coordinator, routers, end-point devices, position location computing module, etc, in the environment, and (iii) generate blueprints for network installers to use during actual network component installation.

According to another object of the present invention, a wireless RF sniffing device is provided for capturing RF spectrum information at sampled points in the modeled environment, and transmitting the data to the PC-level network design computer, for subsequent use in the selection of network parameters (e.g. frequency of operation; channel; PAN ID; etc.), and optionally configuring the network coordinator/controller with configuration parameters.

According to another object of the present invention, a wireless ambient illumination meter is provided for measuring the ambient illumination at locations in the modeled environment where electronic-ink displays are required or desired to meet end-user requirements. Such measurements can be transmitted to the PC-level network design computer for use in modeling the environment in which the electronic-ink display device communication network under planning and design is to be installed.

According to another object of the present invention, a hand-held device is provided for measuring both RF energy (and ambient) illumination at sampled locations, in wireless communication with the PC-level network design computer. Preferably, such an instrument can be used in cooperation with several routers and the node position tracking (NPT) module of the present invention, to ascertain the position of the hand-held device, within the environment, during RF and ambient light measurements and recording Later these network routers can be repositioned to their calculated locations.

In general, at least two-types of such instruments are envisioned: a mobile instrument provided with isotropic and directional antennas and electronic compass, integrated with onboard memory storage that only transmits to host PC when RF measurements not being made; and automatic/self-scanning apparatus (with the above module) with automated room scanning and data capture control capabilities, and batch data transfer when RF measurements have been made.

In connection with such instruments, methods are envisioned for managing the use of electromagnetic spectrum employed by multiple communication networks operating in overlapping frequency bands. One such method would involve the steps of: measuring RF energy from devices (e.g. Bluetooth devices) within multiple communication networks deployed in a given networking environment; determining the potential spatially and/or temporally overlapping frequency bands; and locating network devices in interference free locations.

According to yet another object of the present invention, a software-based tool, also installed on the PC-level network design computer, is provided for determining optimum placement of routers, using SNR to distance calculations. To use this tool, a router is first put into an auxiliary transmit mode. The router is placed at a predetermined distance from the gateway receiver connected to the PC design computer. The gateway receives transmitted packets from the router taking note of the RSSI. Using these measurements in conjunction with the known distance between the router and gateway the PC design computer performs an analysis for the optimum placement of routers for the given installation.

Modifications that Readily Come to Mind

It is understood that the electronic-ink based devices and wireless network communication technologies employed in the systems and networks of the illustrative embodiments may be modified in a variety of ways which will become readily apparent to those skilled in the art after having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A network device for use in a wireless communication network having an initial wireless network coordinator, the network device comprising:
   a microprocessor having memory comprising firmware which, when executed by the microprocessor, configures the microprocessor to operate the network device as a wireless network router or as a wireless network coordinator;
   a radio frequency (RF) transceiver communicatively connected to the microprocessor for generating signals;
   an RF antenna connected to the RF transceiver for sending and receiving signals;
   a global positioning system module operably connected to the microprocessor for locating the network device; and
   a power management module for providing electrical power to the microprocessor, the RF transceiver, the RF antenna, and the global positioning system module;
   wherein the microprocessor is initially configured to operate the network device as a wireless network router; and
   wherein the microprocessor is configured to, if the initial wireless network coordinator is disabled, reconfigure the firmware to operate the network device as a wireless network coordinator.

2. The network device of claim 1, wherein the RF antenna is a phased-array RF antenna structure.

3. The network device of claim 1, comprising an LED indicator for indicating the status of operation of the network device.

4. The network device of claim 1, comprising:
   a wall source power adapter; and
   an electrical wall plug having electrical prongs for plugging into an electrical wall socket.

5. The network device of claim 1, comprising a backup battery source for maintaining electrical power to the network device.

6. A network device for use in a wireless communication network having an initial wireless network coordinator, the network device comprising:
   a microprocessor having memory comprising firmware which, when executed by the microprocessor, configures the microprocessor to operate the network device as a wireless network router or as a wireless network coordinator;
   a radio frequency (RF) transceiver communicatively connected to the microprocessor for generating signals;
   an RF antenna connected to the RF transceiver for sending and receiving signals; and
   a power management module for providing electrical power to the microprocessor, the RF transceiver, and the RF antenna;
   wherein the microprocessor is initially configured to operate the network device as a wireless network router; and
   wherein the microprocessor is configured to, if the initial wireless network coordinator is disabled, reconfigure the firmware to operate the network device as a wireless network coordinator.

7. The network device of claim 6, wherein the RF antenna is a phased-array RF antenna structure.

8. The network device of claim 6, comprising an LED indicator for indicating the status of operation of the network device.

9. The network device of claim 6, comprising a wall source power adapter.

10. The network device of claim 6, comprising:
    a wall source power adapter; and
    an electrical wall plug having electrical prongs for plugging into an electrical wall socket.

11. A network device for use in a wireless communication network having an initial wireless network coordinator, the network device comprising:
    a microprocessor having memory comprising firmware which, when executed by the microprocessor, configures the microprocessor to operate the network device as a wireless network router or as a wireless network coordinator; and
    a transceiver communicatively connected to the microprocessor for generating signals;
    wherein the microprocessor is initially configured to operate the network device as a wireless network router; and
    wherein the microprocessor is configured to, if the initial wireless network coordinator is disabled, reconfigure the firmware to operate the network device as a wireless network coordinator.

12. The network device of claim 11, comprising a phased-array radio frequency (RF) antenna structure;
    wherein the transceiver is a radio frequency (RF) transceiver.

13. The network device of claim 11, comprising a global positioning system module operably connected to the microprocessor for locating the network device.

14. The network device of claim 11, comprising a printed circuit board (PCB) having an LED indicator for indicating the status of operation of the network device.

15. The network device of claim 14, wherein the PCB comprises a multi-layer PCB.

16. The network device of claim 11, comprising a wall source power adapter.

17. The network device of claim 11, comprising:
    a wall source power adapter; and
    an electrical wall plug having electrical prongs for plugging into an electrical wall socket.

18. The network device of claim 11, comprising a power management module for providing electrical power to the microprocessor and the transceiver.

19. The network device of claim 11, comprising a backup battery source for maintaining electrical power to the network device.

20. The network device of claim 11, wherein the wireless communication network is a personal area network (PAN).

* * * * *